United States Patent
Zhang et al.

(10) Patent No.: US 12,074,444 B2
(45) Date of Patent: Aug. 27, 2024

(54) POWER SYSTEM

(71) Applicant: Huawei Digital Power Technologies Co., Ltd., Shenzhen (CN)

(72) Inventors: Yanzhong Zhang, Shanghai (CN); Yongbing Gao, Shanghai (CN); Xun Wang, Shanghai (CN); Roland Huempfner, Nuremberg (DE)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 131 days.

(21) Appl. No.: 17/694,085

(22) Filed: Mar. 14, 2022

(65) Prior Publication Data

US 2022/0200290 A1    Jun. 23, 2022

Related U.S. Application Data

(63) Continuation of application No. PCT/CN2020/087328, filed on Apr. 27, 2020.

(30) Foreign Application Priority Data

Apr. 16, 2020    (WO) ............... PCT/CN2020/085211

(51) Int. Cl.
*H02J 3/38*    (2006.01)
*H02M 7/44*    (2006.01)

(52) U.S. Cl.
CPC ............... *H02J 3/381* (2013.01); *H02M 7/44* (2013.01); *H02J 2300/24* (2020.01)

(58) Field of Classification Search
CPC ..................................................... H02J 3/381

USPC ........................................................... 307/82
See application file for complete search history.

(56) References Cited

U.S. PATENT DOCUMENTS

| 8,642,879 | B2 | 2/2014 | Gilmore et al. |
| 2010/0141041 | A1 | 6/2010 | Bose et al. |
| 2010/0156189 | A1 | 6/2010 | Fishman |
| 2011/0080147 | A1 | 4/2011 | Schoenlinner et al. |

(Continued)

FOREIGN PATENT DOCUMENTS

| CN | 101917016 A | 12/2010 |
| CN | 102208883 A | 10/2011 |

(Continued)

*Primary Examiner* — Joseph Chang
(74) *Attorney, Agent, or Firm* — WOMBLE BOND DICKINSON (US) LLP

(57) ABSTRACT

A power system is disclosed. Output terminals of a power supply or a DC-to-DC unit are cascaded to increase an output voltage, so as to reduce a current between the power supply or the DC-to-DC unit and the DC-to-AC unit, and resolve cost and loss problems of the cable from the power supply or the DC-to-DC unit to the DC-to-AC unit. In addition, according to the power system provided in the embodiments of this application, a quantity of cables from the power supply or the DC-to-DC unit to the DC-to-AC unit may be further reduced by cascading output terminals of the power supply or the DC-to-DC unit and cascading inputs of the DC-to-AC unit, thereby reducing system costs. In addition, in the power system provided in the embodiments of this application, cascaded input and isolated output of the DC-to-AC unit can reduce a specification of a power conversion device.

32 Claims, 43 Drawing Sheets

(56) References Cited

U.S. PATENT DOCUMENTS

| | | | |
|---|---|---|---|
| 2013/0088081 A1* | 4/2013 | Siri | H02J 3/46 700/298 |
| 2015/0236638 A1* | 8/2015 | Moslehi | H02S 40/34 136/251 |
| 2016/0190811 A1* | 6/2016 | Pan | H02M 7/493 307/82 |
| 2017/0070175 A1 | 3/2017 | Butzmann et al. | |

FOREIGN PATENT DOCUMENTS

| | | |
|---|---|---|
| CN | 101779291 B | 1/2013 |
| CN | 104393781 A | 3/2015 |
| CN | 106849167 A | 6/2017 |
| CN | 206517369 U | 9/2017 |
| CN | 109167390 A | 1/2019 |
| CN | 109787291 A | 5/2019 |
| EP | 2658071 A2 | 10/2013 |
| JP | 1995141037 A | 6/1995 |
| JP | 2003088144 A | 3/2003 |
| JP | 2006127888 A | 5/2006 |
| JP | 2007104789 A | 4/2007 |
| JP | 2013520151 A | 5/2013 |
| JP | 2014175384 A | 9/2014 |
| JP | 2014185907 A | 10/2014 |
| JP | 2016535571 A | 11/2016 |
| JP | 2017020913 A | 1/2017 |
| JP | 2017123781 A | 7/2017 |
| JP | 2018196272 A | 12/2018 |

\* cited by examiner

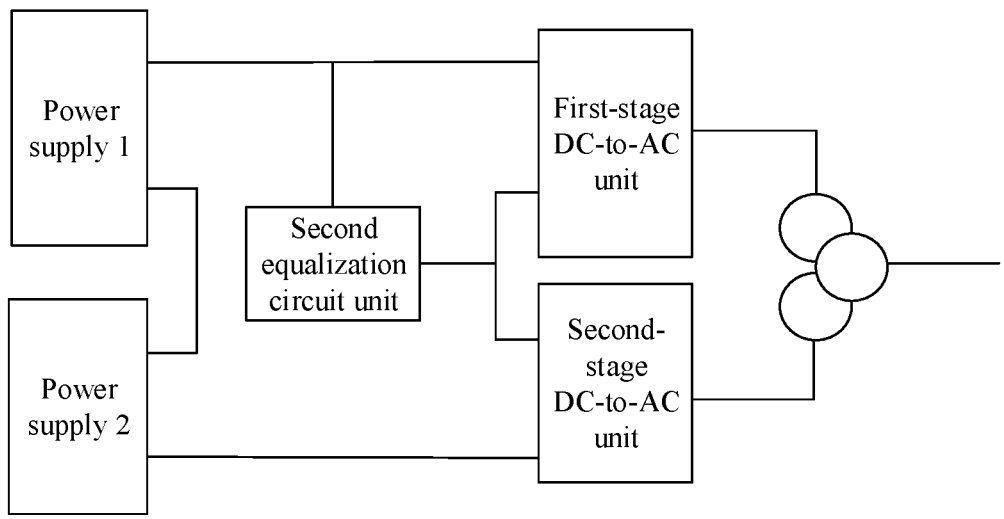
FIG. 9b1
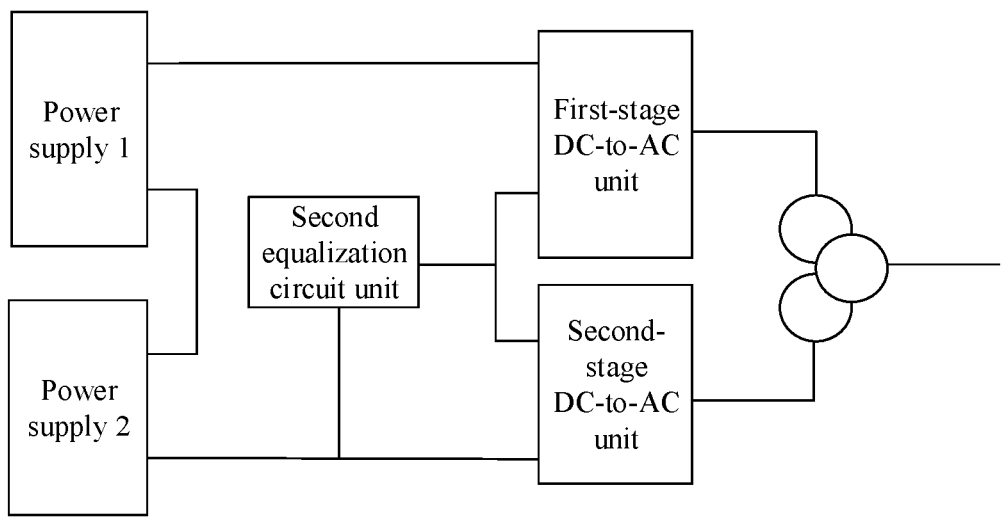
FIG. 9b2

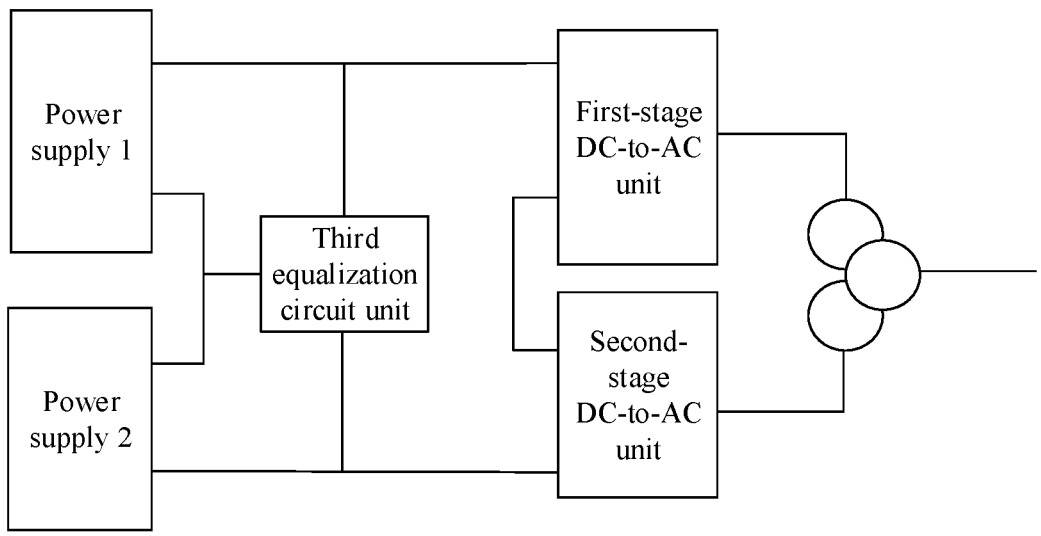
FIG. 9c
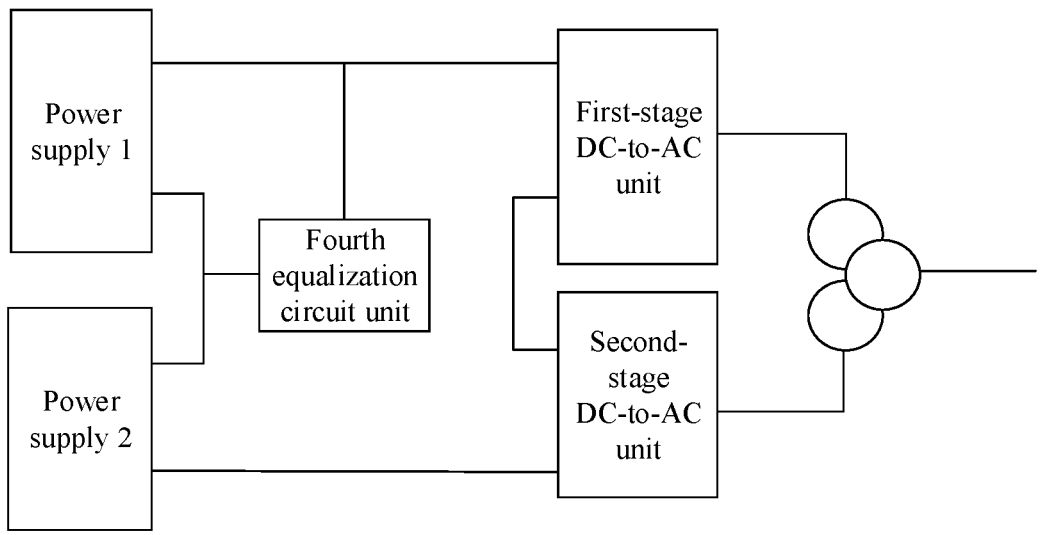
FIG. 9d1

FIG. 9d2

POWER SYSTEM

CROSS-REFERENCE TO RELATED APPLICATIONS

This application is a continuation of International Application No. PCT/CN2020/087328, filed on Apr. 27, 2020, which claims priority to International Application No. PCT/CN2020/085211, filed on Apr. 16, 2020. The disclosures of the aforementioned applications are hereby incorporated by reference in their entireties.

TECHNICAL FIELD

This application relates to the field of circuit technologies, and in particular, to a power system.

BACKGROUND

Photovoltaic power generation is more widely used because it has less pollution than conventional fossil energy. In power generation systems, three-phase grid-connected photovoltaic inverters are mainly used during application due to mature technologies in terms of performance, reliability, management, and the like of photovoltaic arrays. With the adjustment of the grid-connected photovoltaic power price policies, higher requirements are raised for the input-output ratio of photovoltaic power generation, and it is imperative to reduce costs of photovoltaic power generation.

Currently, three-phase grid-connected photovoltaic inverters have three architectures: centralized, distributed, and decentralized. Centralized and decentralized inverters have high conversion powers, but low input and grid-connected voltages, resulting in larger input and output currents, larger diameters of DC/AC cables, increased costs, and increased losses. Distributed inverters have low conversion powers. Although the input voltage can reach 1500 V and the grid-connected voltage can reach 800 V AC, as the power increases, distributed inverters also have problems of larger input and output currents, larger diameters of DC/AC cables, increased costs, and increased losses.

SUMMARY

Embodiments of this application provide a power system, to resolve the foregoing technical problems of a large current in a cable, a high wire diameter specification, and high costs.

According to a first aspect, an embodiment of this application provides a power system, including N power modules and M DC-to-AC units, where N is an integer greater than 1, and M is an integer greater than 1; the power module is configured with a positive output terminal and a negative output terminal, and the DC-to-AC unit is configured with a positive input terminal, a negative input terminal, and an output terminal; a positive output terminal of a first power module is coupled to a positive input terminal of a first DC-to-AC unit; a negative output terminal of an $n^{th}$ power module is coupled in series to a positive output terminal of an $(n+1)^{th}$ power module to form a first node, where n is an integer greater than 0 and less than N; for example, a negative output terminal of the first power module is coupled in series to a positive output terminal of a second power module to form a first node, a negative output terminal of the second power module is coupled in series to a positive output terminal of a third power module to form a first node, and a negative output terminal of an $N^{th}$ power module is coupled to a negative input terminal of an $M^{th}$ DC-to-AC unit; a negative input terminal of an $m^{th}$ DC-to-AC unit is coupled in series to a positive input terminal of an $(m+1)^{th}$ DC-to-AC unit to form a second node, where m is an integer greater than 0 and less than M: for example, a negative input terminal of a first DC-to-AC unit is coupled to a positive input terminal of a second DC-to-AC unit to form a second node, a negative input terminal of a second DC-to-AC unit is coupled to a negative input terminal of a third DC-to-AC unit to form a second node, and at least one first node and at least one second node are coupled; output terminals of the DC-to-AC units are isolated for output.

In the power system according to the first aspect, the power module uses a cascading manner to increase an output voltage of the power module, so as to reduce a current between the power module and the DC-to-AC unit, so that a cable with a low wire diameter specification may be used as a cable between the power module and the DC-to-AC unit, to resolve a cost problem of the cable from the power module to the DC-to-AC unit.

According to a second aspect, an embodiment of this application provides a power system, including a first power supply, a second power supply, a first-stage DC-to-AC unit, and a second-stage DC-to-AC unit, where a positive output terminal of the first power supply is coupled to a positive input terminal of the first-stage DC-to-AC unit; a negative output terminal of the first power supply is coupled to a positive output terminal of the second power supply to form a first node: a negative output terminal of the second power supply is coupled to a negative input terminal of the second-stage DC-to-AC unit; a negative input terminal of the first-stage DC-to-AC unit is coupled to a positive input terminal of the second-stage DC-to-AC unit to form a second node: output terminals of the first-stage DC-to-AC unit and the second-stage DC-to-AC unit are isolated for output.

In the power system according to the second aspect, the first power supply and the second power supply are cascaded to increase an output voltage of the power supply (including the first power supply and the second power supply), so as to reduce a current between the power supply and the DC-to-AC unit (including the first-stage DC-to-AC unit and the second-stage DC-to-AC unit), so that a cable with a low wire diameter specification may be used as a cable between the power supply and the DC-to-AC unit, to resolve a cost problem of the cable from the power supply to the DC-to-AC unit.

With reference to the power system according to the second aspect, in one embodiment, the positive output terminal of the first power supply is coupled to the positive input terminal of the first-stage DC-to-AC unit by using a first conductor, the negative output terminal of the second power supply is coupled to the negative input terminal of the second-stage DC-to-AC unit by using a second conductor, the first node is coupled to the second node by using a third conductor; a current value on the third conductor is less than or equal to a current value on the first conductor or the second conductor. Because the current value on the third conductor is relatively small, a cable specification of the third conductor may be reduced, and costs of the third conductor may be further reduced. In addition, when output powers/voltages of the first power supply and the second power supply are asymmetric, or when input powers/voltages of the first-stage DC-to-AC unit and the second-stage DC-to-AC unit are asymmetric, a current loop can be provided to achieve voltage equalization.

According to a third aspect, an embodiment of this application provides a power system, including N power modules. N DC-to-DC units, and M DC-to-AC units, where an output terminal of the power module is coupled to an input terminal of the DC-to-DC unit; a positive output terminal of a first DC-to-DC unit is coupled to a positive input terminal of a first DC-to-AC unit; a negative output terminal of an $n^{th}$ DC-to-DC unit is coupled in series to a positive output terminal of an $(n+1)^{th}$ DC-to-DC unit to form a first node, where n is an integer greater than 0 and less than N; a negative output terminal of an $N^{th}$ DC-to-DC unit is coupled to a negative input terminal of an $M^{th}$ DC-to-AC unit: a negative input terminal of an $m^{th}$ DC-to-AC unit is coupled in series to a positive input terminal of an $(m+1)^{th}$ DC-to-AC unit to form a second node, where m is an integer greater than 0 and less than M; at least one first node and at least one second node are coupled: output terminals of the DC-to-AC units are isolated for output.

In the power system according to the third aspect, the DC-to-DC unit uses a cascading manner to increase an output voltage of the DC-to-DC unit, so as to reduce a current between the DC-to-DC unit and the DC-to-AC unit, so that a cable with a low wire diameter specification may be used as a cable between the DC-to-DC unit and the DC-to-AC unit, to resolve a cost problem of the cable from the DC-to-DC unit to the DC-to-AC unit.

According to a fourth aspect, an embodiment of this application provides a power system, including a first power supply, a second power supply, a first-stage DC-to-DC unit, a second-stage DC-to-DC unit, a first-stage DC-to-AC unit, and a second-stage DC-to-AC unit, where an output terminal of the first power supply is coupled to an input terminal of the first-stage DC-to-DC unit: an output terminal of the second power supply is coupled to an input terminal of the second-stage DC-to-DC unit; a positive output terminal of the first-stage DC-to-DC unit is coupled to a positive input terminal of the first-stage DC-to-AC unit: a negative output terminal of the first-stage DC-to-DC unit is coupled to a positive output terminal of the second-stage DC-to-DC unit to form a first node; a negative output terminal of the second-stage DC-to-DC unit is coupled to a negative output terminal of the second-stage DC-to-AC unit; a negative input terminal of the first-stage DC-to-AC unit is coupled to a positive input terminal of the second-stage DC-to-AC unit to form a second node: output terminals of the first-stage DC-to-AC unit and the second-stage DC-to-AC unit are isolated for output.

In the power system according to the fourth aspect, the DC-to-DC unit (the first-stage DC-to-DC unit and the second-stage DC-to-DC unit) uses a cascading manner to increase an output voltage of the DC-to-DC unit, so as to reduce a current between the DC-to-DC unit and the DC-to-AC unit (the first-stage DC-to-AC unit and the second-stage DC-to-AC unit), so that a cable with a low wire diameter specification may be used as a cable between the DC-to-DC unit and the DC-to-AC unit, to resolve a cost problem of the cable from the DC-to-DC unit to the DC-to-AC unit.

With reference to the power system according to the fourth aspect, in one embodiment, the positive output terminal of the first DC-to-DC unit is coupled to the positive input terminal of the first-stage DC-to-AC unit by using a first conductor; the negative output terminal of the second DC-to-DC unit is coupled to the negative output terminal of the second-stage DC-to-AC unit by using a second conductor, the first node is coupled to the second node by using a third conductor; a current value on the third conductor is less than or equal to a current value on the first conductor or the second conductor. Because the current value on the third conductor is relatively small, a cable specification of the third conductor may be reduced, and costs of the third conductor may be further reduced. In addition, when output powers/voltages of the first-stage DC-to-DC unit and the second-stage DC-to-DC unit are asymmetric, or when input powers/voltages of the first-stage DC-to-AC unit and the second-stage DC-to-AC unit are asymmetric, a current loop can be provided to achieve voltage equalization.

According to a fifth aspect, an embodiment of this application provides a power system, including a power supply, a DC-to-DC unit, and N DC-to-AC units, where an output terminal of the power supply is coupled to an input terminal of the DC-to-DC unit: a positive output terminal of the DC-to-DC unit is coupled to a positive input terminal of a first DC-to-AC unit; a negative output terminal of the DC-to-DC unit is coupled to a negative input terminal of an $N^{th}$ DC-to-AC unit; a negative input terminal of an $n^{th}$ DC-to-AC unit is coupled in series to a positive input terminal of an $(n+1)^{th}$ DC-to-AC unit to form a first node, where n is an integer greater than 0 and less than N; output terminals of the DC-to-AC units are isolated.

In the power system according to the fifth aspect, the DC-to-AC unit uses a cascading manner to increase an input voltage of the DC-to-AC unit, so as to reduce a current between the DC-to-DC unit and the DC-to-AC unit, so that a cable with a low wire diameter specification may be used as a cable between the DC-to-DC unit and the DC-to-AC unit, to resolve a cost problem of the cable from the DC-to-DC unit to the DC-to-AC unit. When the DC-to-DC unit is connected to a plurality of power supplies, the DC-to-DC unit may be used to increase an output voltage, so as to reduce a current between the DC-to-DC unit and the DC-to-AC unit, and resolve cost and loss problems of the cable from the DC-to-DC unit to the DC-to-AC unit.

According to a sixth aspect, an embodiment of this application provides a power system, including a power supply, a DC-to-DC unit, a first-stage DC-to-AC unit, and a second-stage DC-to-AC unit, where an output terminal of the power supply is coupled to an input terminal of the DC-to-DC unit; a positive output terminal of the DC-to-DC unit is coupled to a positive input terminal of the first-stage DC-to-AC unit: a negative output terminal of the DC-to-DC unit is coupled to a negative input terminal of the second-stage DC-to-AC unit; a negative input terminal of the first-stage DC-to-AC unit is coupled to a positive input terminal of the second-stage DC-to-AC unit; output terminals of the first-stage DC-to-AC unit and the second-stage DC-to-AC unit are isolated for output.

In the power system according to the sixth aspect, input terminals of the DC-to-AC units are cascaded, so as to reduce a current between the DC-to-DC unit and the DC-to-AC unit, and resolve cost and loss problems of the cable from the DC-to-DC unit to the DC-to-AC unit. When the DC-to-DC unit is connected to a plurality of power supplies, the DC-to-DC unit may be used to increase an output voltage, so as to reduce a current between the DC-to-DC unit and the DC-to-AC unit, and resolve cost and loss problems of the cable from the DC-to-DC unit to the DC-to-AC unit.

With reference to the power system according to the sixth aspect, in one embodiment, a middle point of an output terminal potential of the DC-to-DC unit is a first node, and the negative input terminal of the first-stage DC-to-AC unit is coupled to the positive input terminal of the second-stage DC-to-AC unit to form a second node; the positive output terminal of the DC-to-DC unit is coupled to the positive input terminal of the first-stage DC-to-AC unit by using a first conductor, the negative output terminal of the DC-to-DC unit is coupled to the negative output terminal of the second-stage DC-to-AC unit by using a second conductor, the first node is coupled to the second node by using a third conductor; a current value on the third conductor is less than or equal to a current value on the first conductor or the second conductor. Because the current value on the third conductor is relatively small, a cable specification of the third conductor may be reduced, and costs of the third conductor may be further reduced. In addition, when output powers/voltages of the DC-to-DC unit are asymmetric, or when input powers/voltages of the first-stage DC-to-AC unit and the second-stage DC-to-AC unit are asymmetric, a current loop can be provided to achieve voltage equalization.

According to a seventh aspect, an embodiment of this application provides a power system, including N first power supplies. M second power supplies. N DC-to-DC units, and S DC-to-AC units, where an output terminal of a first power supply is coupled to an input terminal of a DC-to-DC unit: a positive terminal formed by serially connecting output terminals of the N DC-to-DC units and output terminals of the M second power supplies is coupled to a positive terminal formed by serially connecting input terminals of the S DC-to-AC units; a negative terminal formed by serially connecting the output terminals of the N DC-to-DC units and the output terminals of the M second power supplies is coupled to a negative terminal formed by serially connecting the input terminals of the S DC-to-AC units; the output terminals of the N DC-to-DC units and the output terminals of the M second power supplies are coupled in series, and the series coupling points form a first node; the input terminals of the S DC-to-AC units are coupled in series, and the series coupling points form a second node; at least one first node and at least one second node are coupled by using at least one cable: output terminals of the DC-to-AC units are isolated.

In the power system according to the seventh aspect, the DC-to-DC unit and the second power supply are cascaded to increase output voltages of the DC-to-DC unit and the second power supply, so as to reduce a current between the DC-to-DC unit or the second power supply and the DC-to-AC unit, so that a cable with a low wire diameter specification may be used as a cable between the DC-to-DC unit or the second power supply and the DC-to-AC unit, to resolve a cost problem of the cable from the DC-to-DC unit or the second power supply to the DC-to-AC nit.

According to an eighth aspect, an embodiment of this application provides a power system, including a first power supply, a DC-to-DC unit, a second power supply, a first-stage DC-to-AC unit, and a second-stage DC-to-AC unit, where an output terminal of the first power supply is coupled to an input terminal of the DC-to-DC unit; the DC-to-DC unit is coupled in series to an output terminal of the second power supply, and a coupling point is a first node; a negative input terminal of the first-stage DC-to-AC unit is coupled to a positive input terminal of the second-stage DC-to-AC unit, and a coupling point is a second node: a positive output terminal formed after the DC-to-DC unit is coupled in series to the output terminal of the second power supply is a first port, and the first port is coupled to a positive input terminal of the first-stage DC-to-AC unit; a negative output terminal formed after the DC-to-DC unit is coupled in series to the output terminal of the second power supply is a second port, and the second port is coupled to a negative input terminal of the second-stage DC-to-AC unit: output terminals of the first-stage DC-to-AC unit and the second-stage DC-to-AC unit are isolated for output.

In the power system according to the eighth aspect, the DC-to-DC unit and the second power supply are cascaded to increase output voltages of the DC-to-DC unit and the second power supply, so as to reduce a current between the DC-to-DC unit or the second power supply and the DC-to-AC unit (the first-stage DC-to-AC unit and the second-stage DC-to-AC unit), so that a cable with a low wire diameter specification may be used as a cable between the DC-to-DC unit or the second power supply and the DC-to-AC unit, to resolve a cost problem of the cable from the DC-to-DC unit or the second power supply to the DC-to-AC unit.

With reference to the eighth aspect, in one embodiment, the first port is coupled to the positive input terminal of the first-stage DC-to-AC unit by using a first conductor; the second port is coupled to the negative input terminal of the second-stage DC-to-AC unit by using a second conductor, the first node is coupled to the second node by using a third conductor; a current value on the third conductor is less than or equal to a current value on the first conductor or the second conductor. Because the current value on the third conductor is relatively small, a cable specification of the third conductor may be reduced, and costs of the third conductor may be further reduced. In addition, when output powers/voltages of the DC-to-DC unit and the second power supply are asymmetric, or when input powers/voltages of the first-stage DC-to-AC unit and the second-stage DC-to-AC unit are asymmetric, a current loop can be provided to achieve voltage equalization.

BRIEF DESCRIPTION OF DRAWINGS

FIG. 9*b*1 is a schematic diagram 1 of a power system that includes a second equalization circuit unit;

FIG. 9*b*2 is a schematic diagram 2 of a power system that includes a second equalization circuit unit:

FIG. 9c is a schematic diagram of a power system that includes a third equalization circuit unit;

FIG. 9d1 is a schematic diagram 1 of a power system that includes a fourth equalization circuit unit;

FIG. 9d2 is a schematic diagram 2 of a power system that includes a fourth equalization circuit unit;

DESCRIPTION OF EMBODIMENTS

The following describes in detail the technical solutions in the embodiments of this application with reference to the accompanying drawings in the embodiments of this application.

To resolve a problem of high costs and losses of a photovoltaic power generation system, an embodiment of this application provides a power system. An output terminal of a power supply or a direct current (DC)-to-DC unit uses a cascading manner to increase an output voltage, so as to reduce a current between the power supply or the DC-to-DC unit and a DC-to-alternating current (AC) unit, and resolve cost and loss problems of the cable from the power supply or the DC-to-DC unit to the DC-to-AC unit. In addition, according to the power system provided in this embodiment of this application, a quantity of cables from the power supply or the DC-to-DC unit to the DC-to-AC unit may be further reduced by cascading output terminals of the power supply or the DC-to-DC unit and cascading input of the DC-to-AC unit, thereby reducing system costs. In addition, in the power system provided in this embodiment of this application, cascaded input and isolated output of the DC-to-AC unit can reduce a specification of a power conversion device. Therefore, problems of insufficient specifications and high costs of power conversion devices in the current industry are resolved. In addition, a 1500 V circuit breaker may be used to reduce costs. In some embodiments, when output of the DC-to-DC unit is cascaded, in this embodiment of this application, a problem of potential induced degradation (PID) caused by a negative voltage of a battery panel to ground during operation of the system may be resolved by designing a system at a DC-to-DC unit level.

The following describes in detail the foregoing solutions by using embodiments. The following embodiments are described by using a photovoltaic array as an example. Another similar power system has a same principle as the photovoltaic array. For implementation of the another similar power system, refer to the following embodiments of the photovoltaic array. Details are not described in the embodiments of this application.

Embodiment 1

Figure 1:
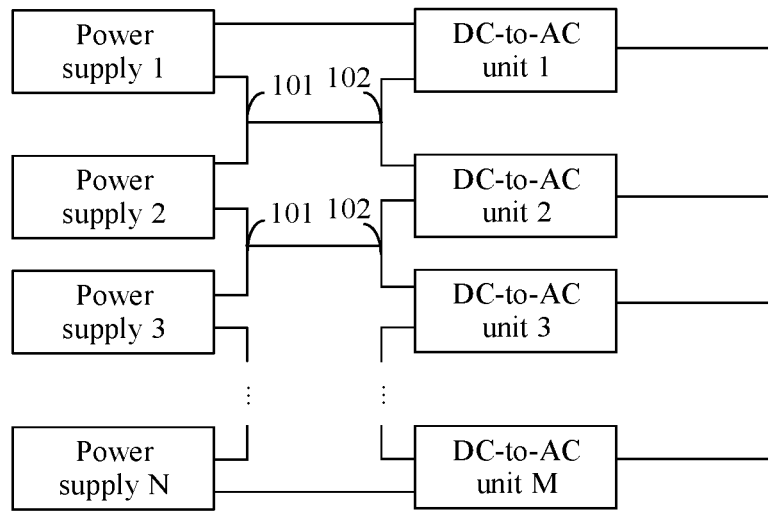
FIG. 1 is a schematic diagram of Embodiment 1 of a power system according to an embodiment of this application.

FIG. 1 is a schematic diagram of Embodiment 1 of a power system according to an embodiment of this application. The power system includes N power supplies and M DC-to-AC units, where N is an integer greater than 1, and M is an integer greater than 1. It may be understood that N has no relationship with M in terms of a value, that is. N may be equal to M. N may be greater than M. or N may be less than M. This is not limited in this embodiment of this application.

Figure 2:
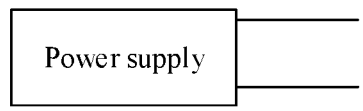
FIG. 2 is a schematic diagram of a power supply according to an embodiment of this application.

Among the N power supplies, each power supply is configured with a positive output terminal and a negative output terminal, as shown in FIG. 2. FIG. 2 is a schematic diagram of a power supply according to an embodiment of this application. In this embodiment of this application, for ease of description, unless otherwise specified or marked, generally, an output terminal in the upper right part of the power supply is referred to as a positive output terminal, and an output terminal in the lower right part of the power supply is referred to as a negative output terminal. The power supply in this embodiment of this application may be a photovoltaic array, an energy storage power supply, or a wind power generation direct current source. In actual application, the power supply may alternatively be another type of power supply. This is not limited in this embodiment of this application. In this embodiment of this application, the N power supplies may be of a same type, for example, all of the N power supplies are photovoltaic arrays. Alternatively, the N power supplies may not be of a same type, for example, a power supply 1 is a photovoltaic array, a power supply 2 is an energy storage power supply, and so on. This is not limited in this embodiment of this application.

Figure 3A:
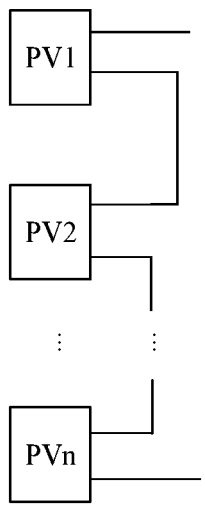
FIG. 3*a* is a schematic diagram of a photovoltaic array according to an embodiment of this application.
Figure 3B:
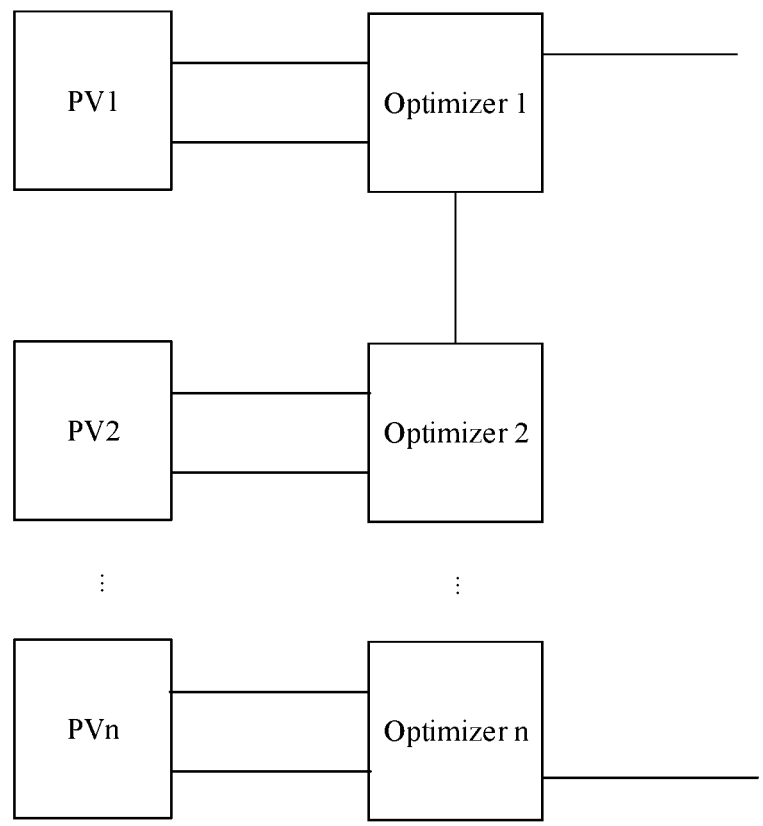
FIG. 3*b* is a schematic diagram of another photovoltaic array according to an embodiment of this application.

The photovoltaic (PV) array may be formed by a series/parallel combination of photovoltaic panels, as shown in FIG. 3a. FIG. 3a is a schematic diagram of a photovoltaic array according to an embodiment of this application. Photovoltaic battery panels PV may be first connected in series and then connected in parallel to form a photovoltaic array, may be first connected in parallel and then connected in series to form a photovoltaic array, may be directly connected in series to form a photovoltaic array, or may be directly connected in parallel to form a photovoltaic array. This is not limited in this embodiment of this application. The photovoltaic array may alternatively be formed by connecting an output of a photovoltaic panel to an optimizer or a shutdown device, and then performing series/parallel combination, as shown in FIG. 3b. FIG. 3b is a schematic diagram of another photovoltaic array according to an embodiment of this application. Output of each photovoltaic panel may be connected to an optimizer or a shutdown device, and then output of the optimizer or the shutdown device is combined in series/parallel to form a photovoltaic array. In a possible case, some photovoltaic panels are connected to the optimizer or the shutdown device, and some other photovoltaic panels are not connected to the optimizer or the shutdown device, and then these photovoltaic panels are combined in series/parallel to form a photovoltaic array. The optimizer or the shutdown device is a device that can implement a fast shutdown function. After receiving a shutdown instruction, the optimizer or the shutdown device can cut off a corresponding line to disconnect the line. In actual application, the optimizer or the shutdown device may alternatively be replaced by another apparatus having a similar function. This is not limited in this embodiment of this application.

Figure 4:
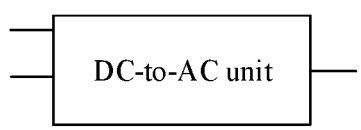
FIG. 4 is a schematic diagram of a DC-to-AC unit according to an embodiment of this application.

Among the M DC-to-AC units, each DC-to-AC unit is configured with a positive input terminal, a negative input terminal, and an output terminal, as shown in FIG. 4. FIG. 4 is a schematic diagram of a DC-to-AC unit according to an embodiment of this application. In this embodiment of this application, for ease of description, unless otherwise specified or marked, generally, an input terminal in the upper left part of the DC-to-AC unit is referred to as a positive input terminal, an input terminal in the lower left part of the DC-to-AC unit is referred to as a negative input terminal, and a right side of the DC-to-AC unit is an output terminal. The DC-to-AC unit in this embodiment of this application is an apparatus that can convert a direct current into an alternating current, for example, an inverter. This is not limited in this embodiment of this application. Output of the DC-to-AC unit in this embodiment of this application may be a three-phase voltage or a single-phase voltage. The following embodiments are described by using an example in which an output terminal is a three-phase voltage. For implementation of another case, for example, a single-phase voltage, refer to the embodiments of this application. Details are not described in this application.

It may be understood that, in this embodiment of this application, the output terminal may include a positive output terminal and a negative output terminal. For example, an output terminal of a power supply 1 includes a positive output terminal and a negative output terminal of the power supply 1. The input terminal may also include a positive input terminal and a negative input terminal. For example, an input terminal of a DC-to-AC unit 1 includes a positive input terminal and a negative input terminal.

It can be seen from FIG. 1 that, in the power system, the positive output terminal of the power supply 1 is coupled to the positive input terminal of the DC-to-AC unit 1, and a negative output terminal of a power supply N is coupled to a negative input terminal of a DC-to-AC unit M. The negative output terminal of the power supply 1 is coupled to a positive output terminal of a power supply 2, a negative output terminal of the power supply 2 is coupled to a positive output terminal of a power supply 3, . . . , and so on. In addition, in this embodiment of this application, nodes such as a coupling node between the negative output terminal of the power supply 1 and the positive output terminal of the power supply 2, and a coupling node between the negative output terminal of the power supply 2 and a positive output terminal of a power supply 3 each may be referred to as a first node 101. The negative input terminal of the DC-to-AC unit 1 is coupled to a positive input terminal of a DC-to-AC unit 2, a negative input terminal of the DC-to-AC unit 2 is coupled to a positive output terminal of a DC-to-AC unit 3, . . . , and so on. In addition, in this embodiment of this application, nodes such as a coupling node between the negative input terminal of the DC-to-AC unit 1 and the positive input terminal of the DC-to-AC unit 2, and a coupling node between the negative input terminal of the DC-to-AC unit 2 and the positive output terminal of the DC-to-AC unit 3 each may be referred to as a second node 102. In this embodiment of this application, the output of the power supply 1 and the output of the power supply 2 are cascaded, the output of the power supply 2 and the output of the power supply 3 are cascaded, . . . . In this embodiment of this application, output terminals of power supplies are cascaded to increase an output voltage, reduce a current between the power supply and the DC-to-AC unit, and resolve cost and loss problems of a cable from the power supply to the DC-to-AC unit. For example, a maximum output voltage of each power supply is X volts, and a maximum output voltage after the N power supplies are cascaded is NX volts. In a case of the same power, when a voltage increases, an output current decreases, a wire diameter specification of a used cable decreases, and costs decrease.

At least one first node 101 and at least one second node 102 are coupled. For example, in some embodiments, one first node 101 is coupled to one second node 102, and the other first nodes 101 and the other second nodes 102 are not coupled. In some other embodiments, two first nodes 101 are respectively coupled to two second nodes 102, and the other first nodes 101 and the other second nodes 102 are not coupled. In some other embodiments, a quantity of first nodes 101 is equal to a quantity of second nodes 102, and each first node 101 is coupled to a corresponding second node 102. In some other embodiments, a quantity of first nodes 101 is different from a quantity of second nodes 102, each first node 101 is coupled to a corresponding second node 102, and a remaining first node 101 or a remaining second node 102 is not coupled. In actual application, another coupling manner may alternatively be used. This is not limited in this embodiment of this application. In this embodiment of this application, a quantity of cables connected between the power supply and the DC-to-AC unit is reduced in a manner of the first node 101 and the second node 102, thereby reducing costs of the power system.

In this embodiment of this application, output terminals of DC-to-AC units are isolated for output. For example, an output terminal of the DC-to-AC unit 1 is isolated from an output terminal of the DC-to-AC unit 2, and an output terminal of the DC-to-AC unit 2 is isolated from an output terminal of the DC-to-AC unit 3. In actual application, an output terminal of each DC-to-AC unit is coupled to different windings, and each winding may output a three-phase voltage or a single-phase voltage. This is not limited in this embodiment of this application. In this embodiment of this application, cascaded input and isolated output of the DC-to-AC unit can reduce a specification of a power conversion device. Therefore, problems of insufficient specifications (generally up to 1700 V for an insulated gate bipolar transistor (insulated gate bipolar transistor, IGBT)) and high costs of power conversion devices in the current industry are resolved. In addition, a circuit breaker with a relatively low specification may be used to reduce costs.

It may be understood that, in this embodiment of this application, coupling may also be referred to as coupling connection, and may include but is not limited to connection implemented by using any combination of a switching device, a current limiting device, a protection device, a direct cable connection, or the like.

Figure 5A:
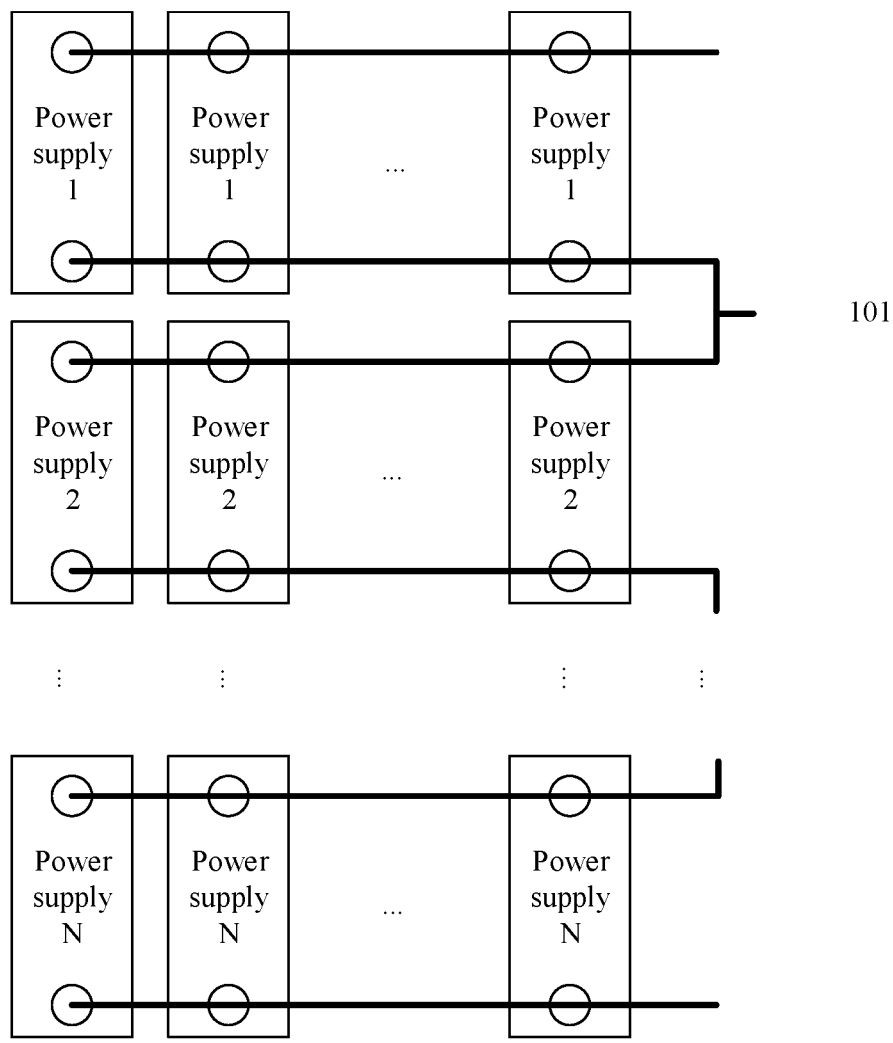
FIG. 5*a* is a schematic diagram of a plurality of combinations of power supplies connected in parallel according to an embodiment of this application.
Figure 5B:
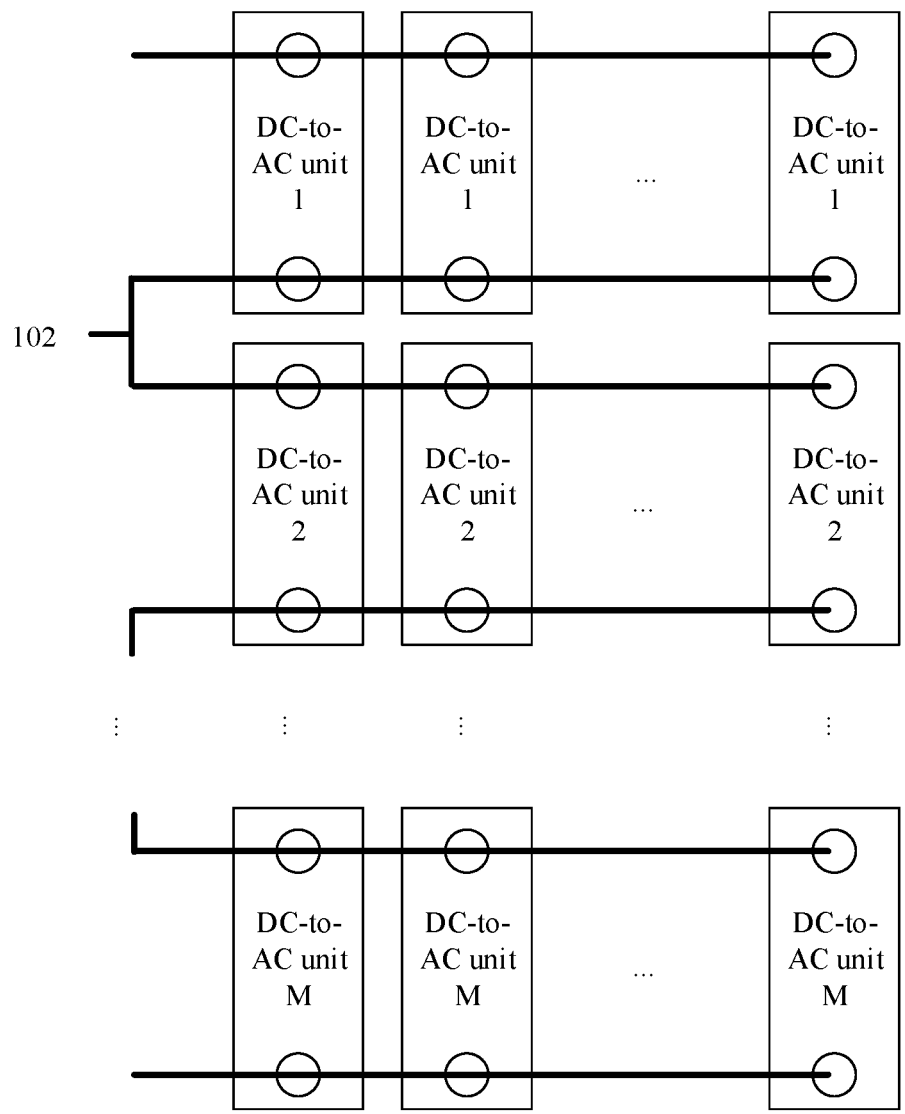
FIG. 5*b* is a schematic diagram of a plurality of combinations of DC-to-AC units connected in parallel according to an embodiment of this application.

In some embodiments, the power supply 1, the power supply 2, . . . , and the power supply N in FIG. 1 may be considered as one combination of power supplies, and the DC-to-AC unit 1, the DC-to-AC unit 2, . . . , the DC-to-AC unit M may be considered as one combination of DC-to-AC units. When there are at least two combinations of power supplies and/or at least two combinations of DC-to-AC units, similar output terminals of at least two combinations of power supplies are connected in parallel, and similar input terminals of at least two combinations of DC-to-AC units are connected in parallel. There is at least one cable coupling connection between the similar output terminals connected in parallel and the similar input terminals connected in parallel. FIG. 5a is a schematic diagram of a plurality of combinations of power supplies connected in parallel according to an embodiment of this application. In FIG. 5a, each vertical row is one combination of power supplies, and each combination of power supplies includes a power supply 1, a power supply 2, . . . , and a power supply N. A positive output terminal of a power supply 1 in a first combination of power supplies is coupled in parallel to a positive output terminal of a power supply 1 in a second combination of power supplies (that is, similar output terminals are coupled in parallel); a negative output terminal of the power supply 1 of the first combination of power supplies is coupled in parallel to a negative output terminal of the power supply 1 of the second combination of power supplies, . . . , and so on. It may be understood that the output terminals of the power supply 1, the power supply 2, . . . , and the power supply N may be cascaded to form at least one first node. FIG. 5b is a schematic diagram of a plurality of combinations of DC-to-AC units connected in parallel according to an embodiment of this application. In FIG. 5b, each vertical row is one combination of DC-to-AC units, and each combination of DC-to-AC units includes a DC-to-AC unit 1, a DC-to-AC unit 2, . . . , and a DC-to-AC unit M. A positive input terminal of a DC-to-AC unit 1 in a first combination of DC-to-AC units is coupled in parallel to a positive input terminal of a DC-to-AC unit 1 in a second combination of DC-to-AC units (that is, similar input terminals are coupled in parallel); a negative input terminal of the DC-to-AC unit 1 in the first combination of DC-to-AC units is coupled in parallel to a negative input terminal of the DC-to-AC unit 1 in the second combination of DC-to-AC units, . . . , and so on. It may be understood that the input terminals of the DC-to-AC unit 1, the DC-to-AC unit 2, . . . , and the DC-to-AC unit M may be cascaded to form at least one second node. The at least one first node is coupled to the at least one second node, that is, there is at least one cable coupling connection between the similar output terminals connected in parallel and the similar input terminals connected in parallel.

Figure 5C:
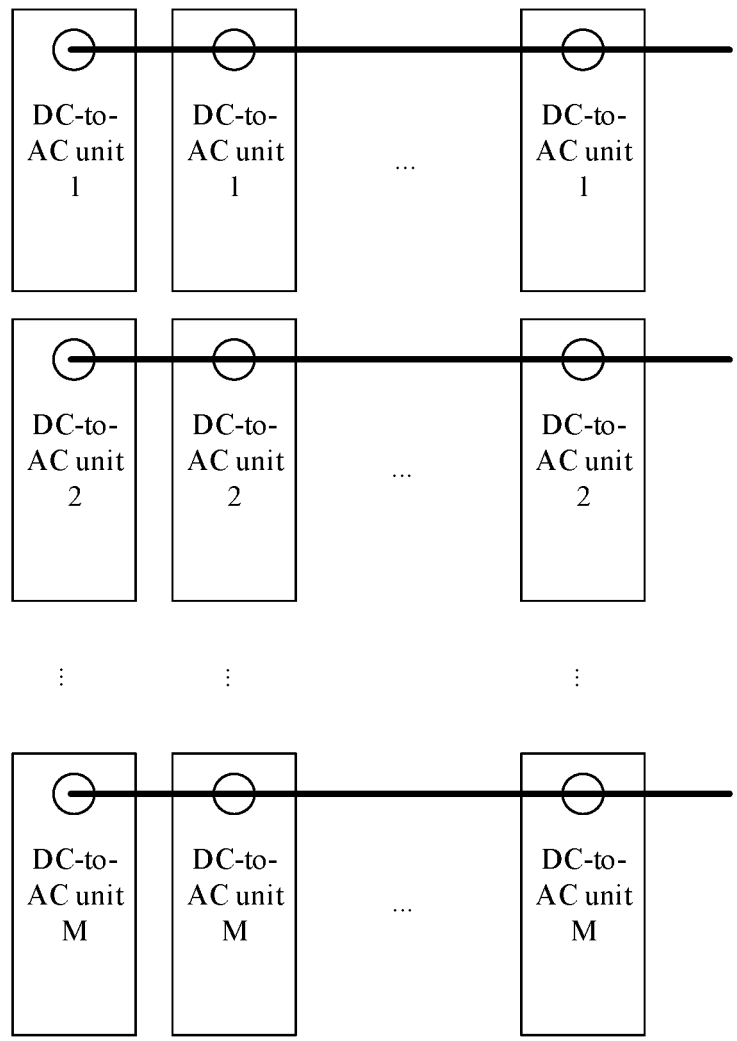
FIG. 5*c* is another schematic diagram of a plurality of combinations of DC-to-AC units connected in parallel according to an embodiment of this application.

FIG. 5c is another schematic diagram of a plurality of combinations of DC-to-AC units connected in parallel according to an embodiment of this application. In FIG. 5c, each vertical row is one combination of DC-to-AC units, and each combination of DC-to-AC units includes a DC-to-AC unit 1, a DC-to-AC unit 2, . . . , and a DC-to-AC unit M. In a possible case, an output terminal of the DC-to-AC unit 1 in the first combination of DC-to-AC units may be coupled in parallel to an output terminal of the DC-to-AC unit 1 in the second combination of DC-to-AC units, and then a winding is connected to implement parallel output. In another possible case, an output terminal of the DC-to-AC unit 1 in the first combination of DC-to-AC units is isolated from an output terminal of the DC-to-AC unit 1 in the second combination of DC-to-AC units for output, that is, different windings are connected to implement isolated output. The same rule applies to another DC-to-AC unit. Details are not described in this embodiment of this application.

In this embodiment of this application, similar output terminals mean corresponding output terminals of corresponding apparatuses in different combinations. For example, a positive output terminal of the power supply 1 in the first combination of power supplies and a positive output terminal of the power supply 1 in the second combination of power supplies are similar output terminals; an output terminal of the DC-to-AC unit 1 in the first combination of DC-to-AC units and an output terminal of the DC-to-AC unit 1 in the second combination of DC-to-AC units are similar output terminals; an output terminal of the DC-to-DC unit 1 in the first combination of DC-to-DC units and an output terminal of the DC-to-DC unit 1 in the second combination of DC-to-DC units are similar output terminals. Similar input terminals mean corresponding input terminals of corresponding apparatuses in different combinations. For example, a positive input terminal of the DC-to-AC unit 1 in the first combination of DC-to-AC units and a positive input terminal of the DC-to-AC unit 1 in the second combination of DC-to-AC units are similar input terminals: a positive input terminal of the DC-to-DC unit 1 in the first combination of DC-to-DC units and a positive input terminal of the DC-to-DC unit 1 in the second combination of DC-to-DC units are similar input terminals; and so on.

In some embodiments, a communication signal is coupled to a direct current cable connected between the power supply and the DC-to-AC unit. It may be understood that the direct current cable connected between the power supply and the DC-to-AC unit may be a direct current cable for coupling the positive output terminal of the power supply 1 and the positive input terminal of the DC-to-AC unit 1; may be a direct current cable for coupling a negative output terminal of the power supply N and a negative input terminal of the DC-to-AC unit M: may be a direct current cable for coupling a first node and a second node: may be a direct current cable for cascaded output among the power supply 1, the power supply 2, . . . , and the power supply N: or may be a direct current cable for cascaded input among the DC-to-AC unit 1, the DC-to-AC unit 2, . . . , and the DC-to-AC unit M. Preferably, the communication signal may be a power line communication (PLC) signal. This type of signal coupled to the cable loads a high frequency that carries information into a current, and then an adapter that transmits and receives the information by using the cable separates the high frequency from the current to implement information transfer. Therefore, if the power supply and the DC-to-AC unit are devices that can recognize a communication signal, communication may be performed between the power supply and the DC-to-AC unit by using a communication signal coupled to a direct current cable. In actual application, the communication signal may alternatively be a signal that can implement communication other than the PLC signal. This is not limited in this embodiment of this application. In actual application, the power system may use a power supply and a DC-to-AC unit that can recognize a communication signal, or may modify a power supply and a DC-to-AC unit so that the power supply and the DC-to-AC unit can recognize a communication signal. This is not limited in this embodiment of this application.

In some embodiments, the power supply is a photovoltaic array formed by connecting an output of a photovoltaic panel to an optimizer or a shutdown device, and then performing series/parallel combination. When a communication signal is coupled to the direct current cable connected between the power supply and the DC-to-AC unit, the communication signal also passes through the optimizer or the shutdown device, and the power supply or the DC-to-AC unit may control, by using the communication signal, the shutdown of the optimizer or the shutdown device, so as to implement fast shutdown. That is, the power supply or the DC-to-AC unit may send a communication signal that carries a shutdown instruction to the optimizer or the shutdown device. After receiving the communication signal that carries the shutdown instruction, the optimizer or the shutdown device executes the shutdown instruction, so as to implement fast shutdown. A situation of the communication signal is similar to the description of the communication signal in the foregoing embodiment, and details are not described herein again.

In some embodiments, the power system further includes at least one energy storage unit. The energy storage unit is coupled in parallel to at least two direct current cables connected between the power supply and the DC-to-AC unit. In this embodiment of this application, the direct current cable connected between the power supply and the DC-to-AC unit may be a direct current cable connected between the power supply and the DC-to-AC unit; may be a direct current cable for coupling a positive output terminal of the power supply 1 and a positive input terminal of the DC-to-AC unit 1; may be a direct current cable for coupling a negative output terminal of the power supply N and a negative input terminal of the DC-to-AC unit M: or may be a direct current cable for coupling the first node and the second node. For example, the energy storage unit is coupled in parallel between a direct current cable for coupling a positive output terminal of the power supply 1 and a positive input terminal of the DC-to-AC unit 1, and a direct current cable for coupling a negative output terminal of the power supply N and a negative input terminal of the DC-to-AC unit M. Alternatively, the energy storage unit is coupled in parallel among three direct current cables for coupling the first node and the second node. It may be understood that a quantity of energy storage units included in one power system is not limited, that is, a plurality of energy storage units may be coupled in parallel at the same time. This is not limited in this embodiment of this application. In this embodiment of this application, the energy storage unit may be an energy storage device, or may include a direct current conversion unit and an energy storage device, or may be another apparatus capable of storing energy. This is not limited in this embodiment of this application. The energy storage device may include but is not limited to a supercapacitor, a battery, and the like. The direct current conversion unit may be a DC-to-DC unit or the like. This is not limited in this embodiment of this application.

In some embodiments, when the power system is configured with an energy storage unit, a communication signal is coupled to a direct current cable connected between the energy storage unit and the power supply, and the energy storage unit may communicate with the power supply. A situation of the communication signal and a principle for implementing communication are similar to the description of the communication signal in the foregoing embodiment, and details are not described herein again. In some other embodiments, when the power system is configured with an energy storage unit, a communication signal is coupled to a direct current cable connected between the energy storage unit and the DC-to-AC unit, and the energy storage unit may communicate with the DC-to-AC unit. A situation of the communication signal is similar to the foregoing situation of communication implemented between the energy storage unit and the power supply. Details are not described herein again.

Embodiment 2

Figure 6:
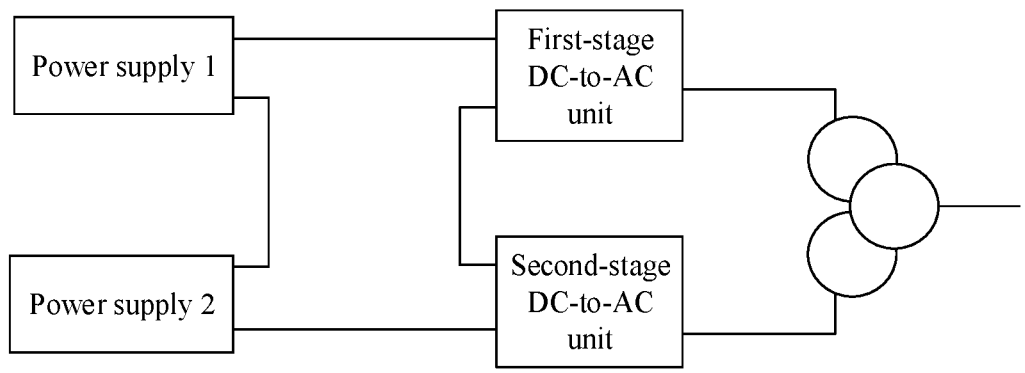
FIG. 6 is a schematic diagram of Embodiment 2 of a power system according to an embodiment of this application.

FIG. 6 is a schematic diagram of Embodiment 2 of a power system according to an embodiment of this application. The power system includes a power supply 1, a power supply 2, a first-stage DC-to-AC unit, and a second-stage DC-to-AC unit. The power supply 1 and the power supply 2 may be photovoltaic arrays, energy storage power supplies, or wind power generation direct current sources, which is similar to Embodiment 1. Details are not described herein again. The first-stage DC-to-AC unit and the second-stage DC-to-AC unit may be apparatuses that can convert a direct current into an alternating current, for example, an inverter. This is not limited in this embodiment of this application.

In this embodiment of this application, a positive output terminal of the power supply 1 is coupled to a positive input terminal of the first-stage DC-to-AC unit, a negative output terminal of the power supply 2 is coupled to a negative input terminal of the second-stage DC-to-AC unit, a negative output terminal of the power supply 1 is coupled to a positive output terminal of the power supply 2, and a negative input terminal of the first-stage DC-to-AC unit is coupled to a positive input terminal of the second-stage DC-to-AC unit. Therefore, outputs of the power supply 1 and the power supply 2 are cascaded, and inputs of the first-stage DC-to-AC unit and the second-stage DC-to-AC unit are cascaded. In this embodiment of this application, output terminals of power supplies are cascaded to increase an output voltage, reduce a current between the power supply and the DC-to-AC unit, and resolve cost and loss problems of a cable from the power supply to the DC-to-AC unit. For example, a maximum output voltage of each of the power supply 1 and the power supply 2 is 1500 V. After the outputs of the power supply 1 and the power supply 2 are cascaded, a maximum output voltage is 3K V. In a case of the same power, when a voltage increases, an output current decreases, a wire diameter specification of a used cable decreases, and costs decrease.

Output terminals of the first-stage DC-to-AC unit and the second-stage DC-to-AC unit are isolated for output, and are connected to different windings. This is similar to the case of isolated output of the DC-to-AC unit in Embodiment 1, and details are not described herein again. In this embodiment of this application, through cascaded input and isolated output of DC-to-AC units, specifications of power conversion devices are reduced. The specifications of power conversion devices in the current industry are insufficient (generally up to 1700 V for the IGBT). However, a 1500 V circuit breaker may be used in the power system provided in this embodiment of this application, and costs are low. The technical problem of insufficient specifications of power conversion devices in the current industry is resolved.

A node at which a negative output terminal of the power supply 1 is coupled to a positive output terminal of the power supply 2 is referred to as a first node, and a node at which a negative input terminal of the first-stage DC-to-AC unit is coupled to a positive input terminal of the second-stage DC-to-AC unit is referred to as a second node.

Figure 7:
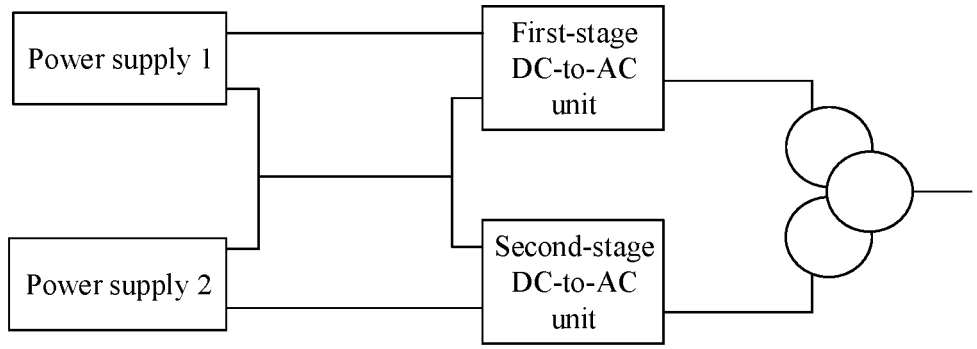
FIG. 7 is a schematic diagram of an embodiment of a power system according to an embodiment of this application.

FIG. 7 is a schematic diagram of an embodiment of a power system according to an embodiment of this application. As shown in FIG. 7, in some embodiments, a positive output terminal of the power supply 1 is coupled to a positive input terminal of the first-stage DC-to-AC unit by using a first conductor, and a negative output terminal of the power supply 2 is coupled to a negative input terminal of the second-stage DC-to-AC unit by using a second conductor. The first node and the second node are coupled by using a third conductor. It may be understood that, in this embodiment of this application, the first conductor, the second conductor, and the third conductor are all direct current cables connected between the power supply (the power supply 1 and the power supply 2) and the DC-to-AC unit (the first-stage DC-to-AC unit and the second-stage DC-to-AC unit). A material and a wire diameter specification of the cable may be configured according to an actual situation. This is not limited in this embodiment of this application. It may be understood that, in the prior art, the power supply 1 and the power supply 2 may have four output terminals in total, and therefore, four cables are connected. However, in this embodiment of this application, the power supply 1 and the power supply 2 are cascaded, and the first node and the second node are coupled by using one cable, the existing technical solution of four cables is modified into a solution that requires only three cables. Therefore, costs of one cable and construction costs can be saved.

In some embodiments, because the first node is a middle point of cascading the power supply 1 and the power supply 2, and the second node is a middle point of cascading the first-stage DC-to-AC unit and the second-stage DC-to-AC unit, it can be implemented that a current value on the third conductor is less than or equal to a current value on the first conductor. When the current value on the third conductor is less than or equal to the current value on the first conductor, the wire diameter specification of the third conductor may be reduced, thereby reducing costs of the third conductor. In some other embodiments, similarly, the current value on the third conductor is less than or equal to the current value on the second conductor. Therefore, when the current value on the third conductor is less than or equal to the current value on the second conductor, the wire diameter specification of the third conductor may be reduced, thereby reducing cable costs of the third conductor. Certainly, the current value of the third conductor may alternatively be less than the current value of the first conductor and less than the current value of the second conductor. This may also reduce the wire diameter specification of the third conductor, and reduce the cable costs of the third conductor.

In some embodiments, the first conductor, the second conductor, and the third conductor form a distributed double (DC) bus. The first conductor and the second conductor form a positive bus, and the second conductor and the third conductor form a negative bus. The third conductor is a middle bus (Middle Cable) of the distributed double bus. The first conductor, the second conductor, and the third conductor are direct current conductors. In the 3D technology, a direct current bus is constructed by using three cables, a positive bus is constructed by using the first conductor and the second conductor, and a negative bus is constructed by using the second conductor and the third conductor.

Figure 8:
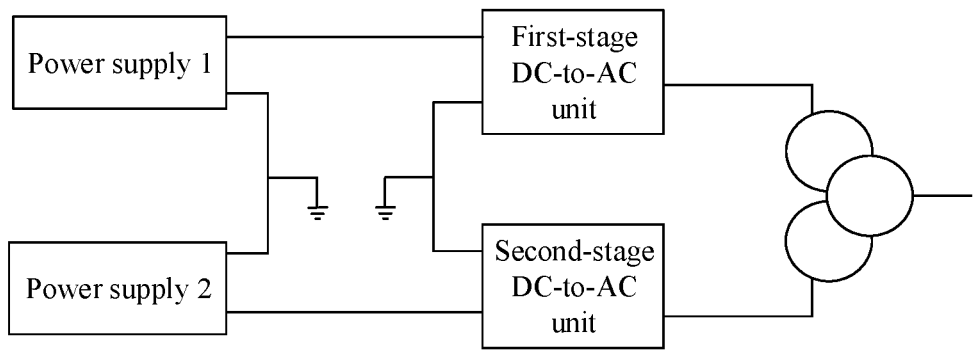
FIG. 8 is a schematic diagram of an embodiment of a power system according to an embodiment of this application.

FIG. 8 is a schematic diagram of an embodiment of a power system according to an embodiment of this application. As shown in FIG. 8, in some embodiments, both the first node and the second node are coupled to ground. In this embodiment of this application, both the first node and the second node are coupled to ground, so that when the output powers or output voltages of the power supply 1 and the power supply 2 are asymmetric, or the input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore, costs of one cable and construction costs can be saved.

In some embodiments, when the first node and the second node are coupled, when an output voltage and/or an output current and/or an output power of one of the power supply 1 and the power supply 2 is less than a preset value, the corresponding power supply stops working. In this case, at least one of the DC-to-AC unit 1 and the DC-to-AC unit 2 works. In an example, if the output voltage of the power supply 1 is less than the preset value, the power supply 1 stops working, and if the output voltage of the power supply 2 is greater than the preset value, the power supply 2 continues working. In another example, if the output voltage of the power supply 2 is less than the preset value, the power supply 2 stops working. In this embodiment of this application, the power supply whose output is less than the preset value may be stopped from working, thereby avoiding unnecessary waste, and improving conversion efficiency and utilization. In addition, it is ensured that at least one DC-to-AC unit works, ensuring normal operation of the system in real time.

When the first node and the second node are not coupled, impact of power inconsistency is considered. For example, due to different illuminations, in a photovoltaic power generation system, an output voltage of the power supply 1 may be greater than an output voltage of the power supply 2, that is, voltages and/or powers output by the power supply 1 and the power supply 2 may be asymmetric, resulting in a cask effect in the output powers. Therefore, when the first node and the second node are not coupled, the power system may be configured with an equalization circuit to prevent asymmetry of voltages and/or powers output by the power supply 1 and the power supply 2. The following provides four equalization circuits. In actual application, another equalization circuit may alternatively exist. This is not limited in this embodiment of this application.

Figure 9A:
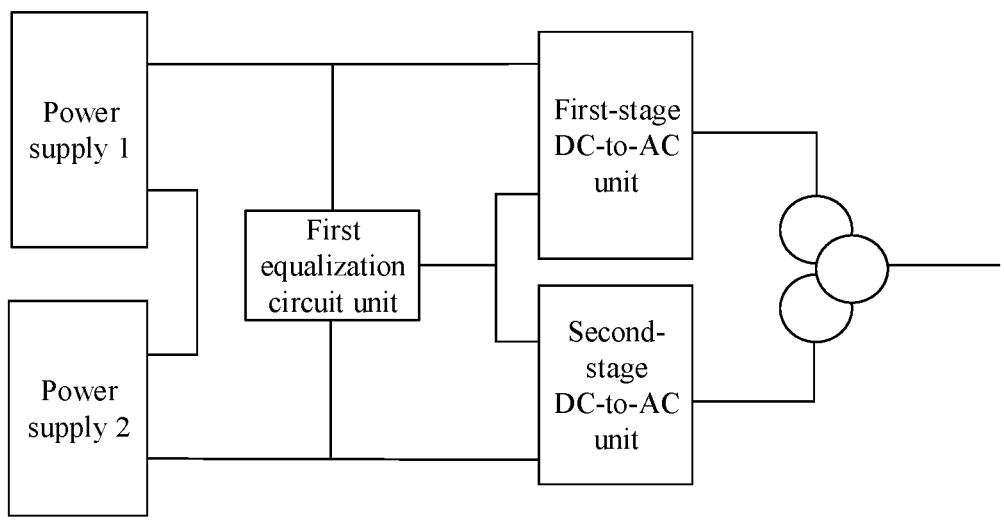
FIG. 9*a* is a schematic diagram of a power system that includes a first equalization circuit unit.

In some embodiments, the power system further includes a first equalization circuit unit. FIG. 9a is a schematic diagram of a power system that includes a first equalization circuit unit. The first equalization circuit unit is configured with a first interface, a second interface, and a third interface; the first interface is coupled to the second node; the second interface is coupled to a positive input terminal of a first-stage DC-to-AC unit; the third interface is coupled to a negative input terminal of a second-stage DC-to-AC unit. The first equalization circuit unit can balance input voltages and/or powers and/or currents of the first-stage DC-to-AC unit and the second-stage DC-to-AC unit. A working principle of the first equalization circuit unit is as follows: the first equalization circuit unit obtains energy from an input terminal of the first-stage DC-to-AC unit through the first interface and the second interface, and compensates the energy to the second-stage DC-to-AC unit through the first interface and the third interface; alternatively, the first equalization circuit unit obtains energy from an input terminal of the second-stage DC-to-AC unit through the first interface and the third interface, and compensates the energy to the first-stage DC-to-AC unit through the first interface and the second interface.

In some embodiments, the power system further includes a second equalization circuit unit. FIG. 9b1 is a schematic diagram of a power system that includes a second equalization circuit unit. FIG. 9b2 is a schematic diagram of a power system that includes a second equalization circuit unit. The second equalization circuit unit is configured with a fourth interface and a fifth interface. The fourth interface is coupled to the second node. The fifth interface is coupled to a positive input terminal of the first-stage DC-to-AC unit or coupled to a negative input terminal of the second-stage DC-to-AC unit. A working principle of the second equalization circuit unit is similar to the working principle of the first equalization circuit unit. In one embodiment, the second equalization circuit unit can compensate energy of the first-stage DC-to-AC unit to the second-stage DC-to-AC unit, or compensate energy of the second-stage DC-to-AC unit to the first-stage DC-to-AC unit. Therefore, the second equalization circuit unit can be configured to balance input voltages and/or powers and/or currents of the first-stage DC-to-AC unit and the second-stage DC-to-AC unit.

In some embodiments, the power system further includes a third equalization circuit unit. FIG. 9c is a schematic diagram of a power system that includes a third equalization circuit unit. The third equalization circuit unit is configured with a sixth interface, a seventh interface, and an eighth interface; the sixth interface is coupled to the first node; the seventh interface is coupled to a positive output terminal of the power supply 1; the eighth interface is coupled to a negative output terminal of the power supply 2. A working principle of the third equalization circuit unit is similar to the working principle of the first equalization circuit unit. In one embodiment, the third equalization circuit unit can compensate energy output by the power supply 1 to the power supply 2, or compensate energy output by the power supply 2 to the power supply 1. Therefore, the third equalization circuit unit can be configured to balance output voltages and/or powers and/or currents of the power supply 1 and the power supply 2.

In some embodiments, the power system further includes a fourth equalization circuit unit. FIG. 9d1 is a schematic diagram 1 of a power system that includes a fourth equalization circuit unit. FIG. 9d2 is a schematic diagram 2 of a power system that includes a fourth equalization circuit unit. The fourth equalization circuit unit is configured with a ninth interface and a tenth interface. The ninth interface is coupled to the first node. The tenth interface is coupled to a positive output terminal of the power supply 1 or to a negative output terminal of the power supply 2. A working principle of the fourth equalization circuit unit is similar to the working principle of the first equalization circuit unit. In one embodiment, the fourth equalization circuit unit can compensate energy output by the power supply 1 to the power supply 2, or compensate energy output by the power supply 2 to the power supply 1. Therefore, the fourth equalization circuit unit can be configured to balance output voltages and/or powers and/or currents of the power supply 1 and the power supply 2.

In some embodiments, output terminals of the first-stage DC-to-AC unit and the second-stage DC-to-AC unit are respectively coupled to different transformers: alternatively, output terminals of the first-stage DC-to-AC unit and the second-stage DC-to-AC unit are respectively coupled to different windings of a same transformer, to implement isolated output.

Figure 10A:
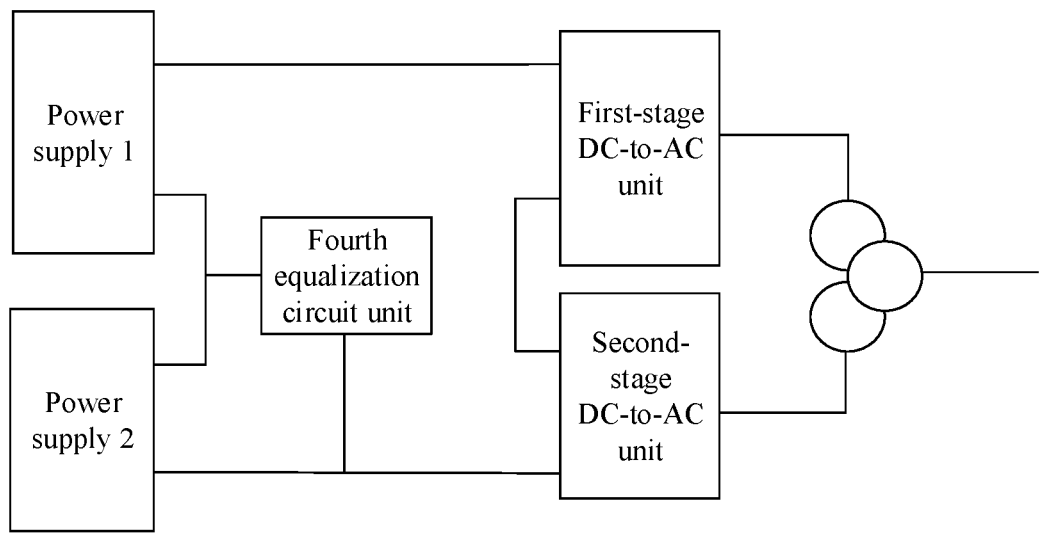
FIG. 10a is a schematic diagram of a plurality of combinations of power supplies connected in parallel according to an embodiment of this application.
Figure 10A:
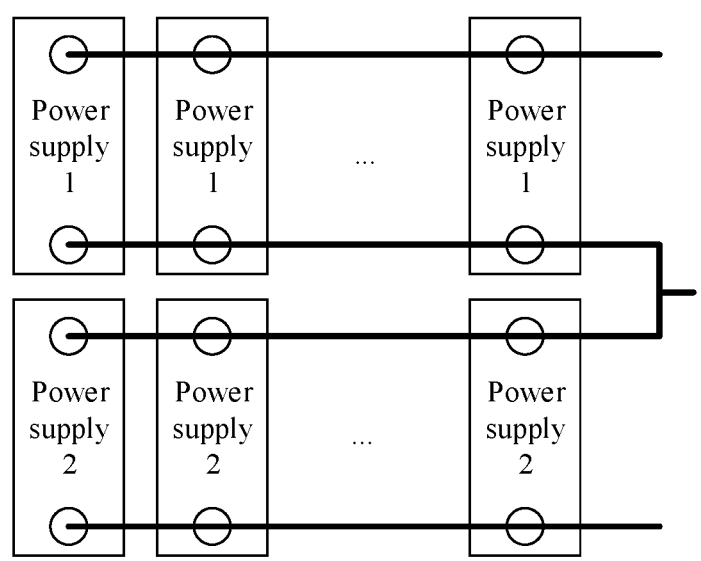
Figure 10B:
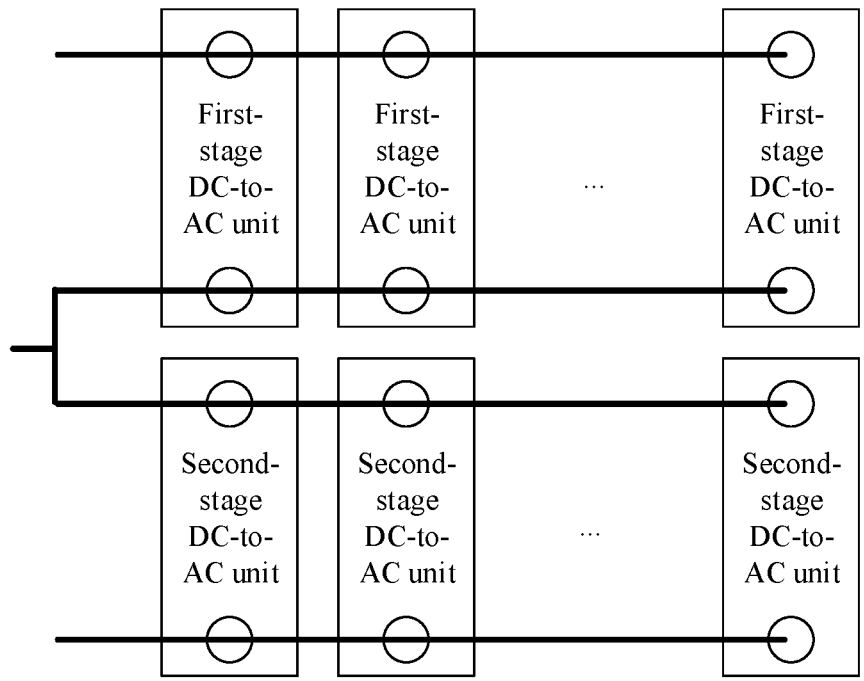
FIG. 10b is a schematic diagram of a plurality of combinations of DC-to-AC units connected in parallel according to an embodiment of this application.
Figure 10C:
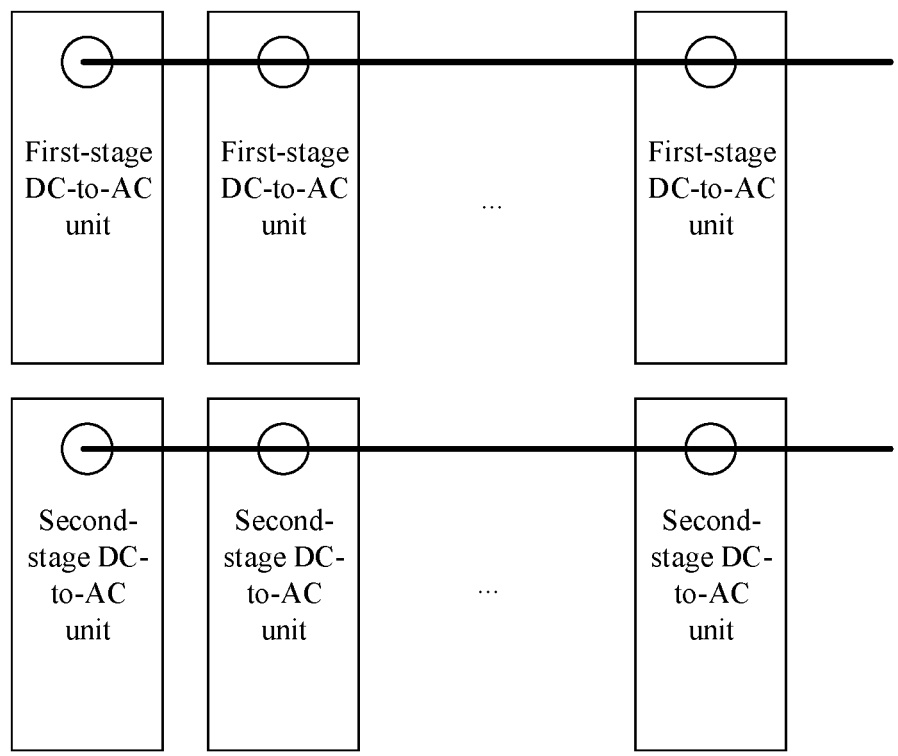
FIG. 10c is another schematic diagram of a plurality of combinations of DC-to-AC units connected in parallel according to an embodiment of this application.

In some embodiments, the power supply 1 and the power supply 2 are considered as one combination of power supplies, and the first-stage DC-to-AC unit and the second-stage DC-to-AC unit are considered as one combination of DC-to-AC units. FIG. 10a is a schematic diagram of a plurality of combinations of power supplies connected in parallel according to an embodiment of this application. As shown in FIG. 10a, when at least two combinations of power supplies are coupled, output terminals corresponding to a power supply 1 in a first combination of power supplies and to a power supply 1 in a second combination of power supplies are coupled in parallel. This is similar to the description of the combination of power supplies in Embodiment 1, and details are not described herein again. FIG. 10b is a schematic diagram of a plurality of combinations of DC-to-AC units connected in parallel according to an embodiment of this application. When at least two combinations of DC-to-AC units are connected in parallel, an input terminal of a first-stage DC-to-AC unit in a first combination of DC-to-AC units is connected in parallel to an input terminal of a first-stage DC-to-AC unit in a second combination of DC-to-AC units. This is similar to the description of the situation of the input terminal of the combination of DC-to-AC units in Embodiment 1, and details are not described herein again. FIG. 10c is another schematic diagram of a plurality of combinations of DC-to-AC units connected in parallel according to an embodiment of this application. When at least two combinations of DC-to-AC units are connected in parallel, an output terminal of a first-stage DC-to-AC unit in a first combination of DC-to-AC units and an output terminal of a first-stage DC-to-AC unit in a second combination of DC-to-AC units may be connected in parallel for output, or may be isolated for output. This is similar to the situation of the output terminal of the combination of DC-to-AC units in Embodiment 1, and details are not described herein again.

In some embodiments, an insulation monitoring device (IMD) is coupled between an output terminal of the first-stage DC-to-AC unit and a ground point. In some other embodiments, an IMD device is coupled between an output terminal of the second-stage DC-to-AC unit and a ground point. In some other embodiments, a first IMD device is coupled between an output terminal of the first-stage DC-to-AC unit and a ground point, and a second IMD device is coupled between an output terminal of the second-stage DC-to-AC unit and a ground point. The IMD device can detect insulation impedance of the power system to ground. When the insulation impedance to ground is less than a preset value, preferably, in this embodiment of this application, a coupling connection between the first-stage DC-to- AC unit and/or the second-stage DC-to-AC unit and a transformer winding may be broken, so that the entire system stops working, thereby further ensuring safety of system operation.

In this embodiment of this application, a communication signal is coupled to a direct current cable connected among the power supply 1, the power supply 2, the first-stage DC-to-AC unit, and the second-stage DC-to-AC unit. The communication signal is used to implement communication among the power supply 1, the power supply 2, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to an output terminal of the first-stage DC-to-AC unit, and the alternating current cable may be further coupled to another device. The first-stage DC-to-AC unit may communicate with another device on the alternating current cable by using the communication signal. When a plurality of combinations of DC-to-AC units are connected in parallel, and outputs of a plurality of first-stage DC-to-AC units are connected in parallel, the parallel output terminals of the plurality of first-stage DC-to-AC units may communicate with another device coupled to a connected alternating current cable by using a communication signal on the alternating current cable. The another device described above may be an alternating current device that uses an alternating current. Similarly, a communication situation of an output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

Figure 11:
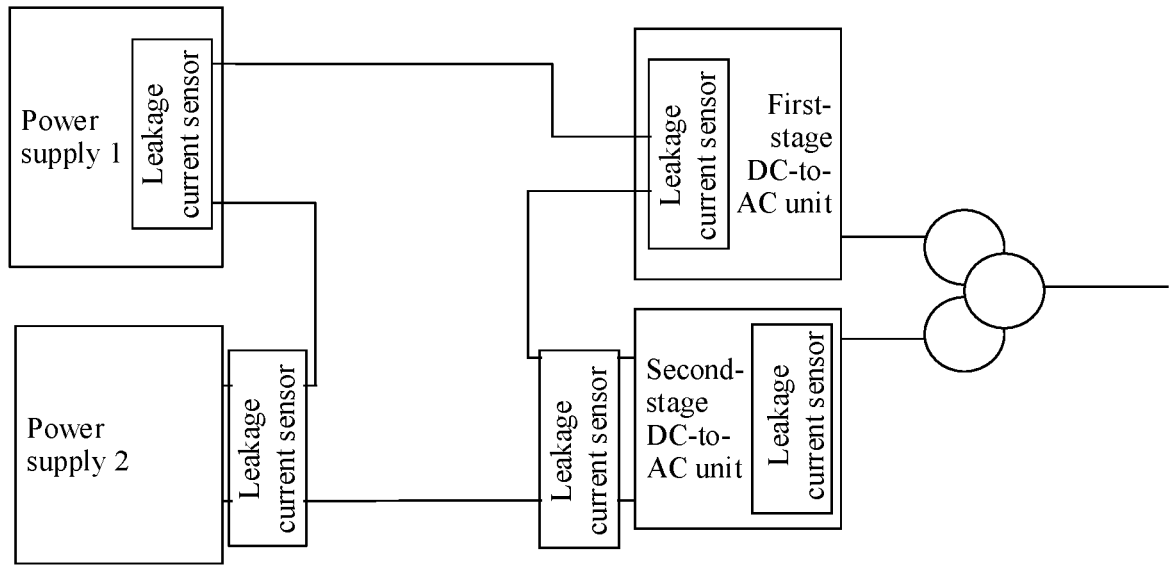
FIG. 11 is a schematic diagram of a power system with a leakage current sensor according to an embodiment of this application.

FIG. 11 is a schematic diagram of a power system with a leakage current sensor according to an embodiment of this application. As shown in FIG. 11, in some embodiments, a positive output terminal and a negative output terminal of the power supply 1 may be coupled to a leakage current sensor to detect a leakage current value at the output terminal of the power supply 1. The leakage current sensor may be embedded inside the power supply 1, or may be exposed outside the power supply 1. This is not limited in this embodiment of this application. A positive output terminal and a negative output terminal of the power supply 2 may be coupled to a leakage current sensor to detect a leakage current value at the output terminal of the power supply 2. The leakage current sensor may be embedded inside the power supply 2, or may be exposed outside the power supply 2. This is not limited in this embodiment of this application. A positive input terminal and a negative input terminal of the first-stage DC-to-AC unit may be coupled to a leakage current sensor to detect a leakage current at the input terminal of the first-stage DC-to-AC unit. The leakage current sensor may be embedded inside the first-stage DC-to-AC unit, or may be exposed outside the first-stage DC-to-AC unit. This is not limited in this embodiment of this application. An internal output phase line of the first-stage DC-to-AC unit may be coupled to a leakage current sensor to detect a leakage current at the output terminal of the first-stage DC-to-AC unit. The leakage current sensor is usually arranged inside the first-stage DC-to-AC unit. Similarly, the input terminal and the output terminal of the second-stage DC-to-AC unit may also be provided with a leakage current sensor like the first-stage DC-to-AC unit. Details are not described herein again. When any leakage current sensor detects that a corresponding leakage current value is greater than a preset threshold, the leakage current sensor may send a signal to any one or more or all of the power supply 1, the power supply 2, the first-stage DC-to-AC unit, and the second-stage DC-to-AC unit. Then, the any one or more or all of the power supply 1, the power supply 2, the first-stage DC-to-AC unit, and the second-stage DC-to-AC unit may report an alarm to a host computer connected thereto, or may send a signal to stop the power system, or process in another manner. This is not limited in this embodiment of this application.

In some embodiments, an internal output phase line connected to an output terminal of the first-stage DC-to-AC unit is connected in series to at least one switch, so as to implement fast shutdown of the output of the first-stage DC-to-AC unit. The switch may be a relay, a circuit breaker, or a conductor, or may be another type of switch. This is not limited in this embodiment of this application. Similarly, an internal output phase line connected to the output terminal of the second-stage DC-to-AC unit may also be connected in series to a switch. This is similar to the case in which the output phase line of the first-stage DC-to-AC unit is connected in series to a switch. Details are not described herein again.

In this embodiment of this application, when the power supply 1 and the power supply 2 are photovoltaic arrays, the power system may be referred to as a photovoltaic power generation system. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node is coupled to ground, so that when the output powers or output voltages of the power supply 1 and the power supply 2 are asymmetric, or the input powers or input voltages of the first-stage DC-to-AC unit and the second DC-to-AC unit are asymmetric, a current loop can be provided to achieve voltage equalization, thereby ensuring normal operation of the system, and saving costs of one cable and construction costs.

Figure 12A:
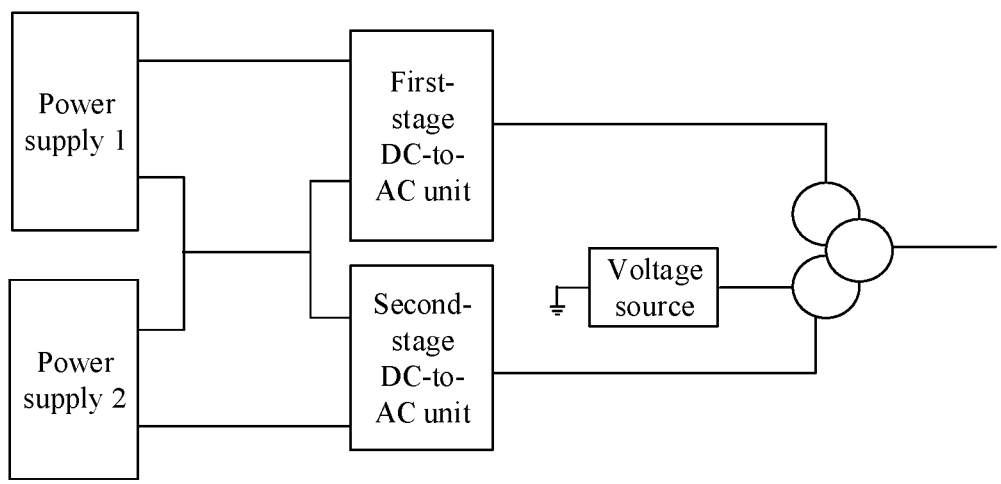
FIG. 12a is a schematic diagram 1 of a power system with a voltage source according to an embodiment of this application.

In the photovoltaic power generation system, a PID phenomenon may be eliminated by coupling a voltage source. FIG. 12a is a schematic diagram 1 of a power system with a voltage source according to an embodiment of this application. A voltage source is coupled between a neutral point of a transformer winding corresponding to the output terminal of the second-stage DC-to-AC unit and a ground point, so as to adjust a potential of the neutral point to ground. When the photovoltaic power generation system is normally connected to the grid for operation, the voltage source is used to inject a voltage and a current between the three-phase A/B/C and the ground, so as to ensure that voltages to ground at the negative output terminals of the power supply 1 and the power supply 2 are equal to 0, or voltages to ground at the positive output terminals of the power supply 1 and the power supply 2 are equal to 0. This prevents a battery panel in the photovoltaic array (the power supply 1 and the power supply 2) from generating a PID phenomenon. In addition, in this embodiment of this application, voltages may be adjusted so that voltages to ground at the negative output terminals of the power supply 1 and the power supply 2 are greater than 0 (for a battery panel that generates a PID phenomenon when the voltage to ground at the negative output terminal PV− is less than 0), or voltages to ground at the positive output terminals of the power supply 1 and the power supply 2 are less than 0 (for a battery panel that generates a PID phenomenon when the voltage to ground at the positive output terminal PV+ is greater than 0). This implements a PID repair function of the battery panel, and ensures that the voltages to ground at the positive output terminals and the negative output terminals of the power supply 1 and the power supply 2 do not exceed a maximum applied system voltage of the battery panel, thereby ensuring system safety. The voltage can also be adjusted by coupling a voltage source between a neutral point of a transformer winding corresponding to the output terminal of the first-stage DC-to-AC unit and a ground point. This is similar to the foregoing principle of coupling a voltage source between a neutral point of a transformer winding corresponding to the output terminal of the second-stage DC-to-AC unit and a ground point, and details are not described herein again.

Figure 12B:
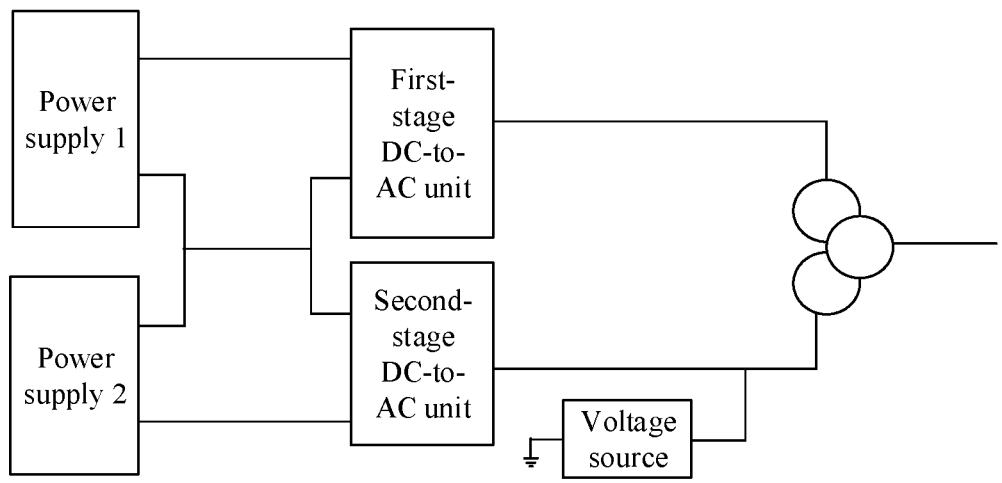
FIG. 12b is a schematic diagram 2 of a power system with a voltage source according to an embodiment of this application.

FIG. 12*b* is a schematic diagram 2 of a power system with a voltage source according to an embodiment of this application. In this embodiment, a voltage source is coupled between an output-side external phase line of the second-stage DC-to-AC unit and a ground point, to adjust a potential of the corresponding output phase line to ground. For example, when the output-side external phase lines are ABC lines, the voltage source may be separately connected to three lines, that is. ABC lines. When the photovoltaic power generation system is normally connected to the grid for operation, the voltage source is used to inject a voltage and a current between the three-phase A/B/C and the ground, so as to ensure that voltages to ground at the negative output terminals of the power supply 1 and the power supply 2 are equal to 0, or voltages to ground at the positive output terminals of the power supply 1 and the power supply 2 are equal to 0. This prevents a battery panel in the photovoltaic array (the power supply 1 and the power supply 2) from generating a PID phenomenon. This is similar to the foregoing principle of coupling a voltage source between a neutral point of a transformer winding corresponding to the output terminal of the second-stage DC-to-AC unit and a ground point. This is also similar to the principle of coupling a voltage source between an output-side external phase line of the first-stage DC-to-AC unit and a ground point, and details are not described herein again.

Figure 12C:
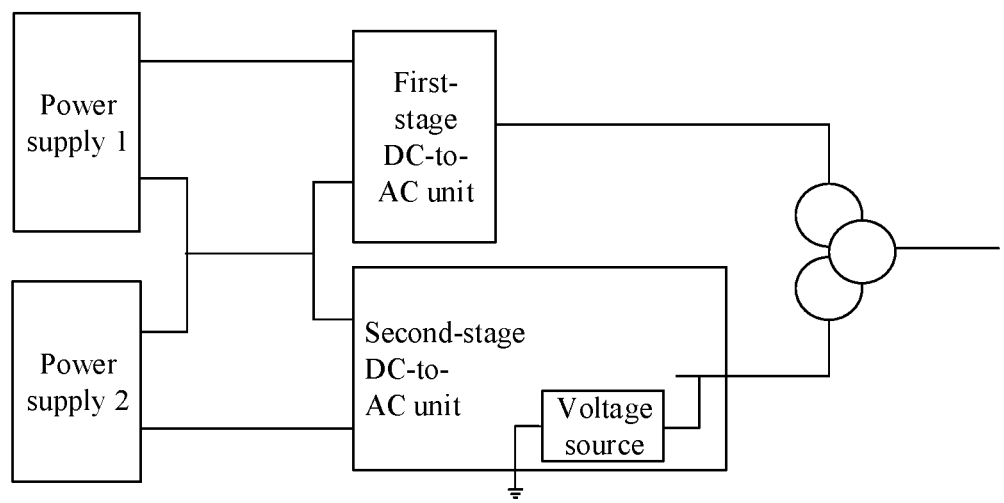
FIG. 12c is a schematic diagram 3 of a power system with a voltage source according to an embodiment of this application.

FIG. 12*c* is a schematic diagram 3 of a power system with a voltage source according to an embodiment of this application. In this embodiment, a voltage source is coupled between an internal phase line at the output terminal of the second-stage DC-to-AC unit and a ground point, to adjust a potential of the corresponding output phase line to ground. When the photovoltaic power generation system is normally connected to the grid for operation, the voltage source is used to inject a voltage and a current between the three-phase A/B/C and the ground, so as to ensure that voltages to ground at the negative output terminals of the power supply 1 and the power supply 2 are equal to 0, or voltages to ground at the positive output terminals of the power supply 1 and the power supply 2 are equal to 0. This prevents a battery panel in the photovoltaic array (the power supply 1 and the power supply 2) from generating a PID phenomenon. This is similar to the foregoing principle of coupling a voltage source between a neutral point of a transformer winding corresponding to the output terminal of the second-stage DC-to-AC unit and a ground point, and details are not described herein again. This is also similar to the principle of coupling a voltage source between an internal phase line at the output terminal of the first-stage DC-to-AC unit and a ground point, and details are not described herein again.

In some possible embodiments, the voltage source may alternatively be replaced by a compensation power module, to implement a similar function. Details are not described herein again.

Figure 13:
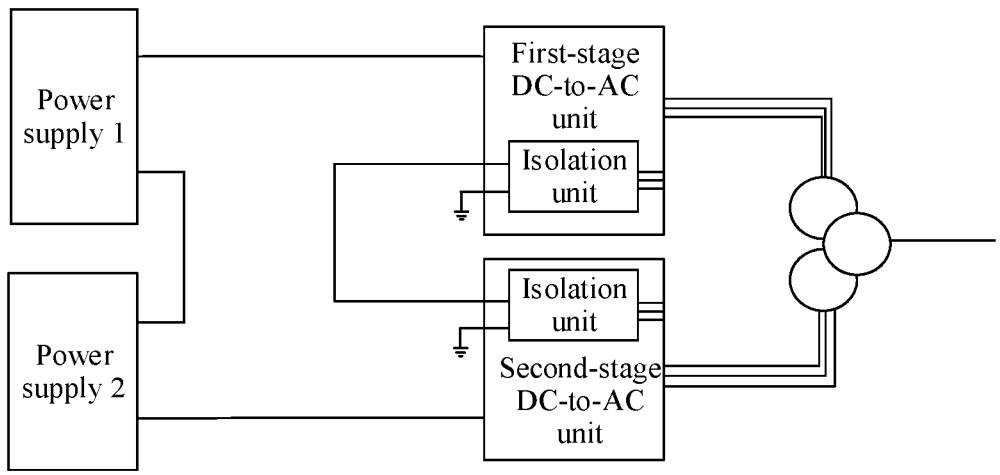
FIG. 13 is a schematic diagram of a power system with an isolation unit according to an embodiment of this application.

FIG. 13 is a schematic diagram of a power system with an isolation unit according to an embodiment of this application. In a photovoltaic power generation system, the first-stage DC-to-AC unit may further include an AC-to-DC isolation unit. An input terminal of the isolation unit is coupled to an internal phase line at the output terminal of the first-stage DC-to-AC unit. A first output terminal of the isolation unit is coupled to ground, and a second output terminal of the isolation unit is coupled to a positive input terminal and/or a negative input terminal of the first-stage DC-to-AC unit. The isolation unit can be configured to adjust an output voltage to ground of the first power supply and/or the second power supply. Similarly, the second-stage DC-to-AC unit may also include an AC-to-DC isolation unit. An input terminal of the isolation unit may be coupled to an internal phase line at the output terminal of the second-stage DC-to-AC unit. A first output terminal of the isolation unit is coupled to ground, and a second output terminal of the isolation unit is coupled to a positive input terminal and/or a negative input terminal of the second-stage DC-to-AC unit. The isolation unit is configured to adjust an output voltage to ground of the first power supply and/or the second power supply, so as to eliminate a PID phenomenon.

In some cases, an isolation unit is arranged inside the first-stage DC-to-AC unit, and no isolation unit is arranged inside the second-stage DC-to-AC unit. In some other cases, no isolation unit is arranged inside the first-stage DC-to-AC unit, and an isolation unit is arranged inside the second-stage DC-to-AC unit. In some other cases, an isolation unit is arranged inside the first-stage DC-to-AC unit and inside the second-stage DC-to-AC unit. The isolation unit inside the first-stage DC-to-AC unit may be referred to as a first AC-to-DC isolation unit, and the isolation unit inside the second-stage DC-to-AC unit may be referred to as a second AC-to-DC isolation unit. This is not limited in this embodiment of this application.

In some embodiments, in the photovoltaic power generation system, the first power supply and the second power supply are photovoltaic arrays, and may be photovoltaic arrays formed through series/parallel connection after an output terminal of the photovoltaic panel is connected in series to an optimizer or a shutdown device, as shown in FIG. 3*b*. In this photovoltaic system, a communication signal may be coupled to a direct current cable connected to an output terminal of the optimizer or the shutdown device, and the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

Figure 14A:
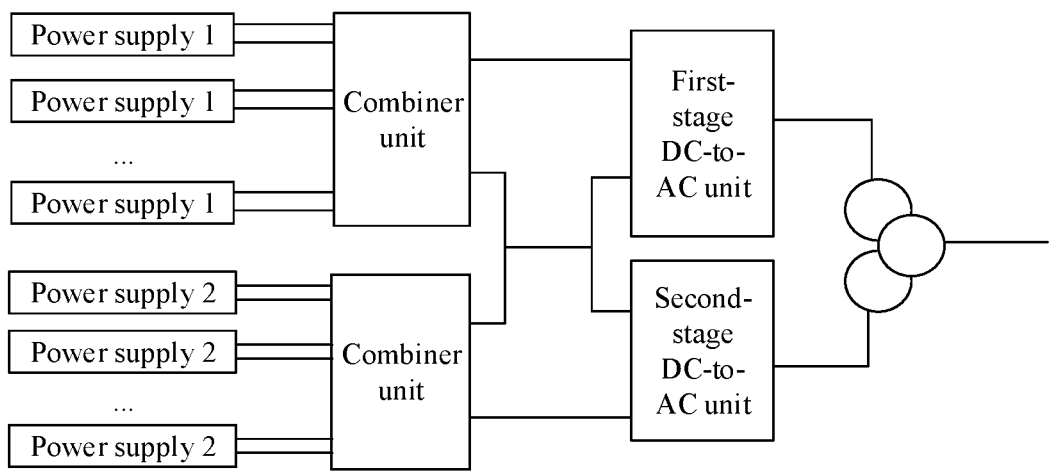
FIGS. 14a and 14b are schematic diagrams of a power system having a combiner unit according to an embodiment of this application.
Figure 14B:
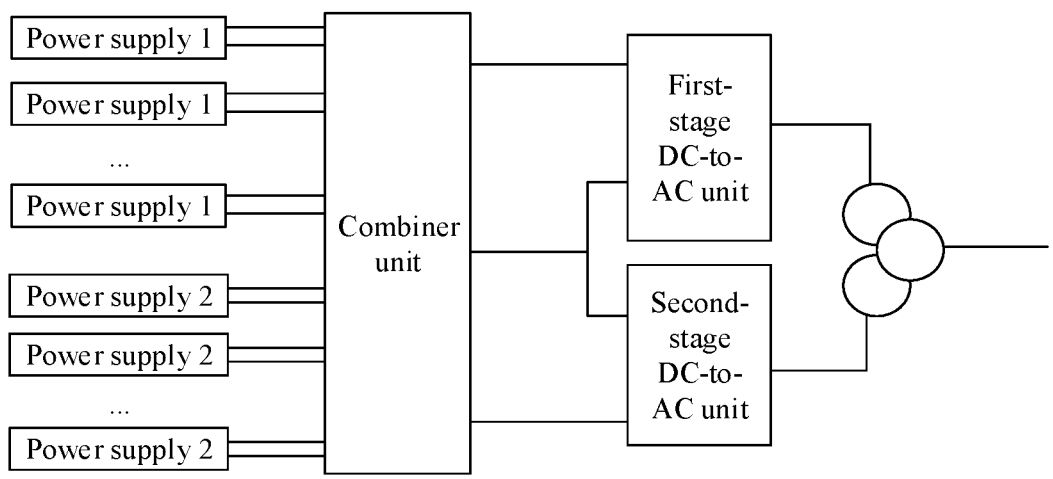

In some embodiments, the photovoltaic power generation system may further include a combiner unit. FIGS. 14*a* and 14*b* are schematic diagrams of a power system having a combiner unit according to an embodiment of this application. The photovoltaic power generation system includes two combiner units, where one combiner unit is a first combiner unit, and the other combiner unit is a second combiner unit. An input terminal of the first combiner unit is coupled to an output terminal of the power supply 1. A positive output terminal of the first combiner unit is coupled to a positive input terminal of the first-stage DC-to-AC unit. A negative output terminal of the first combiner unit is coupled to a positive output terminal of the second combiner unit and then coupled to the second node. A negative output terminal of the second combiner unit is coupled to a negative input terminal of the second-stage DC-to-AC unit. After the output negative end of the first busbar unit is coupled to the output positive end of the second busbar unit, coupling is implemented with the second node using a cable. Alternatively, the output negative end of the first bus unit and the output positive end of the second bus unit are coupled and grounded, and the second node is grounded, and coupling is implemented by respectively grounding. The cable or the respective coupling manner may provide a current loop when the output power or output voltage of the first bus unit and the second bus unit are asymmetric, or when the input power or input voltage of the first stage DC-to-AC unit are asymmetric, so as to ensure normal operation of the system. At least one cable cost and construction cost can be saved. In actual application, a direct current cable connected to a positive output terminal of the first combiner unit may be referred to as a positive bus, and a direct current cable connected to a negative output terminal of the first combiner unit may be referred to as a negative bus. The same rule applies to the second combiner unit, and details are not described herein again. The photovoltaic power generation system using a combiner unit may be connected to more power supplies 1 and power supplies 2, thereby improving photovoltaic power generation efficiency. In some embodiments, the photovoltaic power generation system may include a combiner unit. An input terminal of the combiner unit may be coupled to an output terminal of the power supply 1, or may be coupled to an output terminal of the power supply 2. The combiner unit has three output terminals. A first output terminal is coupled to the positive input terminal of the first-stage DC-to-AC unit, a second output terminal is coupled to the second node, and a third output terminal is coupled to the negative input terminal of the second-stage DC-to-AC unit. It may be understood that, the first output terminal, the second output terminal, and the third output terminal are only names in a relatively broad sense. In actual application, the output terminal may alternatively have another proper name. This is not limited in this embodiment of this application. The second output end of the busbar unit is coupled to the second node by using a cable. Alternatively, the second output end of the bus unit is grounded, and the second node is grounded, and coupling is implemented by grounding respectively. The cable or the coupling manner of each grounding can provide a current loop when the output power or output voltage of the bus unit is asymmetric, or when the input power or input voltage of the first-stage DC-to-AC unit and the second-stage DC-to-AC unit are asymmetric, so as to ensure normal operation of the system. At least one cable cost and construction cost can be saved. In addition, in actual application, a direct current cable connected to the first output terminal of the combiner unit may be referred to as a positive bus, and a direct current cable connected to the third output terminal of the combiner unit may be referred to as a negative bus. The photovoltaic power generation system using a combiner unit may be connected to more power supplies 1 and power supplies 2, thereby improving photovoltaic power generation efficiency.

Figure 15A:
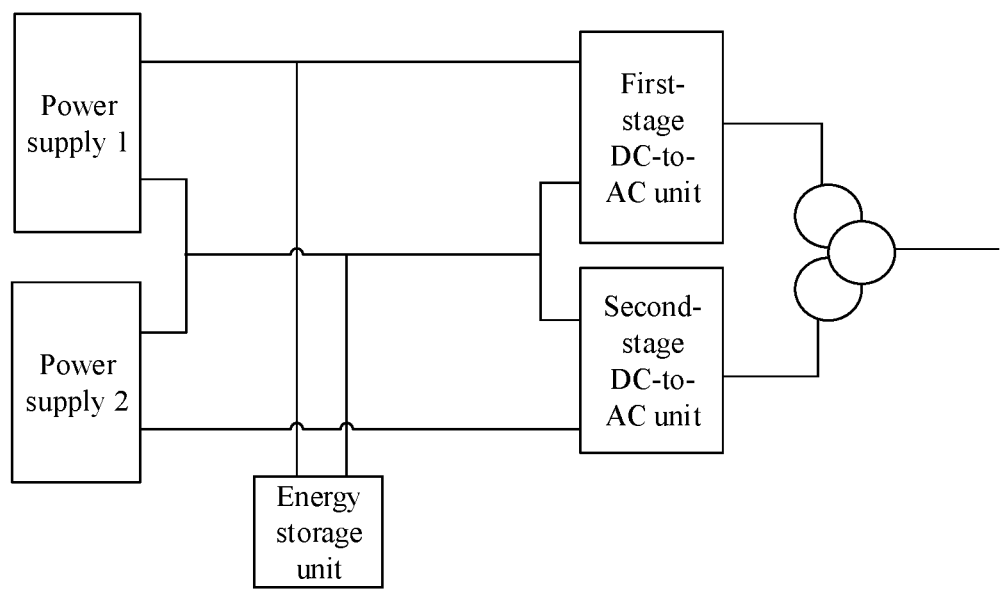
FIG. 15a is a schematic diagram 1 of a power system that includes an energy storage unit according to an embodiment of this application.
Figure 15B:
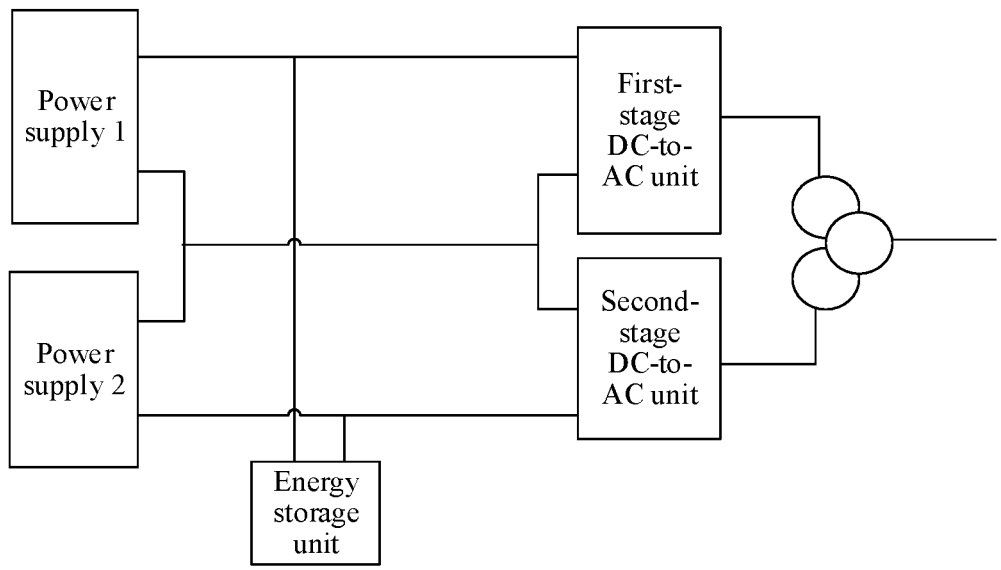
FIG. 15b is a schematic diagram 2 of a power system that includes an energy storage unit according to an embodiment of this application.
Figure 15C:
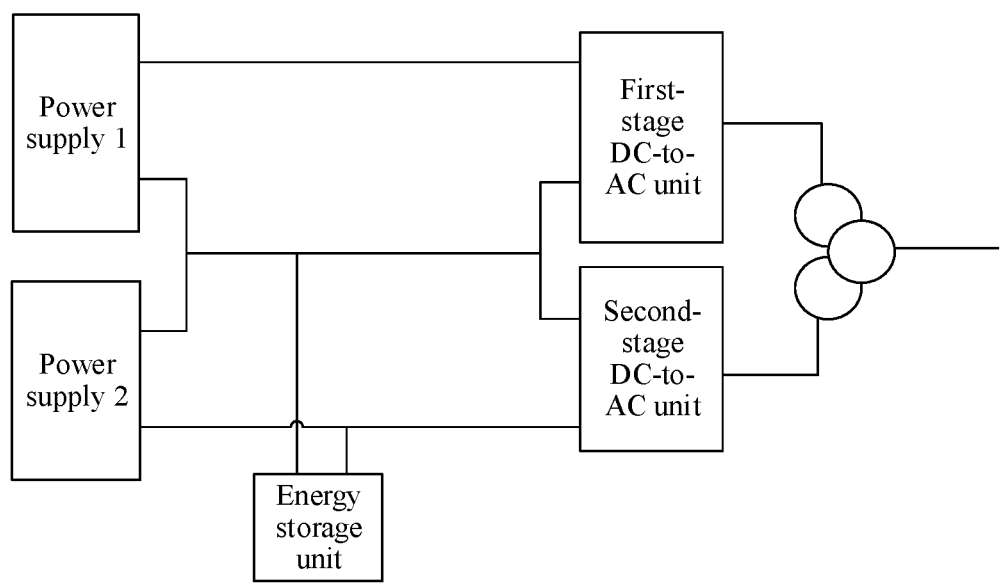
FIG. 15c is a schematic diagram 3 of a power system that includes an energy storage unit according to an embodiment of this application.
Figure 15D:
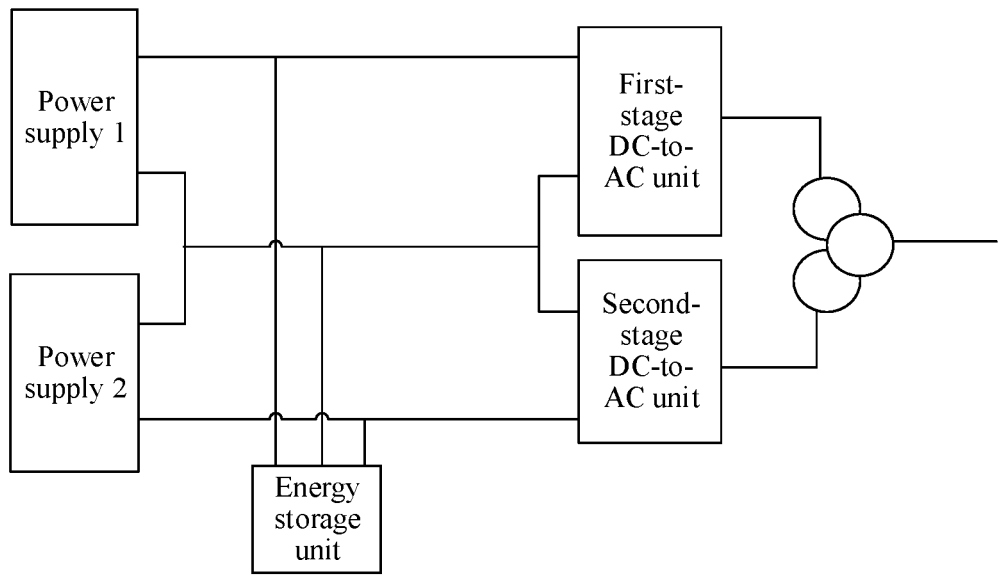
FIG. 15d is a schematic diagram 4 of a power system that includes an energy storage unit according to an embodiment of this application.

In some embodiments, the photovoltaic power generation system may further include at least one energy storage unit. At least two direct current cables connected to the power supply 1, the power supply 2, the first-stage DC-to-AC unit, and the second-stage DC-to-AC unit are coupled in parallel to the energy storage unit. FIG. 15a is a schematic diagram 1 of a power system that includes an energy storage unit according to an embodiment of this application. In this embodiment of this application, the positive output terminal of the power supply 1 is coupled to the positive input terminal of the first-stage DC-to-AC unit by using a first direct current cable. The first node is coupled to the second node by using a second direct current cable. The negative output terminal of the power supply 2 is coupled to the negative input terminal of the second-stage DC-to-AC unit by using a third direct current cable. The energy storage unit is coupled in parallel to the first direct current cable and the second direct current cable. FIG. 15b is a schematic diagram 2 of a power system that includes an energy storage unit according to an embodiment of this application. The energy storage unit is coupled in parallel to the first direct current cable and the third direct current cable. FIG. 15c is a schematic diagram 3 of a power system that includes an energy storage unit according to an embodiment of this application. The energy storage unit is coupled in parallel to the second direct current cable and the third direct current cable. FIG. 15d is a schematic diagram 4 of a power system that includes an energy storage unit according to an embodiment of this application. The energy storage unit is coupled in parallel to three direct current cables. In the photovoltaic system provided in this embodiment of this application, the energy storage unit can collect energy and provide the energy to an apparatus connected to the energy storage unit.

In the embodiment with the energy storage unit, the energy storage unit may be an energy storage device, or may include a direct current conversion unit and an energy storage device. This is similar to the description of the energy storage unit in Embodiment 1, and details are not described herein again.

In the embodiment with the energy storage unit, the energy storage unit may communicate with the power supply 1, the power supply 2, the first-stage DC-to-AC unit, and the second-stage DC-to-AC unit by using a communication signal coupled to a direct current cable. This is similar to the description of the energy storage unit in Embodiment 1, and details are not described herein again.

Embodiment 3

Figure 16:
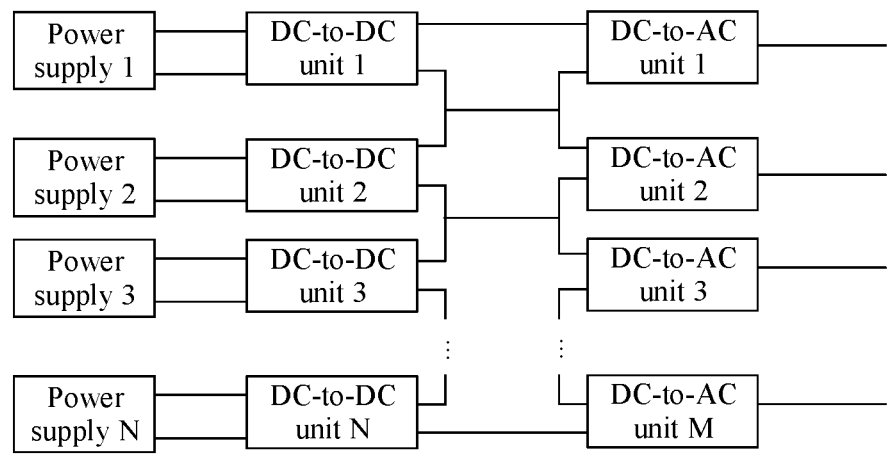
FIG. 16 is a schematic diagram of Embodiment 3 of a power system according to an embodiment of this application.

FIG. 16 is a schematic diagram of Embodiment 3 of a power system according to an embodiment of this application. The power system includes N power supplies. N DC-to-DC units, and M DC-to-AC units. The N power supplies include a power supply 1, a power supply 2, . . . , and a power supply N. These power supplies may be photovoltaic arrays, energy storage power supplies, wind power generation direct current sources, or the like, which is similar to Embodiment 1. Details are not described herein again. The M DC-to-AC units include a DC-to-AC unit 1, a DC-to-AC unit 2, . . . , and a DC-to-AC unit M. These DC-to-AC units may be apparatuses that can convert a direct current into an alternating current, for example, an inverter. This is similar to Embodiment 1, and details are not described herein again.

Figure 17:
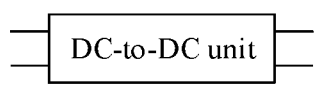
FIG. 17 is a schematic diagram of a DC-to-DC unit according to an embodiment of this application.

FIG. 17 is a schematic diagram of a DC-to-DC unit according to an embodiment of this application. In this embodiment of this application, the N DC-to-DC units include a DC-to-DC unit 1, a DC-to-DC unit 2, . . . , and a DC-to-DC unit N. As shown in FIG. 17, each DC-to-DC unit may be configured with a positive input terminal, a negative input terminal, a positive output terminal, and a negative output terminal. For ease of description, in this embodiment of this application, unless otherwise specified or marked, generally, an input terminal in the upper left part of the DC-to-DC unit is referred to as a positive input terminal, an input terminal in the lower left part is referred to as a negative input terminal, an output terminal in the upper right part is referred to as a positive output terminal, and an output terminal in the lower right part is referred to as a negative output terminal. It may be understood that, in this embodiment of this application, the DC-to-DC unit may be an apparatus that can convert a direct current into a direct current, for example, a DC/DC converter. This is not limited in this embodiment of this application.

As shown in FIG. 16, the output terminal of the power supply 1 is coupled to the input terminal of the DC-to-DC unit 1. In one embodiment, the positive output terminal of the power supply 1 is coupled to the positive output terminal of the DC-to-DC unit 1, and the negative output terminal of the power supply 1 is coupled to the negative output terminal of the DC-to-DC unit 1. Coupling between another power supply and another DC-to-DC unit is similar to the coupling described herein. For example, an output terminal of the power supply 2 is coupled to an input terminal of the DC-to-DC unit 2. Details are not described herein again.

It may be understood that, the power supply number, the DC-to-DC unit number, and the DC-to-AC unit number in this embodiment of this application are used for ease of description, so that sequence numbers from 1 to N or M are used, and do not represent an actual sequence. In actual application, each power supply, each DC-to-DC unit, and each DC-to-AC unit may be numbered based on an actual situation. This is not limited in this embodiment of this application.

As shown in FIG. 16, a positive output terminal of the DC-to-DC unit 1 is coupled to a positive input terminal of the DC-to-AC unit 1, and a negative output terminal of the DC-to-DC unit N is coupled to a negative input terminal of the DC-to-AC unit M. A negative output terminal of the DC-to-DC unit 1 is coupled to a positive output terminal of the DC-to-DC unit 2, and a coupling node is referred to as a first node; a negative output terminal of the DC-to-DC unit 2 is coupled to a positive output terminal of the DC-to-DC unit 3, and a coupling node is referred to as a first node, . . . , and so on, so as to form a plurality of first nodes. A negative input terminal of the DC-to-AC unit 1 is coupled to a positive input terminal of the DC-to-AC unit 2, and a coupling node is referred to as a second node; a negative input terminal of the DC-to-AC unit 2 is coupled to a positive input terminal of the DC-to-AC unit 3, and a coupling node is referred to as a second node, . . . , and so on, so as to form a plurality of second nodes. In this embodiment of this application, output terminals of the DC-to-DC units are cascaded, and input terminals of the DC-to-AC units are cascaded. The output terminals of the DC-to-DC units are cascaded to increase an output voltage, so as to reduce a current between the DC-to-DC unit and the DC-to-AC unit, and resolve cost and loss problems of the cable from the DC-to-DC unit to the DC-to-AC unit. For example, a maximum output voltage of each DC-to-DC unit is X volts, and a maximum output voltage after the N DC-to-DC units are cascaded is NX volts. In a case of the same power, when a voltage increases, an output current decreases, a wire diameter specification of a used cable decreases, and costs decrease.

In this embodiment of this application, at least one first node and at least one second node are coupled. For example, in some embodiments, one first node is coupled to one second node, and the other first nodes and the other second nodes are not coupled. In some other embodiments, two first nodes are respectively coupled to two second nodes, and the other first nodes and the other second nodes are not coupled. In some other embodiments, a quantity of first nodes is equal to a quantity of second nodes, and each first node is coupled to a corresponding second node. In some other embodiments, a quantity of first nodes is different from a quantity of second nodes, each first node is coupled to a corresponding second node, and a remaining first node or a remaining second node is not coupled. In actual application, another coupling manner may alternatively be used. This is not limited in this embodiment of this application. In this embodiment of this application, a quantity of cables connected between the DC-to-DC unit and the DC-to-AC unit is reduced in a manner of the first node and the second node, thereby reducing costs of the power system.

In this embodiment of this application, output terminals of DC-to-AC units are isolated for output. For example, an output terminal of the DC-to-AC unit 1 is isolated from an output terminal of the DC-to-AC unit 2, and an output terminal of the DC-to-AC unit 2 is isolated from an output terminal of the DC-to-AC unit 3. In actual application, an output terminal of each DC-to-AC unit is coupled to different windings, and each winding may output a three-phase voltage or a single-phase voltage. This is not limited in this embodiment of this application. In this embodiment of this application, cascaded input and isolated output of the DC-to-AC unit can reduce a specification of a power conversion device. Therefore, problems of insufficient specifications (generally up to 1700 V for an insulated gate bipolar transistor (IGBT)) and high costs of power conversion devices in the current industry are resolved. In addition, a circuit breaker with a relatively low specification may be used to reduce costs.

In some embodiments, the power supply 1, the power supply 2, . . . , and the power supply N in FIG. 16 may be considered as one combination of power supplies; the DC-to-DC unit 1, the DC-to-DC unit 2, . . . , and the DC-to-DC unit N may be considered as one combination of DC-to-DC units; and the DC-to-AC unit 1, the DC-to-AC unit 2, . . . , and the DC-to-AC unit M may be considered as one combination of DC-to-AC units. Therefore, one power system includes at least one combination of power supplies, one combination of DC-to-DC units, and one combination of DC-to-AC units. When there are a plurality of combinations of DC-to-DC units and/or a plurality of combinations of DC-to-AC units, similar output terminals of at least two combinations of DC-to-DC units are connected in parallel, and similar input terminals of at least two combinations of DC-to-AC units are connected in parallel. There is at least one cable coupling connection between the similar output terminals connected in parallel and the similar input terminals connected in parallel. Meanings of similar output terminals and similar input terminals are similar to those described in Embodiment 1, and details are not described herein again. It may be understood that output terminals of the DC-to-DC unit 1, the DC-to-DC unit 2, . . . , and the DC-to-DC unit N may be cascaded to form at least one first node. The input terminals of the DC-to-AC unit 1, the DC-to-AC unit 2, . . . , and the DC-to-AC unit M may be cascaded to form at least one second node. The at least one first node is coupled to the at least one second node, that is, there is at least one cable coupling connection between the similar output terminals connected in parallel and the similar input terminals connected in parallel. In this embodiment of this application, if there are a plurality of combinations of power supplies, the plurality of combinations of power supplies may be connected in series/parallel, and then be connected to a combination of DC-to-DC units. A coupling connection manner of these power supplies is not limited in this embodiment of this application.

In this embodiment of this application, similar output terminals of a plurality of combinations of DC-to-AC units may be coupled in parallel, or may be isolated for output. This is similar to the description corresponding to FIG. 5c in the foregoing embodiment, and details are not described herein again.

In some embodiments, a communication signal is coupled to a direct current cable connected between the power supply and the DC-to-DC unit, and a communication signal is also coupled to a direct current cable connected between the DC-to-DC unit and the DC-to-AC unit. Preferably, the communication signal may be a PLC signal. This is similar to the description of the communication signal in Embodiment 1, and details are not described herein again. In actual application, the power system may use a power supply, a DC-to-DC unit, and a DC-to-AC unit that can recognize a communication signal, or may modify a power supply, a DC-to-DC unit, and a DC-to-AC unit so that the power supply, the DC-to-DC unit, and the DC-to-AC unit can recognize a communication signal. This is not limited in this embodiment of this application.

In some embodiments, the power supply is a photovoltaic array formed by connecting an output of a photovoltaic panel to an optimizer or a shutdown device, and then performing series/parallel combination. When a communication signal is coupled to the direct current cable connected among the power supply, the DC-to-DC unit, and the DC-to-AC unit, the communication signal also passes through the optimizer or the shutdown device, and the power supply, the DC-to-DC unit, or the DC-to-AC unit may control, by using the communication signal, the shutdown of the optimizer or the shutdown device, so as to implement fast shutdown. That is, the power supply, the DC-to-DC unit, or the DC-to-AC unit may send a communication signal that carries a shutdown instruction to the optimizer or the shutdown device. After receiving the communication signal that carries the shutdown instruction, the optimizer or the shutdown device executes the shutdown instruction, so as to implement fast shutdown. A situation of the communication signal is similar to the description of the communication signal in Embodiment 1, and details are not described herein again.

In some embodiments, the power system further includes at least one energy storage unit. The energy storage unit is coupled in parallel to at least two direct current cables connected between the DC-to-DC unit and the DC-to-AC unit. In this embodiment of this application, the direct current cable connected between the DC-to-DC unit and the DC-to-AC unit may be a direct current cable for coupling a positive output terminal of the DC-to-DC unit 1 and a positive input terminal of the DC-to-AC unit 1; may be a direct current cable for coupling a negative output terminal of the DC-to-DC unit N and a negative input terminal of the DC-to-AC unit M; or may be a direct current cable for coupling the first node and the second node. For example, the energy storage unit is coupled in parallel between a direct current cable for coupling a positive output terminal of the DC-to-DC unit 1 and a positive input terminal of the DC-to-AC unit 1, and a direct current cable for coupling a negative output terminal of the DC-to-DC unit N and a negative input terminal of the DC-to-AC unit M. Alternatively, the energy storage unit is coupled in parallel among three direct current cables for coupling the first node and the second node. It may be understood that a quantity of energy storage units included in one power system is not limited, that is, a plurality of energy storage units may be coupled in parallel at the same time. This is not limited in this embodiment of this application.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Embodiment 4

Figure 18:
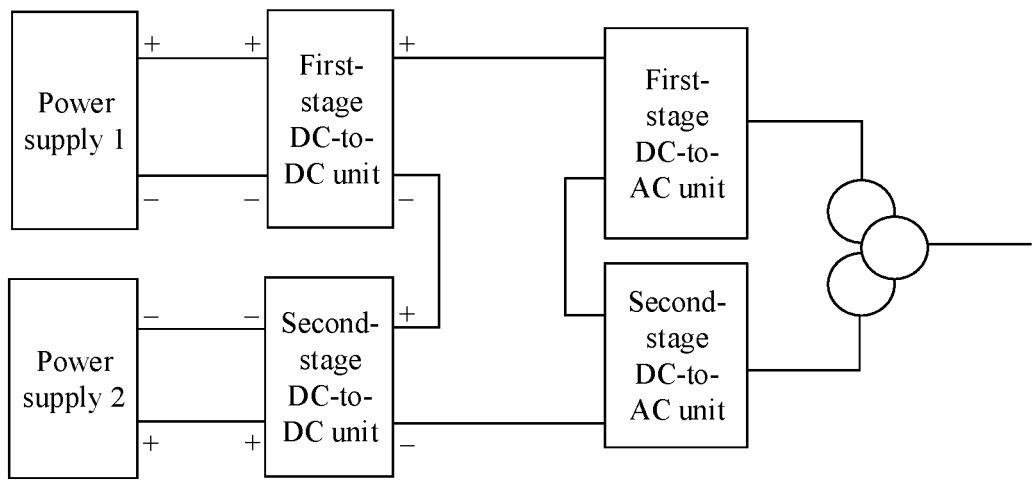
FIG. 18 is a schematic diagram of Embodiment 4 of a power system according to an embodiment of this application.

FIG. 18 is a schematic diagram of Embodiment 4 of a power system according to an embodiment of this application. The power system includes a power supply 1, a power supply 2, a first-stage DC-to-DC unit, a second-stage DC-to-DC unit, a first-stage DC-to-AC unit, and a second-stage DC-to-AC unit. The power supply 1 and the power supply 2 may be photovoltaic arrays, energy storage power supplies, or wind power generation direct current sources, which are similar to the power supplies in Embodiment 1. Details are not described herein again. The first-stage DC-to-DC unit and the second-stage DC-to-DC unit are similar to the DC-to-DC units in Embodiment 3, and details are not described herein again. The first-stage DC-to-AC unit and the second-stage DC-to-AC unit may be apparatuses that can convert a direct current into an alternating current, for example, an inverter. These DC-to-AC units are similar to the DC-to-AC units in Embodiment 1, and details are not described herein again.

In this embodiment of this application, an output terminal of the power supply 1 is coupled to an input terminal of the first-stage DC-to-DC unit. For example, a positive output terminal of the power supply 1 is coupled to a positive input terminal of the first-stage DC-to-DC unit, and a negative output terminal of the power supply 1 is coupled to a negative input terminal of the first-stage DC-to-DC unit. Similarly, an output terminal of the power supply 2 is coupled to an input terminal of the second-stage DC-to-DC unit. As shown in FIG. 18, a mark "+" and a mark "−" are added to corresponding positions of input terminals and output terminals of the power supply 1, the power supply 2, the first-stage DC-to-DC unit, and the second-stage DC-to-DC unit. The mark "+" indicates a positive output terminal or a positive input terminal. The mark "−" indicates a negative output terminal or a negative input terminal. Meanings of the mark "+" and the mark "−" in other drawings provided in this embodiment of this application are similar. Details are not described again.

In this embodiment of this application, a positive output terminal of the first-stage DC-to-DC unit is coupled to a positive input terminal of the first-stage DC-to-AC unit; a negative output terminal of the second-stage DC-to-DC unit is coupled to a negative input terminal of the second-stage DC-to-AC unit; a negative output terminal of the first-stage DC-to-DC unit is coupled to a positive output terminal of the second-stage DC-to-DC unit; a negative input terminal of the first-stage DC-to-AC unit is coupled to a positive input terminal of the second-stage DC-to-AC unit. Therefore, outputs of the first-stage DC-to-DC unit and the second-stage DC-to-DC unit are cascaded, and inputs of the first-stage DC-to-AC unit and the second-stage DC-to-AC unit are cascaded. In this embodiment of this application, the output terminals of the DC-to-DC units are cascaded to increase an output voltage, so as to reduce a current between the DC-to-DC unit and the DC-to-AC unit, and resolve cost and loss problems of the cable from the DC-to-DC unit to the DC-to-AC unit. For example, a maximum output voltage of the first-stage DC-to-DC unit and the second-stage DC-to-DC unit is 1500 V. and after outputs of the first-stage DC-to-DC unit and the second-stage DC-to-DC unit are cascaded, the maximum output voltage is 3K V. In a case of the same power, when a voltage increases, an output current decreases, a wire diameter specification of a used cable decreases, and costs decrease.

In this embodiment of this application, output terminals of the first-stage DC-to-AC unit and the second-stage DC-to-AC unit are isolated for output, and are connected to different windings. This is similar to the case of isolated output of the DC-to-AC unit in Embodiment 1, and details are not described herein again. In this embodiment of this application, through cascaded input and isolated output of DC-to-AC units, specifications of power conversion devices are reduced. The specifications of power conversion devices in the current industry are insufficient (generally up to 1700 V for the IGBT). However, a 1500 V circuit breaker may be used in the power system provided in this embodiment of this application, and costs are low. The technical problem of insufficient specifications of power conversion devices in the current industry is resolved.

A node at which a negative output terminal of the first-stage DC-to-DC unit is coupled to a positive output terminal of the second-stage DC-to-DC unit is referred to as a first node, and a node at which a negative input terminal of the first-stage DC-to-AC unit is coupled to a positive input terminal of the second-stage DC-to-AC unit is referred to as a second node.

In some embodiments, the first node is coupled to the second node, and when an input voltage and/or an input current and/or an input current and/or an input power of one of the first-stage DC-to-DC unit and the second-stage DC-to-DC unit is less than a preset value, the corresponding DC-to-DC unit stops working. For example, if the input voltage of the first-stage DC-to-DC unit is less than the preset value, the first-stage DC-to-DC unit stops working. In another example, if the input power of the second-stage DC-to-DC unit is less than the preset value, the second-stage DC-to-DC unit stops working. At least one of the first-stage DC-to-AC unit and the second-stage DC-to-AC unit works. In this embodiment of this application, when the input voltage and/or the input current and/or the input power of the first-stage DC-to-DC unit or the second-stage DC-to-DC unit is excessively low, the unit with a low voltage and/or current and/or power is stopped, and a suitable unit is selected to work. This can avoid unnecessary waste and improve conversion efficiency and utilization of the entire system.

Figure 19:
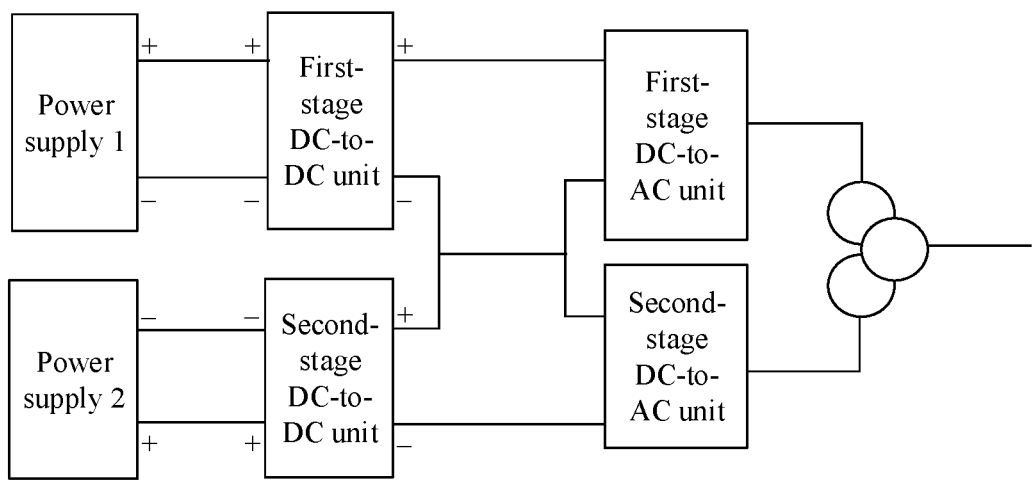
FIG. 19 is a schematic diagram of an embodiment of a power system according to an embodiment of this application.

FIG. 19 is a schematic diagram of an embodiment of a power system according to an embodiment of this application. As shown in FIG. 19, in some embodiments, a positive output terminal of the first-stage DC-to-DC unit is coupled to a positive input terminal of the first-stage DC-to-AC unit by using a first conductor, and a negative output terminal of the second-stage DC-to-DC unit is coupled to a negative input terminal of the second-stage DC-to-AC unit by using a second conductor. The first node and the second node are coupled by using a third conductor. It may be understood that, in this embodiment of this application, the first conductor, the second conductor, and the third conductor are all direct current cables connected between the DC-to-DC unit (the first-stage DC-to-DC unit and the second-stage DC-to-DC unit) and the DC-to-AC unit (the first-stage DC-to-AC unit and the second-stage DC-to-AC unit). A material and a wire diameter specification of the cable may be configured according to an actual situation. This is not limited in this embodiment of this application. It may be understood that, in the prior art, the first-stage DC-to-DC unit and the second-stage DC-to-DC unit may have four output terminals in total, and therefore, four cables are connected. However, in this embodiment of this application, the first-stage DC-to-DC unit and the second-stage DC-to-DC unit are cascaded, and the first node and the second node are coupled by using one cable, the existing technical solution of four cables is modified into a solution that requires only three cables. Therefore, costs of one cable and construction costs can be saved.

In some embodiments, the first conductor, the second conductor, and the third conductor form a distributed double (DC) bus, where the first conductor and the second conductor form a positive bus, and the second conductor and the third conductor form a negative bus. The third conductor is a middle bus (Middle Cable) of the distributed double bus. The first conductor, the second conductor, and the third conductor are direct current conductors. In the 3D technology, a direct current bus is constructed by using three cables, a positive bus is constructed by using the first conductor and the second conductor, and a negative bus is constructed by using the second conductor and the third conductor.

In addition, because the first node is a middle point of cascading the first-stage DC-to-DC unit and the second-stage DC-to-DC unit, and the second node is a middle point of cascading the first-stage DC-to-AC unit and the second-stage DC-to-AC unit, it can be implemented that a current value on the third conductor is less than or equal to a current value on the first conductor. When the current value on the third conductor is less than or equal to the current value on the first conductor, the wire diameter specification of the third conductor may be reduced, thereby reducing costs of the third conductor. In another possible case, similarly, the current value on the third conductor is less than or equal to the current value on the second conductor. Therefore, when the current value on the third conductor is less than or equal to the current value on the second conductor, the wire diameter specification of the third conductor may be reduced, thereby reducing cable costs of the third conductor. Certainly, the current value of the third conductor may alternatively be less than the current value of the first conductor and less than the current value of the second conductor. This may also reduce the wire diameter specification of the third conductor, and reduce the cable costs of the third conductor.

Figure 20:
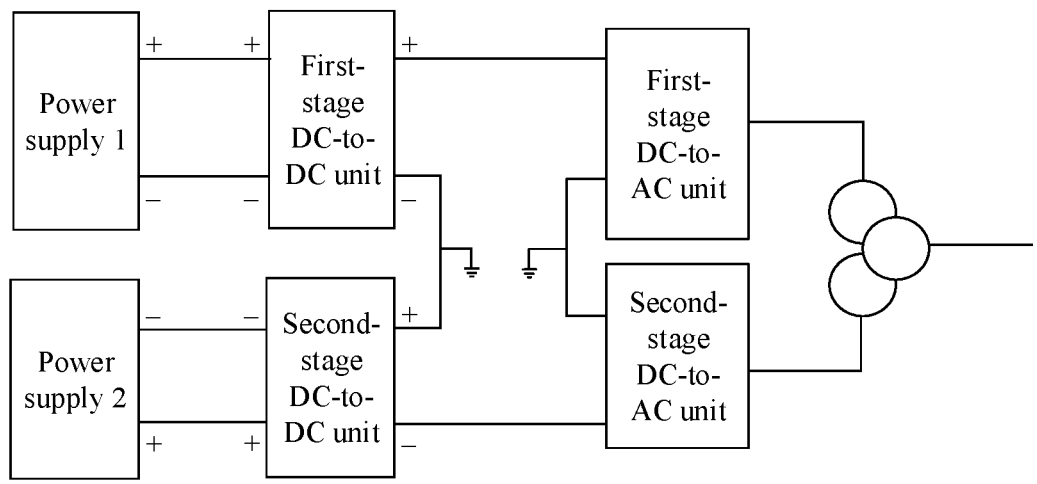
FIG. 20 is a schematic diagram of another embodiment of a power system according to an embodiment of this application.

FIG. 20 is a schematic diagram of another embodiment of a power system according to an embodiment of this application. As shown in FIG. 20, in some embodiments, both the first node and the second node are coupled to ground. In this embodiment of this application, both the first node and the second node are coupled to ground, so that when the output powers or output voltages of the first-stage DC-to-DC unit and the second-stage DC-to-DC unit are asymmetric, or the input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore, costs of one cable and construction costs can be saved.

When the first node and the second node are not coupled, impact of power inconsistency is considered. For example, due to different illuminations, in a photovoltaic power generation system, an output voltage of the power supply 1 may be greater than an output voltage of the power supply 2, and output voltages of the first-stage DC-to-DC unit and the second-stage DC-to-DC unit are also different. That is, voltages and/or powers output by the first-stage DC-to-DC unit and the second-stage DC-to-DC unit may be asymmetric, resulting in a cask effect in the output powers. Therefore, when the first node and the second node are not coupled, the power system may be configured with an equalization circuit to prevent asymmetry of voltages and/or powers output by the first-stage DC-to-DC unit and the second-stage DC-to-DC unit. The following provides a plurality of equalization circuits. In actual application, another equalization circuit may alternatively exist. This is not limited in this embodiment of this application.

Figure 21:
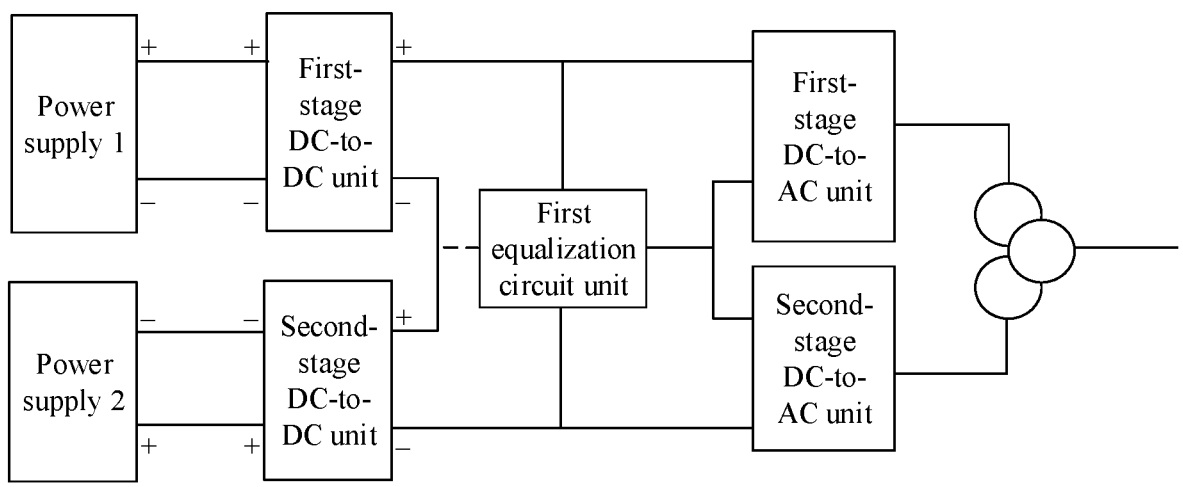
FIG. 21 is a schematic diagram of a power system that includes a first equalization circuit unit according to an embodiment of this application.

FIG. 21 is a schematic diagram of a power system that includes a first equalization circuit unit according to an embodiment of this application. In some embodiments, the power system further includes a first equalization circuit unit. The first equalization circuit unit is configured with a first interface, a second interface, and a third interface: the first interface is coupled to the second node: the second interface is coupled to a positive input terminal of a first-stage DC-to-AC unit; the third interface is coupled to a negative input terminal of a second-stage DC-to-AC unit. The first equalization circuit unit can balance input voltages and/or powers and/or currents of the first-stage DC-to-AC unit and the second-stage DC-to-AC unit. A working principle of the first equalization circuit unit is as follows: the first equalization circuit unit obtains energy from an input terminal of the first-stage DC-to-AC unit through the first interface and the second interface, and compensates the energy to the second-stage DC-to-AC unit through the first interface and the third interface; alternatively, the first equalization circuit unit obtains energy from an input terminal of the second-stage DC-to-AC unit through the first interface and the third interface, and compensates the energy to the first-stage DC-to-AC unit through the first interface and the second interface.

In a possible embodiment, the first equalization circuit unit may include four interfaces, that is, the first equalization circuit unit is further configured with a fourth interface. The fourth interface is coupled to the first node. As shown in FIG. 21, a dashed line indicates that in a possible embodiment, the fourth interface is coupled to the first node. When energy compensation is performed by using the first equalization circuit that includes four interfaces, the first equalization circuit may further compensate energy of the first-stage DC-to-DC unit and the second-stage DC-to-DC unit, that is, balance and adjust corresponding voltages and/or powers and/or currents.

Figure 22A:
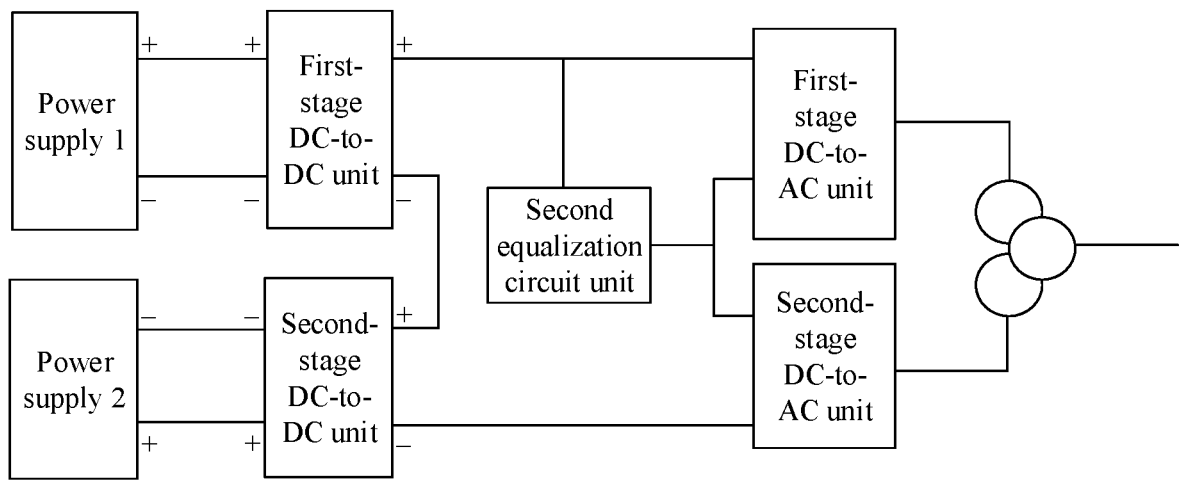
FIG. 22a is a schematic diagram 1 of a power system that includes a second equalization circuit unit according to an embodiment of this application.
Figure 22B:
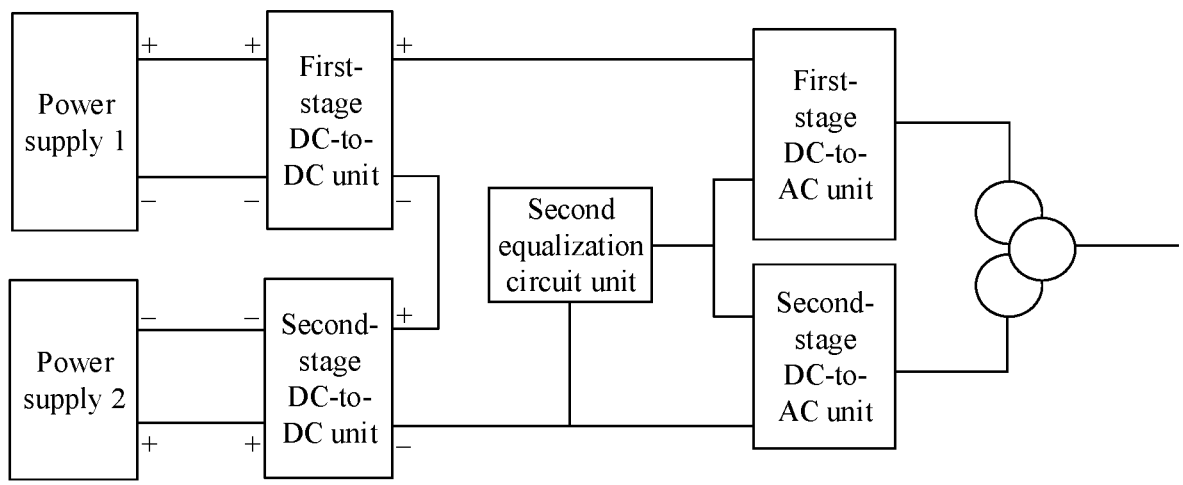
FIG. 22b is a schematic diagram 2 of a power system that includes a second equalization circuit unit according to an embodiment of this application.

FIG. 22a is a schematic diagram 1 of a power system that includes a second equalization circuit unit according to an embodiment of this application. In a case, the second equalization circuit unit is configured with a fifth interface and a sixth interface. The fifth interface is coupled to the second node. The sixth interface is coupled to a positive input terminal of the first-stage DC-to-AC unit. A working principle of the second equalization circuit unit is similar to the working principle of the first equalization circuit unit. In one embodiment, the second equalization circuit unit can compensate energy of the first-stage DC-to-AC unit to the second-stage DC-to-AC unit, or compensate energy of the second-stage DC-to-AC unit to the first-stage DC-to-AC unit. Therefore, the second equalization circuit unit can be configured to balance input voltages and/or powers and/or currents of the first-stage DC-to-AC unit and the second-stage DC-to-AC unit. FIG. 22b is a schematic diagram 2 of a power system that includes a second equalization circuit unit according to an embodiment of this application. In another case, the second equalization circuit unit is configured with a fifth interface and a sixth interface. The fifth interface is coupled to the second node. The sixth interface is coupled to a negative input terminal of the second-stage DC-to-AC unit. The second equalization circuit unit can be configured to balance input voltages and/or powers and/or currents of the first-stage DC-to-AC unit and the second-stage DC-to-AC unit. This is similar to the second equalization circuit unit corresponding to FIG. 22a, and details are not described herein again.

Figure 23:
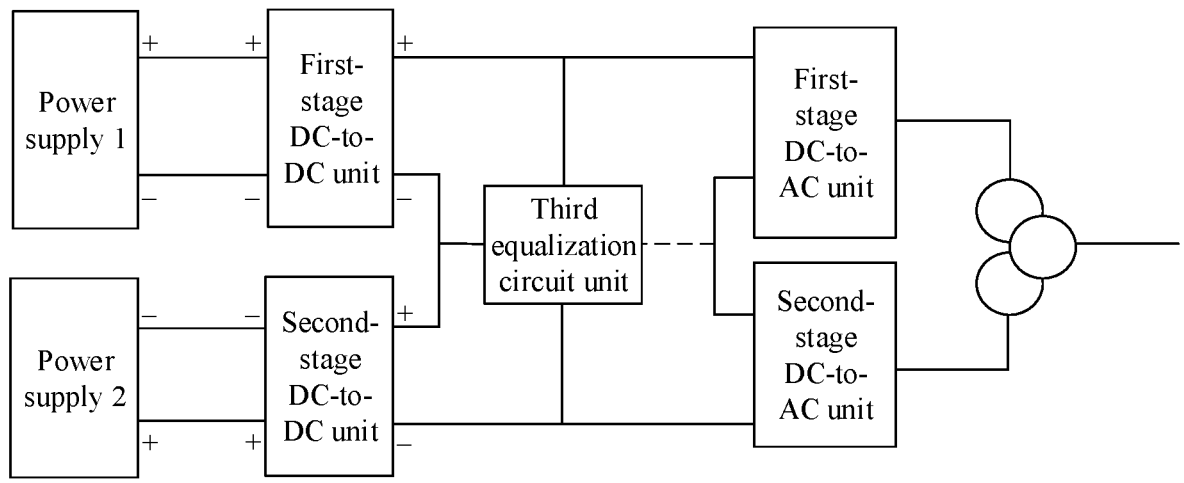
FIG. 23 is a schematic diagram of a power system that includes a third equalization circuit unit according to an embodiment of this application.

FIG. 23 is a schematic diagram of a power system that includes a third equalization circuit unit according to an embodiment of this application. The third equalization circuit unit is configured with a seventh interface, an eighth interface, and a ninth interface. The seventh interface is coupled to the first node. The eighth interface is coupled to a positive output terminal of the first-stage DC-to-DC unit. The ninth interface is coupled to a negative output terminal of the second-stage DC-to-DC unit. A working principle of the third equalization circuit unit is similar to the working principle of the first equalization circuit unit. In one embodiment, the third equalization circuit unit can compensate energy output by the first-stage DC-to-DC unit to the second-stage DC-to-DC unit, or compensate energy output by the second-stage DC-to-DC unit to the first-stage DC-to-DC unit. Therefore, the third equalization circuit unit can be configured to balance output voltages and/or powers and/or currents of the first-stage DC-to-DC unit and the second-stage DC-to-DC unit.

In a possible embodiment, the third equalization circuit unit may include four interfaces, that is, the third equalization circuit unit is further configured with a tenth interface. The tenth interface is coupled to the second node. As shown in FIG. 21, a dashed line indicates that in a possible embodiment, the tenth interface is coupled to the second node. When energy compensation is performed by using the third equalization circuit that includes four interfaces, the third equalization circuit unit may further compensate energy of the first-stage DC-to-AC unit and the second-stage DC-to-AC unit, that is, balance and adjust corresponding voltages and/or powers and/or currents.

Figure 24A:
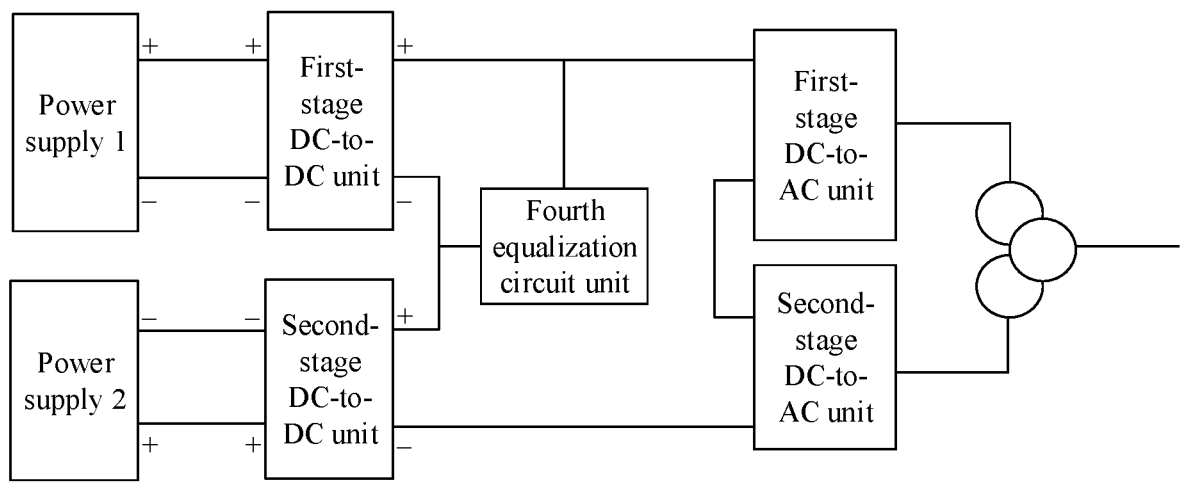
FIG. 24a is a schematic diagram 1 of a power system that includes a fourth equalization circuit unit according to an embodiment of this application.
Figure 24B:
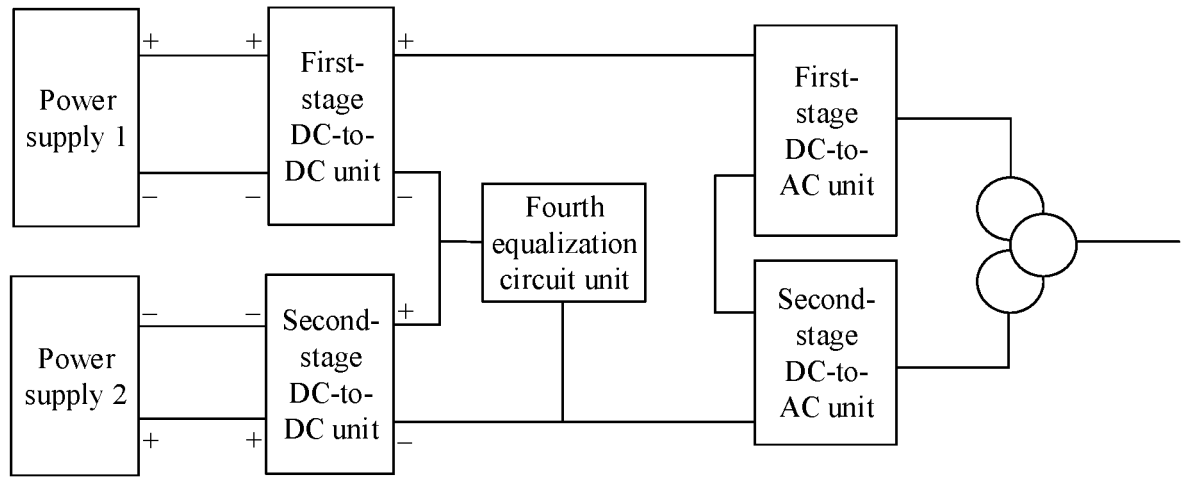
FIG. 24b is a schematic diagram 2 of a power system that includes a fourth equalization circuit unit according to an embodiment of this application.

FIG. 24a is a schematic diagram 1 of a power system that includes a fourth equalization circuit unit according to an embodiment of this application. In a case, the fourth equalization circuit unit is configured with an eleventh interface and a twelfth interface. The eleventh interface is coupled to the first node. The twelfth interface is coupled to the positive input terminal of the first-stage DC-to-DC unit. A working principle of the fourth equalization circuit unit is similar to the working principle of the second equalization circuit unit. In one embodiment, the fourth equalization circuit unit can compensate energy of the first-stage DC-to-DC unit to the second-stage DC-to-DC unit, or compensate energy of the second-stage DC-to-DC unit to the first-stage DC-to-DC unit. Therefore, the fourth equalization circuit unit can be configured to balance input voltages and/or powers and/or currents of the first-stage DC-to-DC unit and the second-stage DC-to-DC unit. FIG. 24b is a schematic diagram 2 of a power system that includes a fourth equalization circuit unit according to an embodiment of this application. In another case, the fourth equalization circuit unit is configured with an eleventh interface and a twelfth interface. The eleventh interface is coupled to the first node. The twelfth interface is coupled to the negative input terminal of the second-stage DC-to-DC unit. The second equalization circuit unit can be configured to balance input voltages and/or powers and/or currents of the first-stage DC-to-DC unit and the second-stage DC-to-DC unit. This is similar to the fourth equalization circuit unit corresponding to FIG. 24a, and details are not described herein again.

In some embodiments, output terminals of the first-stage DC-to-AC unit and the second-stage DC-to-AC unit are respectively coupled to different transformers; alternatively, output terminals of the first-stage DC-to-AC unit and the second-stage DC-to-AC unit are respectively coupled to different windings of a same transformer, to implement isolated output.

Figure 25:
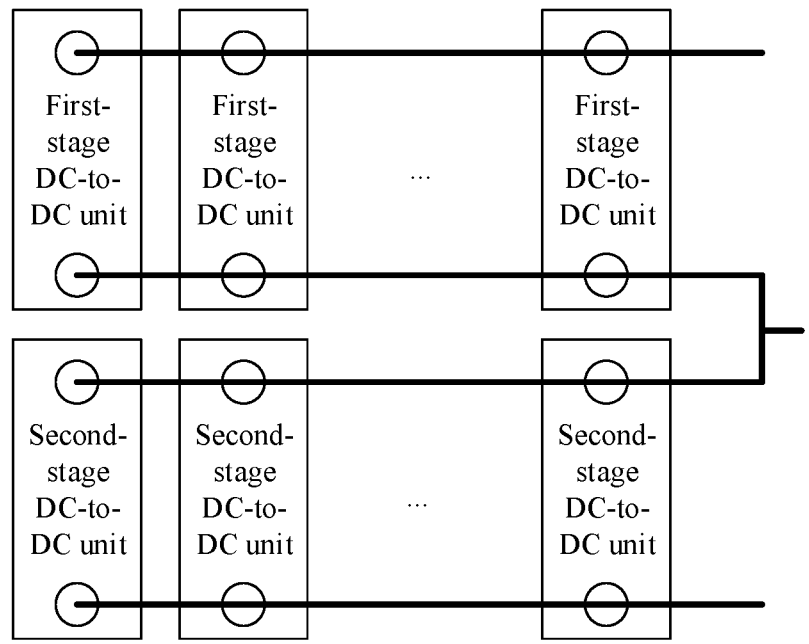
FIG. 25 is a schematic diagram of a plurality of combinations of DC-to-DC units connected in parallel according to an embodiment of this application.

In some embodiments, the first-stage DC-to-DC unit and the second-stage DC-to-DC unit are considered as one combination of DC-to-DC units. FIG. 25 is a schematic diagram of a plurality of combinations of DC-to-DC units connected in parallel according to an embodiment of this application. As shown in FIG. 25, when a plurality of combinations of DC-to-DC units are connected in parallel, similar output terminals corresponding to different combinations of DC-to-DC units are connected in parallel. For example, positive output terminals of first-stage DC-to-DC units in a first combination of DC-to-DC units are coupled to positive output terminals of first-stage DC-to-DC units in a second combination of DC-to-DC units. Meanings of similar output terminals are similar to those described in Embodiment 2, and details are not described herein again. Series connection of a plurality of combinations of DC-to-AC units is similar to the description of Embodiment 2, and details are not described herein again. It may be understood that, similar output terminals of a plurality of combinations of DC-to-AC units may be coupled in parallel for output, or may be isolated for output. This is similar to the description of Embodiment 2, and details are not described herein again.

Figure 26:
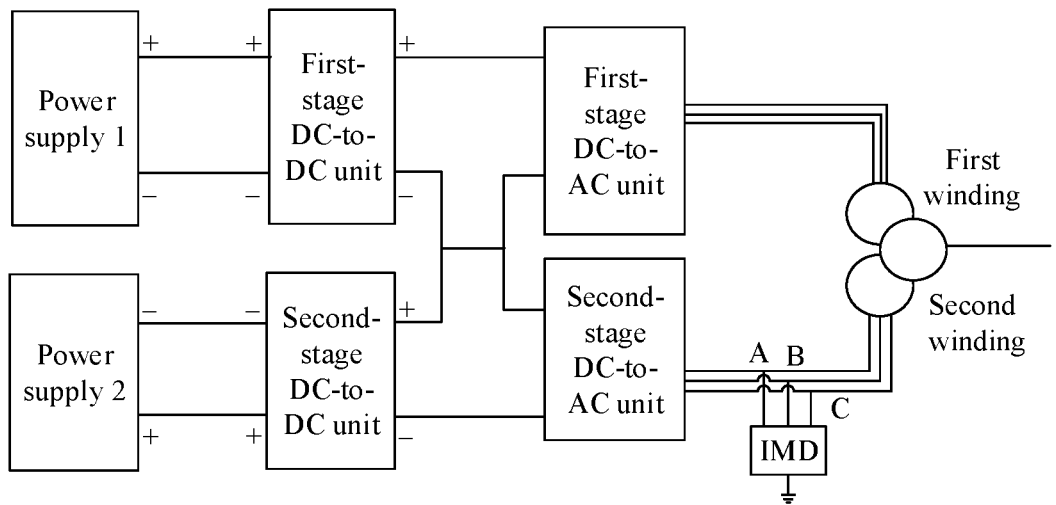
FIG. 26 is a schematic diagram of a power system that is provided with an IMD device according to an embodiment of this application.

In some embodiments, an insulation monitoring device (IMD) is coupled between an output terminal of the first-stage DC-to-AC unit and a ground point. FIG. 26 is a schematic diagram of a power system that is provided with an IMD device according to an embodiment of this application. In some other embodiments, an IMD device is coupled between an output terminal of the second-stage DC-to-AC unit and a ground point. In some other embodiments, a first IMD device is coupled between an output terminal of the first-stage DC-to-AC unit and a ground point, and a second IMD device is coupled between an output terminal of the second-stage DC-to-AC unit and a ground point. The IMD device can detect insulation impedance of the power system to ground. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation.

In this embodiment of this application, a communication signal is coupled to a direct current cable connected among the power supply 1, the power supply 2, the first-stage DC-to-DC unit, the second-stage DC-to-DC unit, the first-stage DC-to-AC unit, and the second-stage DC-to-AC unit. The communication signal is used to implement communication among the power supply 1, the power supply 2, the first-stage DC-to-DC unit, the second-stage DC-to-DC unit, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to an output terminal of the first-stage DC-to-AC unit, and the alternating current cable may be further coupled to another device. The first-stage DC-to-AC unit may communicate with another device on the alternating current cable by using the communication signal. When a plurality of combinations of DC-to-AC units are connected in parallel, and outputs of a plurality of first-stage DC-to-AC units are connected in parallel, the parallel output terminals of the plurality of first-stage DC-to-AC units may communicate with another device coupled to a connected alternating current cable by using a communication signal on the alternating current cable. The another device described above may be an alternating current device that uses an alternating current. Similarly, a communication situation of an output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

Figure 27:
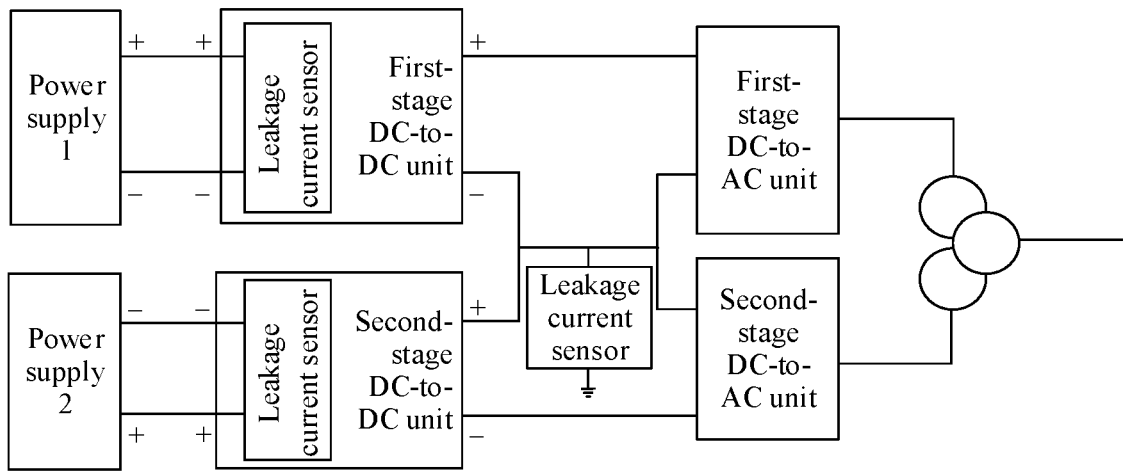
FIG. 27 is a schematic diagram of a power system that is configured with a leakage current sensor according to an embodiment of this application.

In some embodiments, the power system provided in this embodiment of this application may be further configured with a leakage current sensor. The leakage current sensor may be arranged at an output terminal of the power supply 1, an output terminal of the power supply 2, an input terminal and an output terminal of the first-stage DC-to-DC unit, an input terminal and an output terminal of the second-stage DC-to-DC unit, an input terminal and an output terminal of the first-stage DC-to-AC unit, and an input terminal and an output terminal of the second-stage DC-to-AC unit. A case in which the leakage current sensor is arranged at the output terminal of the power supply 1, the output terminal of the power supply 2, the input terminal and the output terminal of the first-stage DC-to-AC unit, and the input terminal and the output terminal of the second-stage DC-to-AC unit is similar to the embodiment corresponding to FIG. 11, and details are not described herein again. A case in which the leakage current sensor is arranged at the input terminal and the output terminal of the first-stage DC-to-DC unit and the input terminal and the output terminal of the second-stage DC-to-DC unit is shown in FIG. 27. FIG. 27 is a schematic diagram of a power system that is configured with a leakage current sensor according to an embodiment of this application. It can be learned that the leakage current sensor may be arranged at an input terminal and an output terminal of the first-stage DC-to-DC unit and an input terminal and an output terminal of the second-stage DC-to-DC unit. It should be noted that, when the leakage current sensor is arranged at the output terminal of the first-stage DC-to-DC unit and the output terminal of the second-stage DC-to-DC unit, the leakage current sensor may be coupled to a direct current cable corresponding to the first node. When the first node and the second node are coupled to ground, the leakage current sensor may be connected to a ground wire, so as to implement a leakage current detection function. In actual application, three leakage current sensors may be configured, as shown in FIG. 27, or one or more of the leakage current sensors may be selected for configuration. When any leakage current sensor detects that a corresponding leakage current value is greater than a preset threshold, the leakage current sensor may send a signal to any one or more or all of the power supply 1, the power supply 2, the first-stage DC-to-DC unit, the second-stage DC-to-DC unit, the first-stage DC-to-AC unit, and the second-stage DC-to-AC unit. Then, the any one or more or all of the power supply 1, the power supply 2, the first-stage DC-to-DC unit, the second-stage DC-to-DC unit, the first-stage DC-to-AC unit, and the second-stage DC-to-AC unit may report an alarm to a host computer connected thereto, or may send a signal to stop the power system, or may process in another manner. This is not limited in this embodiment of this application.

In some embodiments, an internal output phase line connected to an output terminal of the first-stage DC-to-AC unit is connected in series to at least one switch, so as to implement fast shutdown of the output of the first-stage DC-to-AC unit. The switch may be a relay, a circuit breaker, or a conductor, or may be another type of switch. This is not limited in this embodiment of this application. Similarly, an internal output phase line connected to the output terminal of the second-stage DC-to-AC unit may also be connected in series to a switch. This is similar to the case in which the output phase line of the first-stage DC-to-AC unit is connected in series to a switch. Details are not described herein again.

In this embodiment of this application, when the power supply 1 and the power supply 2 are photovoltaic arrays, the power system may be referred to as a photovoltaic power generation system. In this embodiment of this application, the power supply 1 may be referred to as a first photovoltaic array, and the power supply 2 may be referred to as a second photovoltaic array. In actual application, another name may be used. This is not limited in this embodiment of this application. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node is coupled to ground, so that when the output powers or output voltages of the first-stage DC-to-DC unit and the second DC-to-DC unit are asymmetric, or the input powers or input voltages of the first-stage DC-to-AC unit and the second DC-to-AC unit are asymmetric, a current loop can be provided to achieve voltage equalization, thereby ensuring normal operation of the system, and saving costs of one cable and construction costs.

In the photovoltaic power generation system, as shown in FIG. 18, preferably, the negative input terminal and the negative output terminal of the first-stage DC-to-DC unit are directly coupled, or connected with only a small voltage drop. The connection with only a small voltage drop means that a voltage drop at two terminals of the connection is relatively small. The voltage drop may be caused by coupling of a fuse, or may be caused by another case. This is not limited in this embodiment of this application. Similarly, the negative input terminal and the positive output terminal of the second-stage DC-to-DC unit are directly coupled, or connected with only a small voltage drop. In the embodiment corresponding to FIG. 18, negative output electrodes of the first photovoltaic array (the power supply 1) and the second photovoltaic array (the power supply 2) are equipotential. Normally, impedance of the entire system to the ground is symmetrically distributed. When the system is normally connected to the grid for operation, the first node, the second node, and the ground are equipotential. In this case, voltages to ground at PV− of battery panels of the first photovoltaic array and the second photovoltaic array are near 0 V. This eliminates a negative bias voltage to ground at PV− of the battery panel, and avoids a PID phenomenon of the battery panel (for a battery panel that has a negative voltage to ground at PV− and generates a PID phenomenon).

Figure 28:
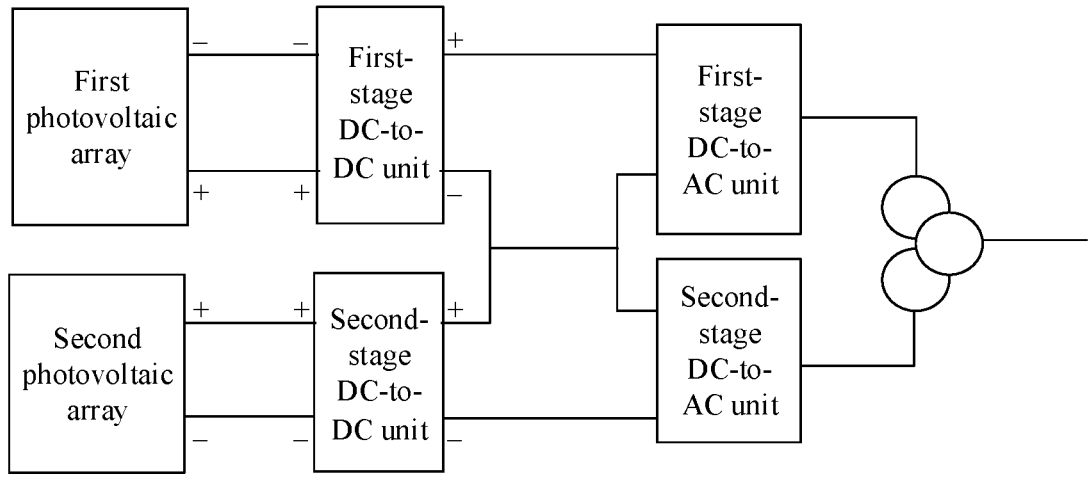
FIG. 28 is a schematic diagram of a photovoltaic power generation system according to an embodiment of this application.

FIG. 28 is a schematic diagram of a photovoltaic power generation system according to an embodiment of this application. Preferably, the positive input terminal and the negative output terminal of the first-stage DC-to-DC unit are directly coupled, or connected with only a small voltage drop. The positive input terminal and the positive output terminal of the second-stage DC-to-DC unit are directly coupled, or connected with only a small voltage drop. The connection with only a small voltage drop means that a voltage drop at two terminals of the connection is relatively small. This is similar to the description of the embodiment corresponding to FIG. 18, and details are not described herein again. In this embodiment of this application, different manners of direct connection or connection with only a small voltage drop may be used to ensure that the positive output electrode of the second photovoltaic array and the positive output electrode of the first photovoltaic array are equipotential. Normally, impedance of the entire system to the ground is symmetrically distributed. When the system is normally connected to the grid for operation, the first node, the second node, and the ground are equipotential. In this case, voltages to ground at output PV+ of battery panels of the first photovoltaic array and the second photovoltaic array are near 0 V. This eliminates a positive bias voltage to ground at PV+ of the battery panel, and avoids a PID phenomenon of the battery panel (for a battery panel that has a positive voltage to ground at PV+ and generates a PID phenomenon). Similarly, when the outputs of the first photovoltaic array and the second photovoltaic array share a negative terminal, the same effect can also be achieved.

In this embodiment of this application, in the photovoltaic power generation system, a PID phenomenon may alternatively be eliminated by coupling a voltage source. In some embodiments, a voltage source is coupled between a neutral point of a transformer winding corresponding to the output terminal of the second-stage DC-to-AC unit and a ground point, so as to adjust a potential of the neutral point to ground. When the photovoltaic power generation system is normally connected to the grid for operation, the voltage source is used to inject a voltage and a current between the three-phase A/B/C and the ground, so as to ensure that voltages to ground at the negative output terminals of the first photovoltaic array and the second photovoltaic array are equal to 0, or voltages to ground at the positive output terminals of the first photovoltaic array and the second photovoltaic array are equal to 0. This prevents a battery panel in the photovoltaic array (the first photovoltaic array and the second photovoltaic array) from generating a PID phenomenon. In addition, in this embodiment of this application, voltages may be adjusted so that voltages to ground at the negative output terminals of the first photovoltaic array and the second photovoltaic array are greater than 0 (for a battery panel that has a negative voltage to ground at the negative output terminal PV− and generates a PID phenomenon), or voltages to ground at the positive output terminals of the first photovoltaic array and the second photovoltaic array are less than 0 (for a battery panel that has a positive voltage to ground at the positive output terminal PV+ and generates a PID phenomenon). This implements a PID repair function of the battery panel, and ensures that the voltages to ground at the positive output terminals and the negative output terminals of the first photovoltaic array and the second photovoltaic array do not exceed a maximum applied system voltage of the battery panel, thereby ensuring system safety. The voltage can also be adjusted by coupling a voltage source between a neutral point of a transformer winding corresponding to the output terminal of the first-stage DC-to-AC unit and a ground point. This is similar to the foregoing principle of coupling a voltage source between a neutral point of a transformer winding corresponding to the output terminal of the second-stage DC-to-AC unit and a ground point, and details are not described herein again.

In some embodiments, in the photovoltaic power generation system, a voltage source may be coupled between an output-side external phase line of the first-stage DC-to-AC unit and/or the second-stage DC-to-AC unit and a ground point, to adjust a potential of the corresponding output phase line to ground and eliminate a PID phenomenon. This is similar to the principle in the embodiment corresponding to FIG. 12b, and details are not described herein again.

In some embodiments, in the photovoltaic power generation system, a voltage source may be coupled between an internal phase line at the output terminal of the first-stage DC-to-AC unit and/or the second-stage DC-to-AC unit and a ground point, to adjust a potential of the corresponding output phase line to ground and eliminate a PID phenomenon. This is similar to the principle in the embodiment corresponding to FIG. 12c, and details are not described herein again.

Figure 29:
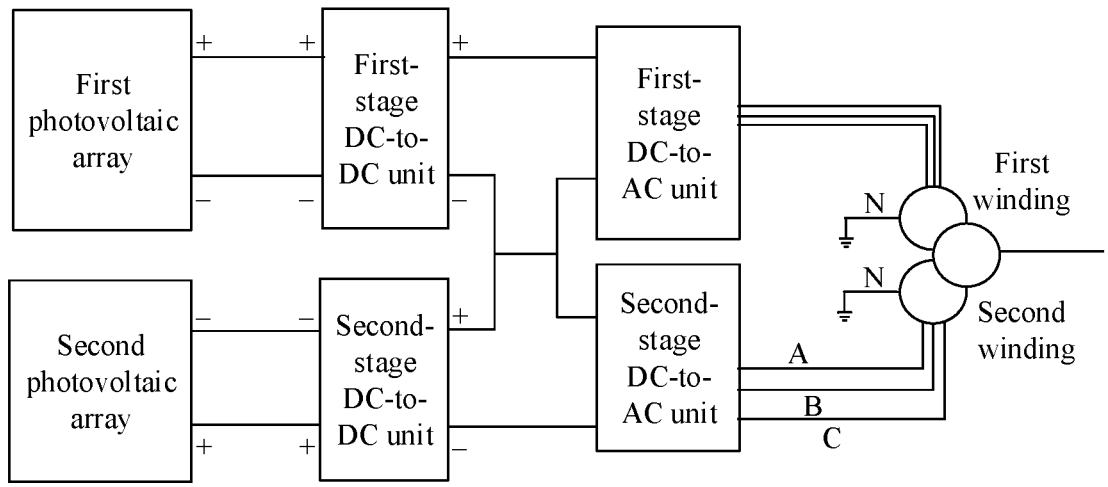
FIG. 29 is another schematic diagram of a photovoltaic power generation system according to an embodiment of this application.

FIG. 29 is another schematic diagram of a photovoltaic power generation system according to an embodiment of this application. In some embodiments, in the photovoltaic power generation system, a neutral point of a transformer winding corresponding to the output terminal of the first-stage DC-to-AC unit or the second-stage DC-to-AC unit is coupled to ground, or coupled to ground by using a current limiting device, so that a voltage to ground of the neutral point is close to or equal to 0 V, thereby eliminating a PID phenomenon. As shown in FIG. 29, the transformer winding corresponding to the output terminal of the second-stage DC-to-AC unit is a second winding, and the second winding is a double-split transformer of three-phase four-wire system (ABCN). Generally, the N wire is connected to the neutral point of the transformer, and grounded. The N wire of the second winding is coupled to ground, or coupled to ground by using a current limiting device. When the system is connected to the grid and works normally, a potential of a positive input electrode (the second node) of the second-stage DC-to-AC unit is higher than a potential of the ground, so that voltages to ground of the negative output electrode of the second photovoltaic array and the negative output terminal of the first photovoltaic array is greater than or equal to 0 V. A PID suppression and repair function of the battery panel is implemented. Similarly, for FIG. 28, in an application in which the positive output terminals of the first photovoltaic array and the second photovoltaic array are coupled together, an N wire of a transformer winding (the first winding) corresponding to the output terminal of the first-stage DC-to-AC unit is coupled to ground, or coupled to ground by using a current limiting device, so that a potential of the negative input terminal of the first-stage DC-to-AC unit is lower than the potential of the ground. In this case, the potentials of the positive output terminals of the first photovoltaic array and the second photovoltaic array are equal to a potential of the second node, which is less than the potential of the ground, that is. ≤ 0 V. This eliminates a positive bias voltage to ground at PV+ of the battery panel, and avoids a PID phenomenon of the battery panel (for a battery panel that has a positive voltage to ground at PV+ and generates a PID phenomenon). In another aspect, in this embodiment of this application, the input voltage of the photovoltaic array may be controlled by using a maximum power point tracking (MPPT) function of the DC-to-DC unit, so that the input voltage plus a voltage to ground of the negative electrode of the photovoltaic array does not exceed a maximum applied system voltage of the battery panel, thereby ensuring safety of system operation.

Figure 30:
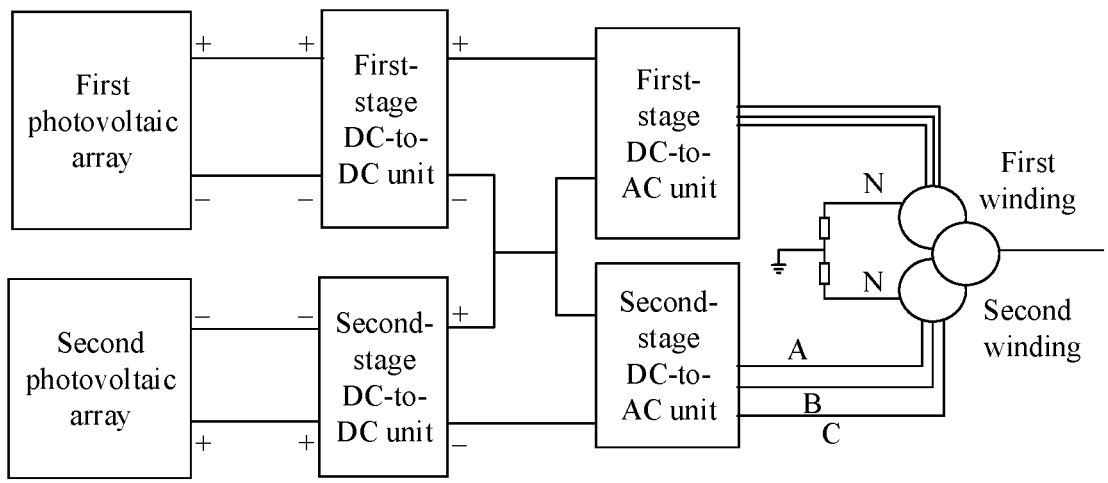
FIG. 30 is another schematic diagram of a photovoltaic power generation system according to an embodiment of this application.

FIG. 30 is another schematic diagram of a photovoltaic power generation system according to an embodiment of this application. In some embodiments, when the output terminals of the first-stage DC-to-AC unit and the second-stage DC-to-AC unit are respectively coupled to different windings of a same transformer, a neutral point of the winding corresponding to the output terminal of the first-stage DC-to-AC unit and a neutral point of the winding corresponding to the output terminal of the second-stage DC-to-AC unit are coupled by using two series resistors or current limiting devices, and middle points of the two series resistors or the two current limiting devices are coupled to ground. As shown in FIG. 30, the N wires of the first winding and the second winding are coupled by using two series resistors or current limiting devices, and middle points of the two series resistors or the two current limiting devices are coupled to ground. When the system is normally connected to the grid for operation, the first node, the second node, and the ground are equipotential. For the embodiment corresponding to FIG. 28, the positive output electrode of the second photovoltaic array, the positive output electrode of the first photovoltaic array, and the ground may be equipotential, thereby avoiding generating a PID phenomenon on the photovoltaic array. For the example in FIG. 29, the negative output electrode of the second photovoltaic array, the negative output electrode of the first photovoltaic array, and the ground may be equipotential, thereby avoiding generating a PID phenomenon on the photovoltaic array.

In some embodiments, in the photovoltaic power generation system, the photovoltaic power generation system further includes an isolation unit. The isolation unit is also referred to as an AC-to-DC isolation unit, and may be arranged inside the first-stage DC-to-AC unit. An input terminal of the isolation unit is coupled to an internal phase line at the output terminal of the first-stage DC-to-AC unit to obtain energy. A first output terminal of the isolation unit is coupled to ground, and a second output terminal of the isolation unit is coupled to a positive input terminal and/or a negative input terminal of the first-stage DC-to-AC unit. The isolation unit can be configured to adjust an output voltage to ground of the first power supply and/or the second power supply, so as to eliminate a PID phenomenon. The isolation unit may alternatively be arranged inside the second-stage DC-to-AC unit. An input terminal of the isolation unit may be coupled to an internal phase line at the output terminal of the second-stage DC-to-AC unit. A first output terminal of the isolation unit is coupled to ground, and a second output terminal of the isolation unit is coupled to a positive input terminal and/or a negative input terminal of the second-stage DC-to-AC unit. The isolation unit is configured to adjust an output voltage to ground of the first power supply and/or the second power supply, so as to eliminate a PID phenomenon. This is similar to the embodiment corresponding to FIG. 13, and details are not described herein again.

In some embodiments, in the photovoltaic power generation system, the first photovoltaic array and the second photovoltaic array may be photovoltaic arrays formed through series/parallel connection after an output terminal of the photovoltaic panel is connected in series to an optimizer or a shutdown device, and a communication signal is coupled to a direct current cable connected to an output terminal of the optimizer or the shutdown device. The first-stage DC-to-DC unit and/or the second-stage DC-to-DC unit and/or the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

In some embodiments, a communication signal is coupled to a direct current cable among the first-stage DC-to-AC unit, the second-stage DC-to-AC unit, the first-stage DC-to-DC unit, and the second-stage DC-to-DC unit. The first-stage DC-to-AC unit and/or the second-stage DC-to-AC unit control the first-stage DC-to-DC unit and/or the second-stage DC-to-DC unit by using the communication signal, so as to implement fast shutdown of input terminals of the first-stage DC-to-DC unit and/or the second-stage DC-to-DC unit.

In some embodiments, the photovoltaic power generation system further includes at least one energy storage unit. At least two direct current cables connected to the first-stage DC-to-DC unit, the second-stage DC-to-DC unit, the first-stage DC-to-AC unit, and the second-stage DC-to-AC unit are coupled in parallel to the energy storage unit. This is similar to the energy storage unit in Embodiment 3, and details are not described herein again.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Figure 31:
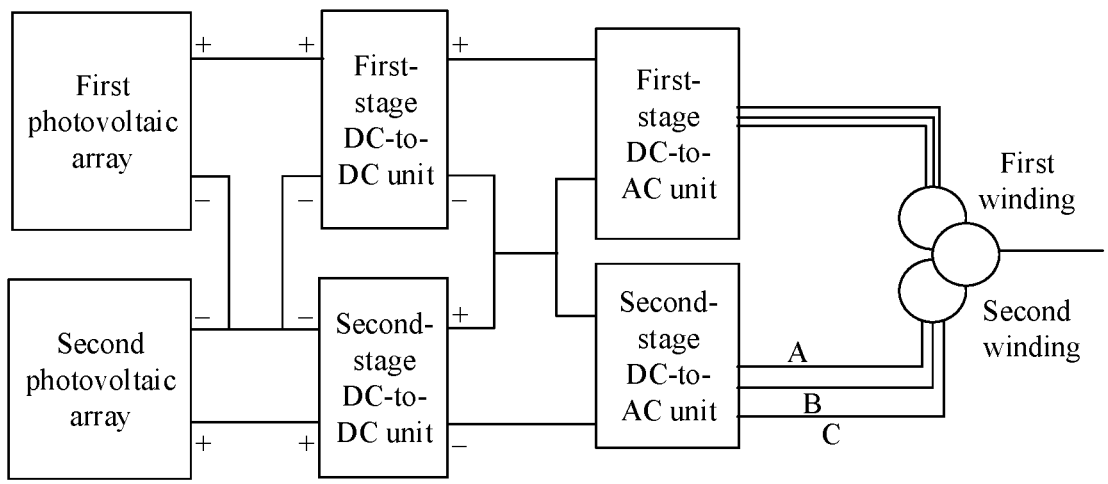
FIG. 31 is another schematic diagram of a photovoltaic power generation system according to an embodiment of this application.

FIG. 31 is another schematic diagram of a photovoltaic power generation system according to an embodiment of this application. In some embodiments, a negative output terminal of the first photovoltaic array and a negative output terminal of the second photovoltaic array are coupled as a first coupling point, and a negative input terminal of the first-stage DC-to-DC unit and a negative input terminal of the second-stage DC-to-DC unit are coupled as a second coupling point. The first coupling point and the second coupling point are connected by using one cable. In this implementation, one cable may be connected to the first coupling point and the second coupling point, thereby saving cables and reducing costs. In some other embodiments, the first coupling point and the second coupling point may be separately grounded, so as to implement power flow, which can further reduce a quantity of cables and reduce system costs. Similarly, in the photovoltaic power generation system shown in FIG. 28, positive output terminals of the first photovoltaic array and the second photovoltaic array are coupled, and positive input terminals of the first DC-to-DC unit and the second DC-to-DC unit are coupled, and then the two coupling points are grounded by using one cable, or both terminals of the two coupling points are grounded, so as to implement power flow.

Figure 32A:
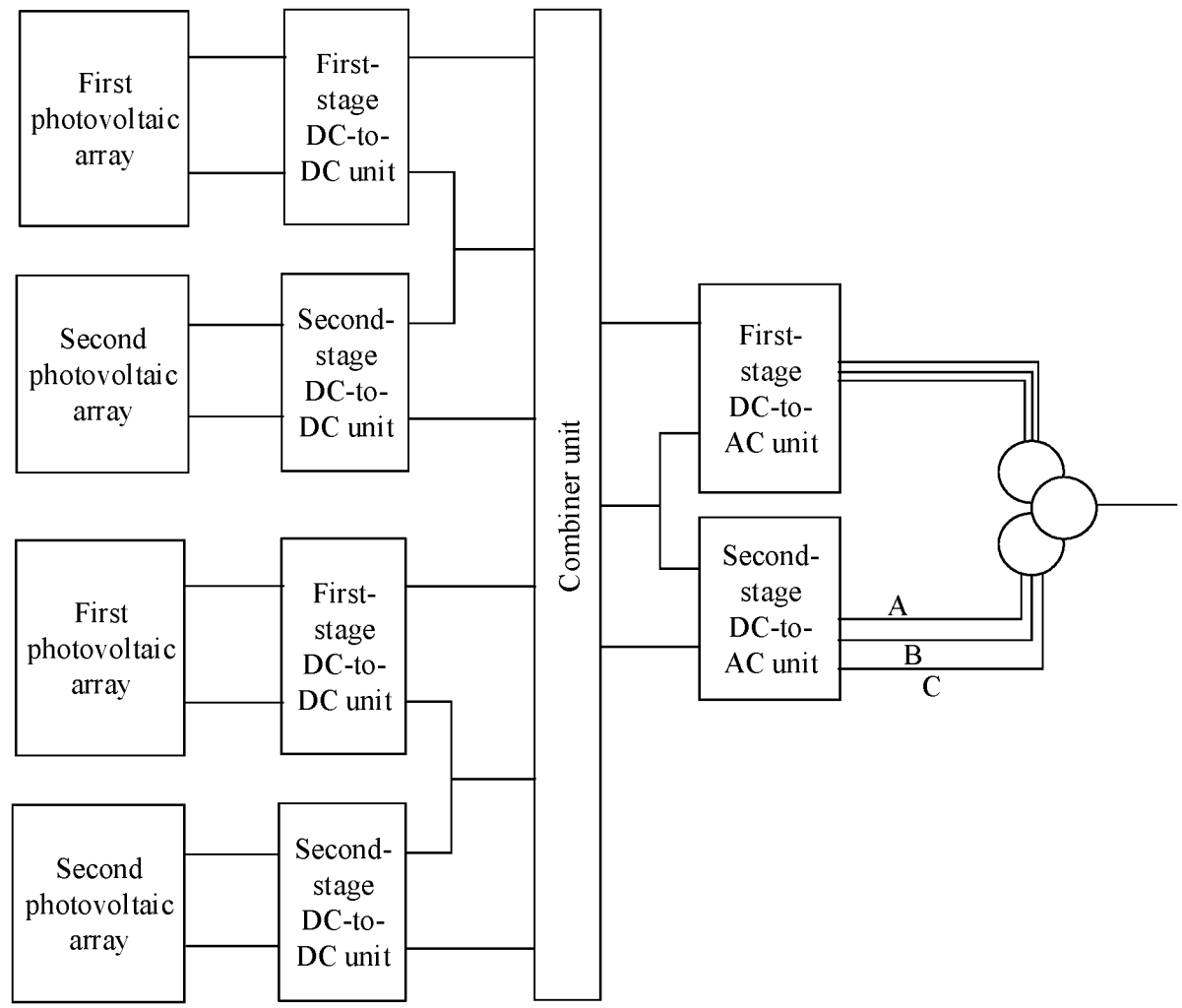
FIG. 32a is another schematic diagram of a photovoltaic power generation system according to an embodiment of this application.
Figure 32B:
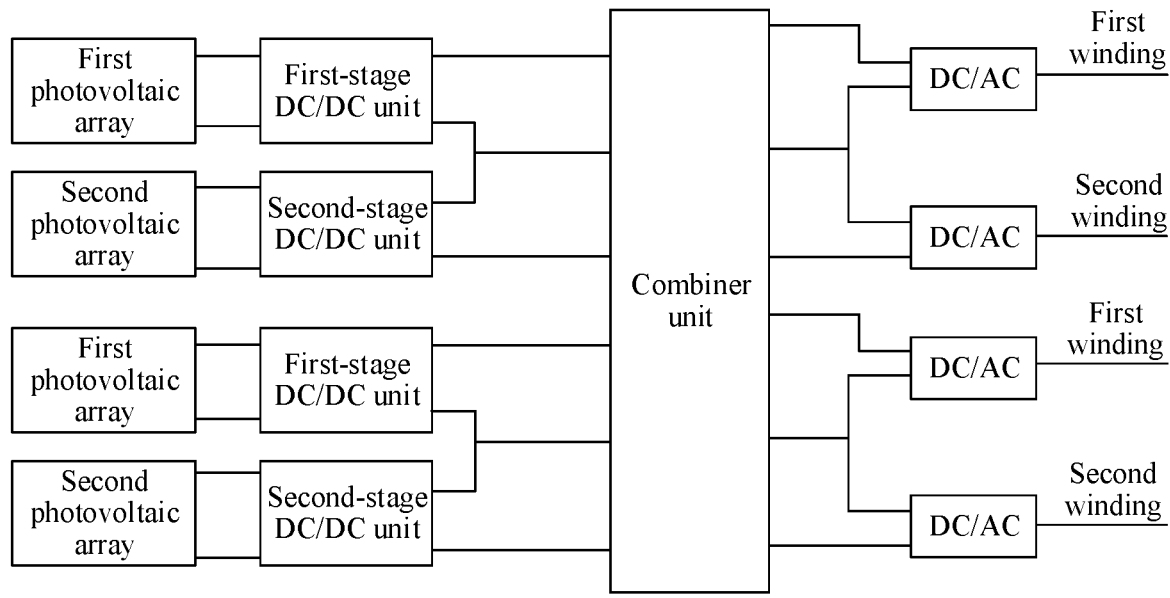
FIG. 32b is another schematic diagram of a photovoltaic power generation system according to an embodiment of this application.

FIG. 32a is another schematic diagram of a photovoltaic power generation system according to an embodiment of this application. In some embodiments, the photovoltaic power generation system further includes a combiner unit. The combiner unit includes at least three input terminals, which are respectively connected to a positive output terminal of the first-stage DC-to-DC unit, the first node, and a negative output terminal of the second-stage DC-to-DC unit. In actual application, the combiner unit may further include more input terminals to connect more first-stage DC-to-DC units and more second-stage DC-to-DC units. It may be understood that the first-stage DC-to-DC unit is coupled to the first photovoltaic array, and the second-stage DC-to-DC unit is coupled to the second photovoltaic array. An output terminal of the combiner unit is connected to a positive input terminal of the first-stage DC-to-AC unit, the second node, and a negative input terminal of the second-stage DC-to-AC unit. In this embodiment of this application, the combiner unit is coupled between the DC-to-DC unit and the DC-to-AC unit, so that the photovoltaic power generation system can be coupled to more first photovoltaic arrays and more second photovoltaic arrays, helping expand a scale of the photovoltaic power generation system. In another possible embodiment, three busbars may be arranged in the combiner unit, including a first busbar, a second busbar, and a third busbar. The first busbar is coupled to a positive output terminal of the first-stage DC-to-DC unit, the second busbar is coupled to the first node, and the third busbar is coupled to a negative output terminal of the second-stage DC-to-DC unit. In another aspect, the first busbar is coupled to a positive input terminal of the first-stage DC-to-AC unit, the second busbar is coupled to the second node, and the third busbar is coupled to a negative input terminal of the second-stage DC-to-AC unit. FIG. 32b is another schematic diagram of a photovoltaic power generation system according to an embodiment of this application. As shown in FIG. 32b, when the photovoltaic power generation system includes a plurality of first-stage DC-to-AC units and second-stage DC-to-AC units, the photovoltaic power generation system may alternatively couple the plurality of first-stage DC-to-AC units and second-stage DC-to-AC units to the foregoing three busbars. Combination is performed by using the combiner unit. This is not limited in this embodiment of this application.

Figure 33:
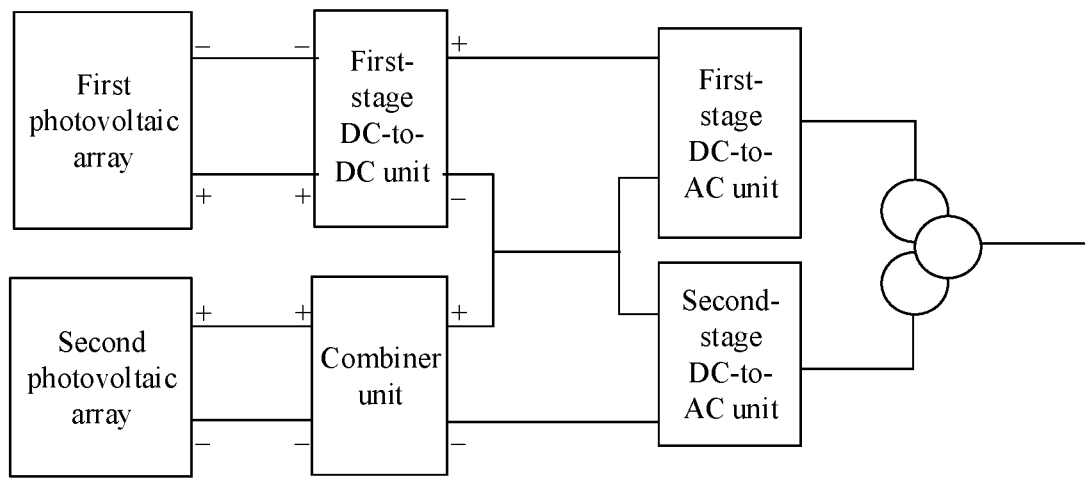
FIG. 33 is another schematic diagram of a photovoltaic power generation system according to an embodiment of this application.

FIG. 33 is another schematic diagram of a photovoltaic power generation system according to an embodiment of this application. In some embodiments, the second-stage DC-to-DC unit may be replaced by a combiner unit. The output of the second photovoltaic array is implemented by a combiner unit. In addition, when the first node and the second node are not connected, and when the system is normally connected to the grid for operation, the input voltages of the first-stage DC-to-AC unit and the second-stage DC-to-AC unit are determined by the output voltages and powers of the first-stage DC-to-AC unit and the second-stage DC-to-AC unit. In this case, the first-stage DC-to-DC unit controls its output voltage and current, that is, the voltage and the current output by the second photovoltaic array may be adjusted to implement MPPT tracking of the second photovoltaic array.

Figure 34:
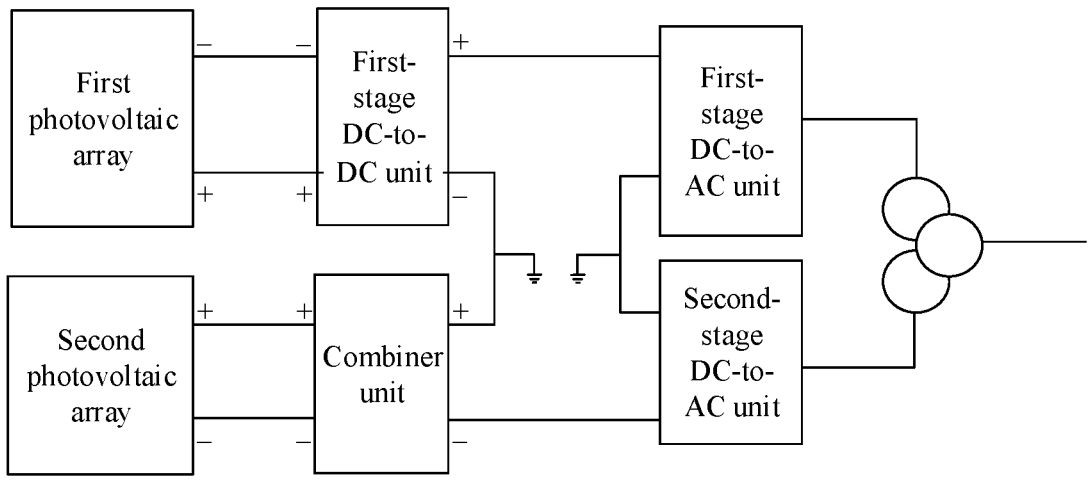
FIG. 34 is another schematic diagram of a photovoltaic power generation system according to an embodiment of this application.

FIG. 34 is another schematic diagram of a photovoltaic power generation system according to an embodiment of this application. In some embodiments, the second-stage DC-to-DC unit may be replaced by a combiner unit, and the first node and the second node are separately coupled to ground. The output of the second photovoltaic array is combined by using the combiner unit, and then is coupled in series to the output terminal of the first-stage DC-to-DC unit after the combination. The coupling node is the first node, and the first node and the second node are grounded and coupled to implement power connection.

Figure 35:
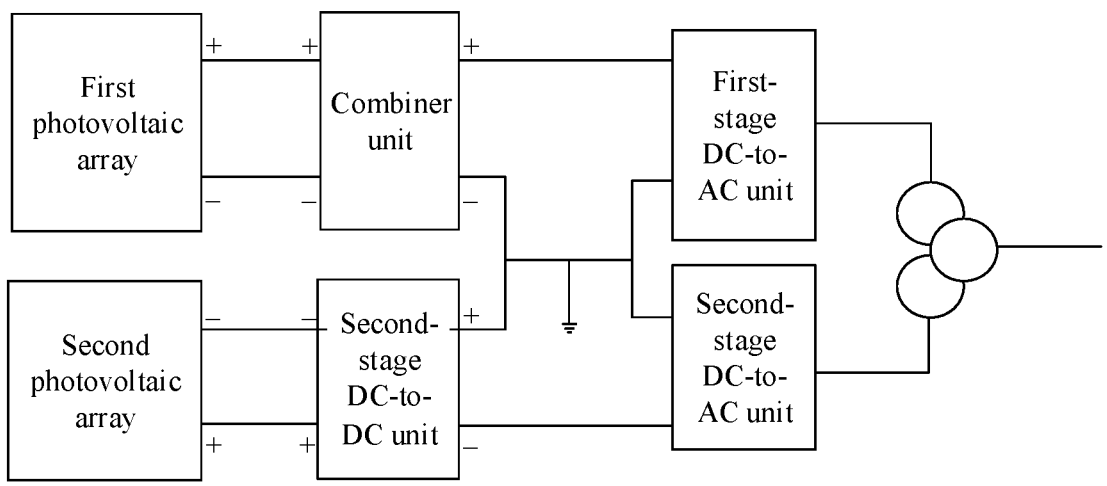
FIG. 35 is another schematic diagram of a photovoltaic power generation system according to an embodiment of this application.

FIG. 35 is another schematic diagram of a photovoltaic power generation system according to an embodiment of this application. In some embodiments, similarly, the first-stage DC-to-DC unit may also be replaced by a combiner unit. A principle is similar to that of replacing the second-stage DC-to-DC unit with a combiner unit. Details are not described herein again. In this embodiment of this application, the first node and the second node may be coupled and then grounded. In some embodiments, the combiner unit and the second-stage DC-to-DC unit may be used as a same whole. This is not limited in this embodiment of this application.

Figure 36:
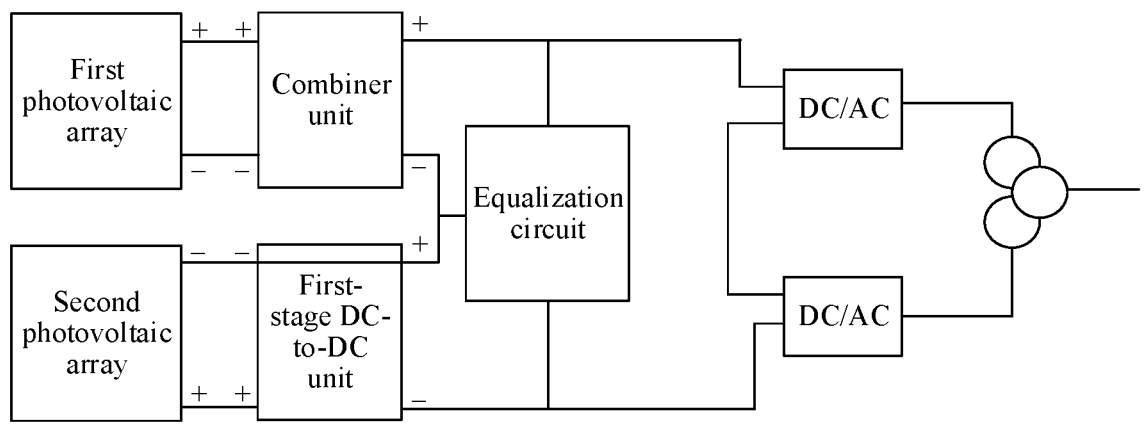
FIG. 36 is another schematic diagram of a photovoltaic power generation system according to an embodiment of this application.

FIG. 36 is another schematic diagram of a photovoltaic power generation system according to an embodiment of this application. In this embodiment, the second-stage DC-to-DC unit may be replaced by a combiner unit. In addition, the photovoltaic power generation system is provided with an equalization circuit. When the output powers and/or the output voltages of the first photovoltaic array and the second photovoltaic array are asymmetric, the equalization circuit is configured to balance the output powers and/or voltages of the first photovoltaic array and the second photovoltaic array, so as to maximize application of the output powers of the first photovoltaic array and the second photovoltaic array. The equalization circuit includes a first interface, a second interface, and a third interface. The first interface is coupled to the first node (a coupling point between the negative output terminal of the combiner unit and the positive output terminal of the first-stage DC-to-DC unit). The second interface is coupled to the positive output terminal of the combiner unit. The third interface is coupled to the negative output terminal of the first-stage DC-to-DC unit. A working principle of the equalization circuit is as follows: the equalization circuit obtains energy through the second interface and the third interface, and compensates the energy to the first photovoltaic array or the first-stage DC-to-DC unit with a low output power and/or voltage: or the equalization circuit obtains energy from the second photovoltaic array through the first interface and the second interface, and compensates the energy to the first-stage DC-to-DC unit through the first interface and the third interface; or the equalization circuit unit obtains energy from the first-stage DC-to-DC unit through the first interface and the third interface, and compensates the energy to the second photovoltaic array through the first interface and the second interface. In some embodiments, the equalization circuit unit may further include a fourth interface, and the fourth interface is coupled to the second node. This is similar to the third equalization circuit unit in the embodiment corresponding to FIG. 23, and details are not described herein again.

Figure 37:
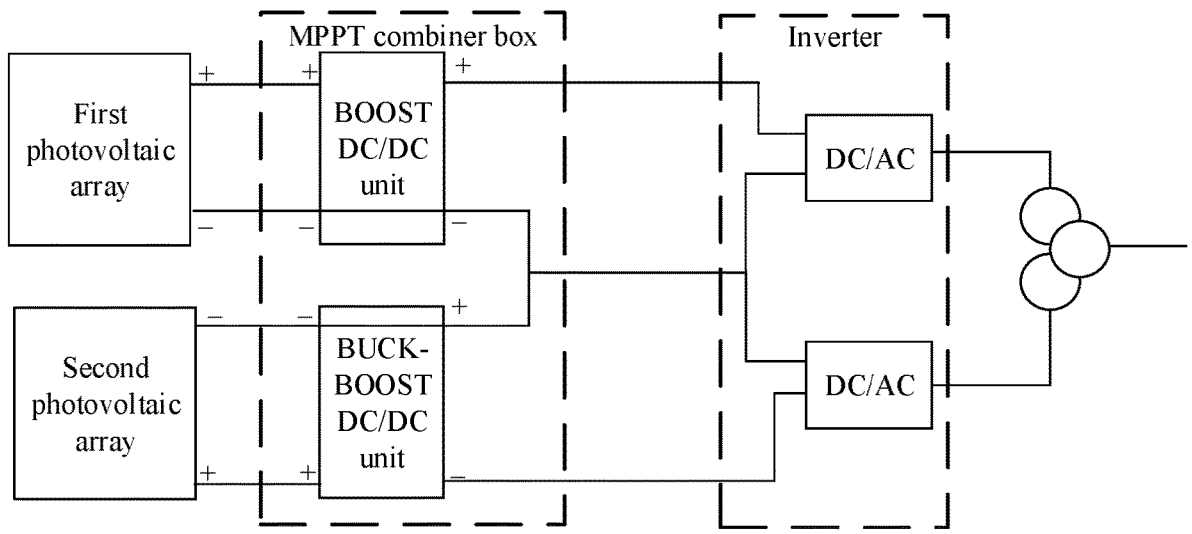
FIG. 37 is another schematic diagram of a photovoltaic power generation system according to an embodiment of this application.

FIG. 37 is another schematic diagram of a photovoltaic power generation system according to an embodiment of this application. In some embodiments, the first-stage DC-to-DC unit is a BOOST DC/DC unit, the second-stage DC-to-DC unit is a BUCK-BOOST DC/DC unit, and the BOOST DC/DC unit and the BUCK-BOOST DC/DC unit form an MPPT combiner box. In this embodiment of this application, the negative input electrode and the negative output electrode of the BOOST DC/DC unit are directly connected. The positive input electrode is connected to the positive output electrode of the first photovoltaic array, and the negative input electrode is connected to the negative output electrode of the first photovoltaic array. The negative input electrode and the positive output electrode of the BUCK-BOOST DC/DC unit are directly connected. The positive input electrode is connected to the positive output electrode of the second photovoltaic array, and the negative input electrode is connected to the negative output electrode of the second photovoltaic array. In some embodiments, the photovoltaic power generation system includes a plurality of first-stage DC-to-DC units and a plurality of second-stage DC-to-DC units. The negative output terminals of all first-stage DC-to-DC units are connected to the positive output terminals of all second-stage DC-to-DC units to form a third output terminal of the MPPT combiner box. Positive output electrodes of all first-stage DC-to-DC units form the first output terminal of the MPPT combiner box, and negative output electrodes of all second-stage DC-to-DC units form the second output terminal of the MPPT combiner box.

In FIG. 37, a first-stage DC-to-AC unit and a second-stage DC-to-AC unit form an inverter. When the photovoltaic power generation system includes a plurality of inverters, negative output electrodes of all first-stage DC-to-AC units are connected to positive output electrodes of all second-stage DC-to-AC units to form a third input terminal of the inverter; positive output electrodes of all first-stage DC-to-AC units form a first input terminal of the inverter; negative input electrodes of all second-stage DC-to-AC units are connected to form a third input terminal of the inverter; output terminals of all first-stage DC-to-AC units form a first output terminal of the inverter; output terminals of all second-stage DC-to-AC units form a second output terminal of the inverter.

In FIG. 37, the first output terminal of the MPPT combiner box is coupled to the first input terminal of the inverter; the second output terminal of the MPPT combiner box is coupled to the second input terminal of the inverter; the third output terminal of the MPPT combiner box is coupled to the third input terminal of the inverter, the first output terminal and the second output terminal of the inverter are respectively connected to the first winding and the second winding of the double-split transformer. To suppress the generation of a PID phenomenon of the photovoltaic panel, the same implementation as the foregoing implementation example may be used, for example, arranging an isolation unit and a voltage source. For the coupling manner of the output terminal of the DC-to-DC unit, the coupling manner of the input terminal of the DC-to-AC unit, and the coupling manner of the output terminal of the DC-to-DC unit and the input terminal of the DC-to-AC unit, the same implementation as the foregoing implementation example may be used, and details are not described herein again.

Embodiment 5

Figure 38:
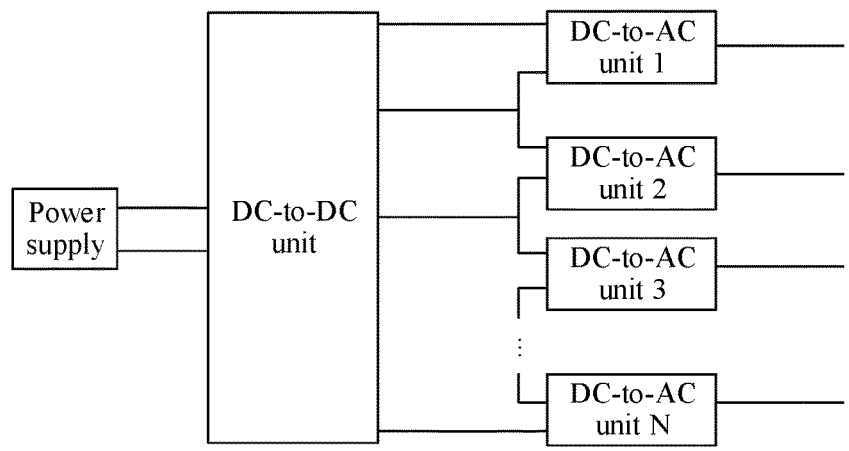
FIG. 38 is a schematic diagram of Embodiment 5 of a power system according to an embodiment of this application.

FIG. 38 is a schematic diagram of Embodiment 5 of a power system according to an embodiment of this application. The power system includes a power supply, a DC-to-DC unit, and N DC-to-AC units. An output terminal of the power supply is coupled to an input terminal of the DC-to-DC unit, and the power supply may be a photovoltaic array, an energy storage power supply, a wind power generation direct current source, or the like. This is similar to the power supply in Embodiment 3, and details are not described herein again. An output terminal of the DC-to-DC unit includes a positive output terminal, a negative output terminal, and a third output terminal. The positive output terminal of the DC-to-DC unit is coupled to a positive input terminal of the first DC-to-AC unit. The negative output terminal of the DC-to-DC unit is coupled to a negative input terminal of an $N^{th}$ DC-to-AC unit. The third output terminal of at least one DC-to-DC unit is coupled to at least one first node. The first node is formed by coupling in series a negative input terminal of an $n^{th}$ DC-to-AC unit and a positive input terminal of an $(n+1)^{th}$ DC-to-AC unit, where n is an integer greater than 0 and less than N. That is, a negative input terminal of a DC-to-AC unit 1 is coupled in series to a positive input terminal of a DC-to-AC unit 2 to form a first node, a negative input terminal of the DC-to-AC unit 2 is coupled in series to a positive input terminal of a DC-to-AC unit 3 to form a first node, . . . , and so on. This is similar to the DC-to-AC unit in Embodiment 3, and details are not described herein again.

In this embodiment of this application, the DC-to-DC unit may be an apparatus that can convert a direct current into a direct current, for example, a DC/DC converter. The input terminal of the DC-to-DC unit may be connected to one power supply, or may be connected to a plurality of power supplies. This is not limited in this embodiment of this application. A manner of coupling between the input terminal of the DC-to-DC unit and the power supply is generally that a positive output terminal of the power supply is coupled to a positive input terminal of the DC-to-DC unit, and a negative output terminal of the power supply is coupled to a negative input terminal of the DC-to-DC unit. Details are not described again in this embodiment of this application.

In this embodiment of this application, the input terminals of the DC-to-AC units are cascaded to reduce a current between the DC-to-DC unit and the DC-to-AC unit, and resolve cost and loss problems of the cable from the DC-to-DC unit to the DC-to-AC unit. When the DC-to-DC unit is connected to a plurality of power supplies, an output voltage may be increased, so as to reduce a current between the DC-to-DC unit and the DC-to-AC unit, and resolve cost and loss problems of the cable from the DC-to-DC unit to the DC-to-AC unit.

In this embodiment of this application, the third output terminal of the at least one DC-to-DC unit is coupled to the at least one first node. For example, in some embodiments, one third output terminal is coupled to one first node, and another third output terminal and another first node are not coupled. In some other embodiments, two third output terminals are respectively coupled to two first nodes, and another third output terminal and another first node are not coupled. In some other embodiments, a quantity of third output terminals is equal to a quantity of first nodes, and each third output terminal is coupled to a corresponding first node. In some other embodiments, a quantity of third output terminals is different from a quantity of first nodes, each third output terminal is coupled to a corresponding first node, and a remaining third output terminal or a remaining first node is not coupled. In actual application, another coupling manner may alternatively be used. This is not limited in this embodiment of this application. In this embodiment of this application, a quantity of cables connected between the DC-to-DC unit and the DC-to-AC unit is reduced in a manner of the third output terminal and the first node, thereby reducing costs of the power system.

In this embodiment of this application, output terminals of DC-to-AC units are isolated for output. For example, an output terminal of the DC-to-AC unit 1 is isolated from an output terminal of the DC-to-AC unit 2, and an output terminal of the DC-to-AC unit 2 is isolated from an output terminal of the DC-to-AC unit 3. In actual application, an output terminal of each DC-to-AC unit is coupled to different windings, and each winding may output a three-phase voltage or a single-phase voltage. This is not limited in this embodiment of this application. In this embodiment of this application, cascaded input and isolated output of the DC-to-AC unit can reduce a specification of a power conversion device. Therefore, problems of insufficient specifications (generally up to 1700 V for an insulated gate bipolar transistor, IGBT) and high costs of power conversion devices in the current industry are resolved. In addition, a circuit breaker with a relatively low specification may be used to reduce costs.

In some embodiments, the DC-to-AC unit 1, the DC-to-AC unit 2, . . . , and the DC-to-AC unit M may be considered as one combination of DC-to-AC units. Therefore, one power system includes at least one power supply, one DC-to-DC unit, and one combination of DC-to-AC units. When there are a plurality of power supplies and/or a plurality of DC-to-DC units and/or a plurality of combinations of DC-to-AC units, output terminals of the plurality of power supplies connected in series and parallel are connected to an input terminal of one DC-to-DC unit, or are respectively connected to input terminals of a plurality of different DC-to-DC units. Similar output terminals of a plurality of DC-to-DC units are coupled in parallel, and similar input terminals of at least two combinations of DC-to-AC units are connected in parallel. At least one third output terminal connected in parallel is coupled to at least one first node connected in parallel. In this embodiment of this application, similar output terminals of a plurality of combinations of DC-to-AC units may be coupled in parallel, or may be isolated for output. This is similar to the description corresponding to FIG. 5c in the foregoing embodiment, and details are not described herein again.

In some embodiments, a communication signal is coupled to a direct current cable connected between the power supply and the DC-to-DC unit, and a communication signal is also coupled to a direct current cable connected between the DC-to-DC unit and the DC-to-AC unit. Preferably, the communication signal may be a PLC signal. This is similar to the description of the communication signal in Embodiment 1, and details are not described herein again. In actual application, the power system may use a power supply, a DC-to-DC unit, and a DC-to-AC unit that can recognize a communication signal, or may modify a power supply, a DC-to-DC unit, and a DC-to-AC unit so that the power supply, the DC-to-DC unit, and the DC-to-AC unit can recognize a communication signal. This is not limited in this embodiment of this application.

In some embodiments, the power supply is a photovoltaic array formed by connecting an output of a photovoltaic panel to an optimizer or a shutdown device, and then performing series/parallel combination. When a communication signal is coupled to the direct current cable connected among the power supply, the DC-to-DC unit, and the DC-to-AC unit, the communication signal also passes through the optimizer or the shutdown device, and the power supply, the DC-to-DC unit, or the DC-to-AC unit may control, by using the communication signal, the shutdown of the optimizer or the shutdown device, so as to implement fast shutdown. That is, the power supply, the DC-to-DC unit, or the DC-to-AC unit may send a communication signal that carries a shutdown instruction to the optimizer or the shutdown device. After receiving the communication signal that carries the shutdown instruction, the optimizer or the shutdown device executes the shutdown instruction, so as to implement fast shutdown. A situation of the communication signal is similar to the description of the communication signal in Embodiment 1, and details are not described herein again.

In some embodiments, the power system further includes at least one energy storage unit. The energy storage unit is coupled in parallel to at least two direct current cables connected between the DC-to-DC unit and the DC-to-AC unit. In this embodiment of this application, the direct current cable connected between the DC-to-DC unit and the DC-to-AC unit may be a direct current cable for coupling a positive output terminal of the DC-to-DC unit and a positive input terminal of the DC-to-AC unit 1: may be a direct current cable for coupling a negative output terminal of the DC-to-DC unit and a negative input terminal of the DC-to-AC unit N; or may be a direct current cable for coupling the third output terminal and the first node. For example, the energy storage unit is coupled in parallel between a direct current cable for coupling a positive output terminal of the DC-to-DC unit and a positive input terminal of the DC-to-AC unit 1, and a direct current cable for coupling a negative output terminal of the DC-to-DC unit and a negative input terminal of the DC-to-AC unit N. Alternatively, the energy storage unit is coupled in parallel among three direct current cables for coupling the third output terminal and the first node. It may be understood that a quantity of energy storage units included in one power system is not limited, that is, a plurality of energy storage units may be coupled in parallel at the same time. This is not limited in this embodiment of this application.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Embodiment 6

Figure 39:
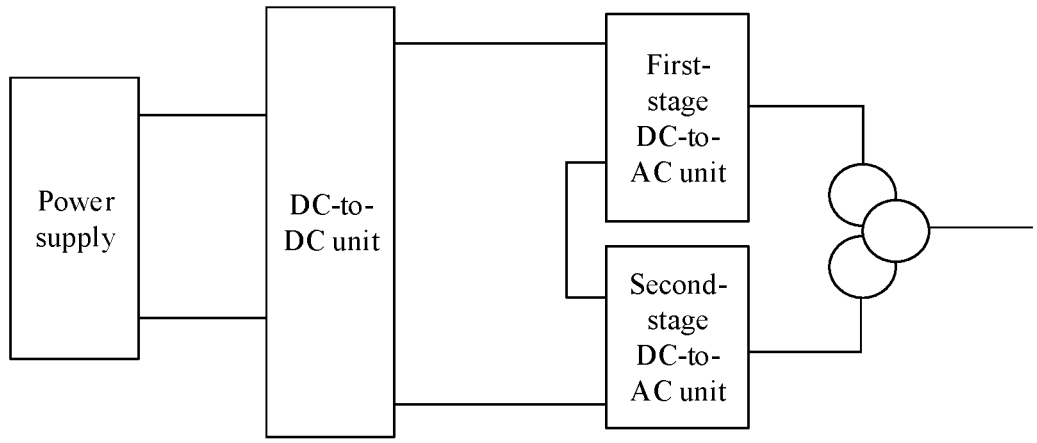
FIG. 39 is a schematic diagram of Embodiment 6 of a power system according to an embodiment of this application.

FIG. 39 is a schematic diagram of Embodiment 6 of a power system according to an embodiment of this application. The power system includes a power supply, a DC-to-DC unit, a first-stage DC-to-AC unit, and a second-stage DC-to-AC unit. An output terminal of the power supply is coupled to an input terminal of the DC-to-DC unit, and the power supply may be a photovoltaic array, an energy storage power supply, a wind power generation direct current source, or the like. The DC-to-DC unit may be an apparatus that can convert a direct current into an alternating current. This is similar to Embodiment 5, and details are not described herein again. A positive output terminal of the DC-to-DC unit is coupled to a positive input terminal of the first-stage DC-to-AC unit, and a negative output terminal of the DC-to-DC unit is coupled to a negative input terminal of the second-stage DC-to-AC unit. A negative input terminal of the first-stage DC-to-AC unit is coupled to a positive input terminal of the second-stage DC-to-AC unit.

In this embodiment of this application, the input terminals of the DC-to-AC units are cascaded to reduce a current between the DC-to-DC unit and the DC-to-AC unit, and resolve cost and loss problems of the cable from the DC-to-DC unit to the DC-to-AC unit. When the DC-to-DC unit is connected to a plurality of power supplies, an output voltage may be increased, so as to reduce a current between the DC-to-DC unit and the DC-to-AC unit, and resolve cost and loss problems of the cable from the DC-to-DC unit to the DC-to-AC unit.

In this embodiment of this application, output terminals of the first-stage DC-to-AC unit and the second-stage DC-to-AC unit are isolated for output, and are connected to different windings. This is similar to the case of isolated output of the DC-to-AC unit in Embodiment 1, and details are not described herein again. In this embodiment of this application, through cascaded input and isolated output of DC-to-AC units, specifications of power conversion devices are reduced. The specifications of power conversion devices in the current industry are insufficient (generally up to 1700 V for the IGBT). However, a 1500 V circuit breaker may be used in the power system provided in this embodiment of this application, and costs are low. The technical problem of insufficient specifications of power conversion devices in the current industry is resolved.

The third output terminal of the DC-to-DC unit may also be referred to as a middle point of an output terminal potential or referred to as a first node. The negative input terminal of the first-stage DC-to-AC unit is coupled to the positive input terminal of the second-stage DC-to-AC unit, and a coupling node after coupling is a second node.

Figure 40:
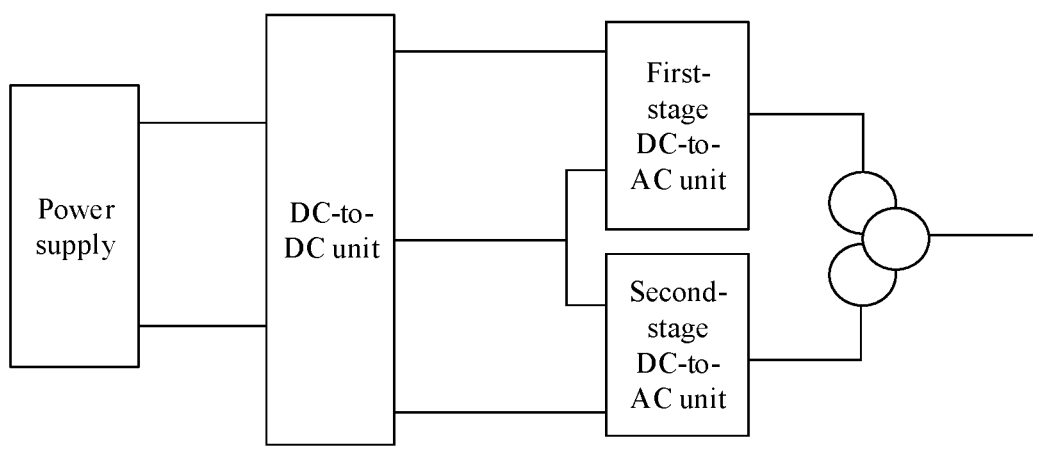
FIG. 40 is a schematic diagram of an embodiment of a power system according to an embodiment of this application.

FIG. 40 is a schematic diagram of an embodiment of a power system according to an embodiment of this application. As shown in FIG. 40, in some embodiments, a positive output terminal of the DC-to-DC unit is coupled to a positive input terminal of the first-stage DC-to-AC unit by using a first conductor, and a negative output terminal of the DC-to-DC unit is coupled to a negative input terminal of the second-stage DC-to-AC unit by using a second conductor. The first node and the second node are coupled by using a third conductor. It may be understood that, in this embodiment of this application, the first conductor, the second conductor, and the third conductor are all direct current cables connected between the DC-to-DC unit and the DC-to- AC unit (the first-stage DC-to-AC unit and the second-stage DC-to-AC unit). A material and a wire diameter specification of the cable may be configured according to an actual situation. This is not limited in this embodiment of this application.

In some embodiments, the first conductor, the second conductor, and the third conductor form a distributed double (DC) bus, where the first conductor and the second conductor form a positive bus, and the second conductor and the third conductor form a negative bus. The third conductor is a middle bus (Middle Cable) of the distributed double bus. The first conductor, the second conductor, and the third conductor are direct current conductors. In the 3D technology, a direct current bus is constructed by using three cables, a positive bus is constructed by using the first conductor and the second conductor, and a negative bus is constructed by using the second conductor and the third conductor.

In addition, because the first node is a middle point of an output terminal potential of the DC-to-DC unit, and the second node is a middle point of cascading the first-stage DC-to-AC unit and the second-stage DC-to-AC unit, it can be implemented that a current value on the third conductor is less than or equal to a current value on the first conductor. When the current value on the third conductor is less than or equal to the current value on the first conductor, the wire diameter specification of the third conductor may be reduced, thereby reducing costs of the third conductor. In another possible case, similarly, the current value on the third conductor is less than or equal to the current value on the second conductor. Therefore, when the current value on the third conductor is less than or equal to the current value on the second conductor, the wire diameter specification of the third conductor may be reduced, thereby reducing cable costs of the third conductor. Certainly, the current value of the third conductor may alternatively be less than the current value of the first conductor and less than the current value of the second conductor. This may also reduce the wire diameter specification of the third conductor, and reduce the cable costs of the third conductor.

Figure 41:
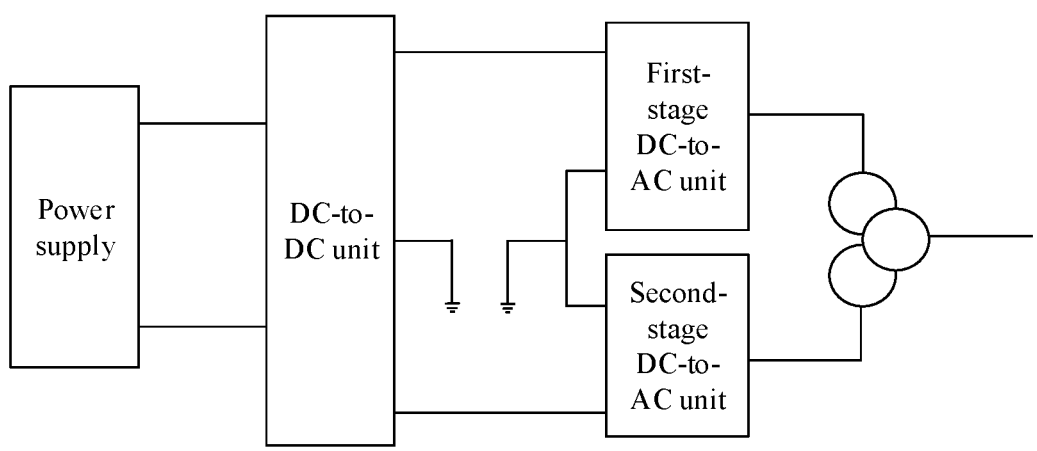
FIG. 41 is a schematic diagram of an embodiment of a power system according to an embodiment of this application.

FIG. 41 is a schematic diagram of an embodiment of a power system according to an embodiment of this application. As shown in FIG. 41, in some embodiments, both the first node and the second node are coupled to ground. In this embodiment of this application, both the first node and the second node are coupled to ground, so that when the output powers or output voltages of the DC-to-DC unit are asymmetric, or the input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore, costs of one cable and construction costs can be saved.

Figure 42:
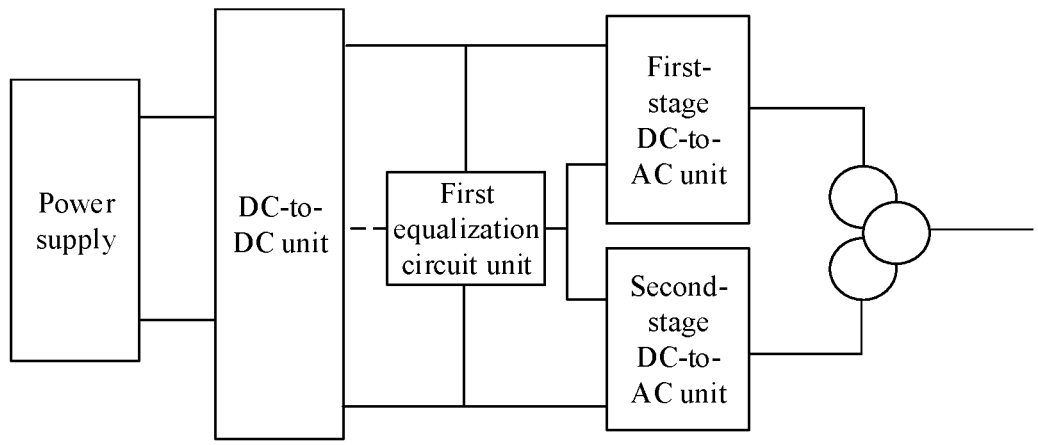
FIG. 42 is a schematic diagram of a power system that includes a first equalization circuit unit according to an embodiment of this application.

FIG. 42 is a schematic diagram of a power system that includes a first equalization circuit unit according to an embodiment of this application. In some embodiments, the power system further includes a first equalization circuit unit. The first equalization circuit unit is configured with a first interface, a second interface, and a third interface; the first interface is coupled to the second node; the second interface is coupled to a positive input terminal of a first-stage DC-to-AC unit; the third interface is coupled to a negative input terminal of a second-stage DC-to-AC unit. The first equalization circuit unit can balance input voltages and/or powers and/or currents of the first-stage DC-to-AC unit and the second-stage DC-to-AC unit. A working principle of the first equalization circuit unit is as follows: the first equalization circuit unit obtains energy from an input terminal of the first-stage DC-to-AC unit through the first interface and the second interface, and compensates the energy to the second-stage DC-to-AC unit through the first interface and the third interface; alternatively, the first equalization circuit unit obtains energy from an input terminal of the second-stage DC-to-AC unit through the first interface and the third interface, and compensates the energy to the first-stage DC-to-AC unit through the first interface and the second interface.

In a possible embodiment, the first equalization circuit unit may include four interfaces, that is, the first equalization circuit unit is further configured with a fourth interface. The fourth interface is coupled to the first node. This is similar to the embodiment corresponding to FIG. 21, and details are not described herein again.

Figure 43:
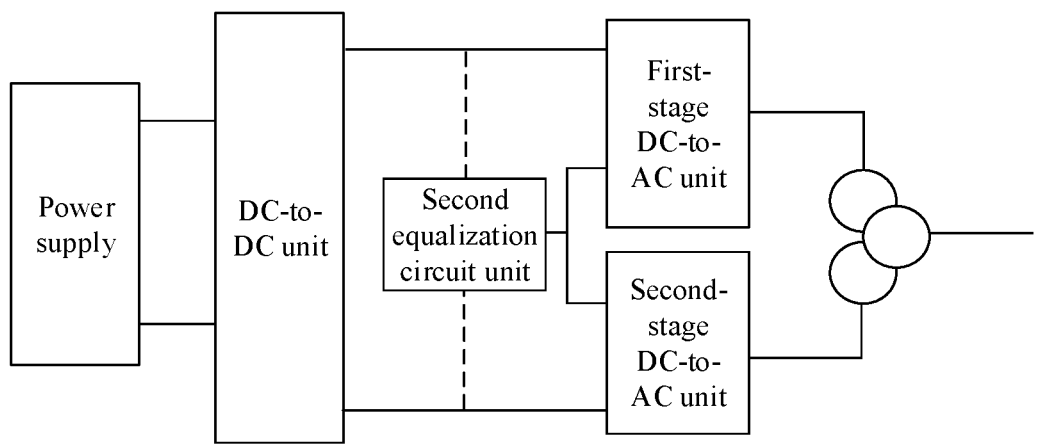
FIG. 43 is a schematic diagram of a power system that includes a second equalization circuit unit according to an embodiment of this application.

FIG. 43 is a schematic diagram of a power system that includes a second equalization circuit unit according to an embodiment of this application. The second equalization circuit unit is configured with a fifth interface and a sixth interface. The fifth interface is coupled to the second node. In some embodiments, the sixth interface is coupled to a positive input terminal of the first-stage DC-to-AC unit. This is similar to the embodiment corresponding to FIG. 22a, and details are not described herein again. In some embodiments, the sixth interface is coupled to a negative input terminal of the second-stage DC-to-AC unit. This is similar to the embodiment corresponding to FIG. 22b, and details are not described herein again.

Figure 44:
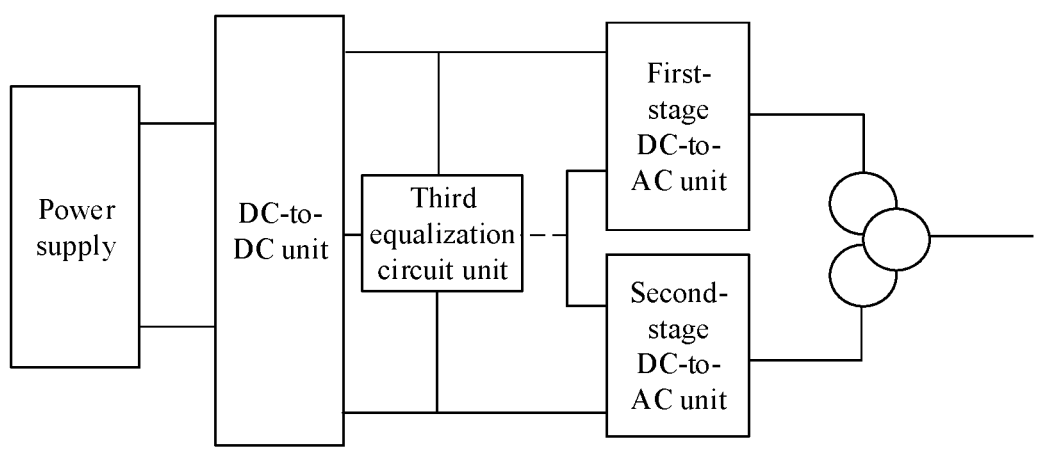
FIG. 44 is a schematic diagram of a power system that includes a third equalization circuit unit according to an embodiment of this application.

FIG. 44 is a schematic diagram of a power system that includes a third equalization circuit unit according to an embodiment of this application. The third equalization circuit unit is configured with a seventh interface, an eighth interface, and a ninth interface. The seventh interface is coupled to the first node. The eighth interface is coupled to a positive output terminal of the DC-to-DC unit. The ninth interface is coupled to a negative output terminal of the DC-to-DC unit. In some embodiments, the third equalization circuit unit is further configured with a tenth interface, and the tenth interface is coupled to the second node. A principle of the third equalization circuit unit is similar to the embodiment corresponding to FIG. 23, and details are not described herein again.

Figure 45:
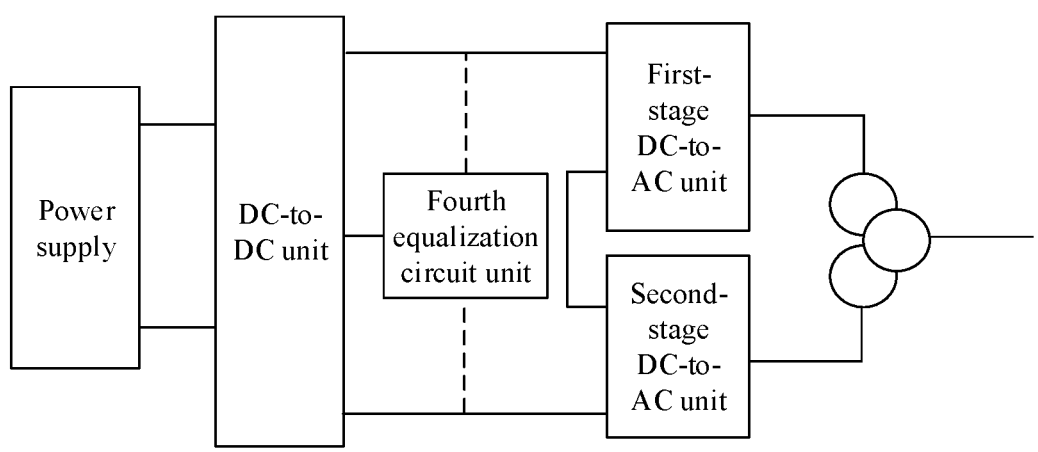
FIG. 45 is a schematic diagram of a power system that includes a fourth equalization circuit unit according to an embodiment of this application.

FIG. 45 is a schematic diagram of a power system that includes a fourth equalization circuit unit according to an embodiment of this application. The fourth equalization circuit unit is configured with an eleventh interface and a twelfth interface. The eleventh interface is coupled to the first node. In some embodiments, the twelfth interface is coupled to a positive input terminal of the DC-to-DC unit. A principle of the fourth equalization circuit unit is similar to the embodiment corresponding to FIG. 24a, and details are not described herein again. In some embodiments, the twelfth interface is coupled to a negative input terminal of the DC-to-DC unit. A principle of the fourth equalization circuit unit is similar to the embodiment corresponding to FIG. 24b, and details are not described herein again.

In some embodiments, output terminals of the first-stage DC-to-AC unit and the second-stage DC-to-AC unit are respectively coupled to different transformers; alternatively, output terminals of the first-stage DC-to-AC unit and the second-stage DC-to-AC unit are respectively coupled to different windings of a same transformer, to implement isolated output.

In some embodiments, there are a plurality of power supplies and/or a plurality of DC-to-DC units and/or a plurality of DC-to-AC units, and the power system includes at least one power supply, at least one DC-to-DC unit, and at least one pair of DC-to-AC conversion units. A pair of DC-to-AC conversion units includes a first-stage DC-to-AC unit and a second-stage DC-to-AC unit. When at least one power supply, at least one DC-to-DC unit, and at least one pair of DC-to-AC conversion units are coupled, each DC-to-DC unit is coupled to at least one power supply. Alternatively, similar input terminals of each DC-to-DC unit are coupled in parallel and then coupled to each power supply. Each pair of DC-to-AC conversion units is coupled to at least one pair of DC-to-DC units. Alternatively, similar input terminals of each pair of DC-to-AC conversion units are coupled in parallel, and then coupled to each DC-to-DC unit. This is similar to the description of parallel connection of a plurality of units in Embodiment 5, and details are not described herein again.

In some embodiments, an insulation monitoring device is coupled between an output terminal of the first-stage DC-to-AC unit and a ground point. In some other embodiments, an IMD device is coupled between an output terminal of the second-stage DC-to-AC unit and a ground point. In some other embodiments, a first IMD device is coupled between an output terminal of the first-stage DC-to-AC unit and a ground point, and a second IMD device is coupled between an output terminal of the second-stage DC-to-AC unit and a ground point. The IMD device can detect insulation impedance of the power system to ground. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation. This is similar to the embodiment corresponding to FIG. 26, and details are not described herein again.

In this embodiment of this application, a communication signal is coupled to a direct current cable connected among the power supply, the DC-to-DC unit, the first-stage DC-to-AC unit, and the second-stage DC-to-AC unit. The communication signal is used to implement communication among the power supply, the DC-to-DC unit, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to an output terminal of the first-stage DC-to-AC unit, and the alternating current cable may be further coupled to another device. The first-stage DC-to-AC unit may communicate with another device on the alternating current cable by using the communication signal. When a plurality of combinations of DC-to-AC units are connected in parallel, and outputs of a plurality of first-stage DC-to-AC units are connected in parallel, the parallel output terminals of the plurality of first-stage DC-to-AC units may communicate with another device coupled to a connected alternating current cable by using a communication signal on the alternating current cable. The another device described above may be an alternating current device that uses an alternating current. Similarly, a communication situation of an output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

In some embodiments, the power system provided in this embodiment of this application may be further configured with a leakage current sensor. An output terminal of the power supply is coupled to a leakage current sensor; and/or an input terminal of the DC-to-DC unit is coupled to a leakage current sensor; and/or a positive input terminal of the first-stage DC-to-AC unit and a negative input terminal of the first-stage DC-to-AC unit are coupled to a leakage current sensor; and/or a positive input terminal of the second-stage DC-to-AC unit and a negative input terminal of the second-stage DC-to-AC unit are coupled to a leakage current sensor, and/or an internal output phase line of the first-stage DC-to-AC unit is coupled to a leakage current sensor; and/or an internal output phase line of the second-stage DC-to-AC unit is coupled to a leakage current sensor; when the leakage current sensor detects that a leakage current value is greater than a preset threshold, the leakage current sensor of the power supply and/or the first-stage DC-to-AC unit and/or the second-stage DC-to-AC unit and/or the DC-to-DC unit reports an alarm and/or the power system stops working. This is similar to the embodiment corresponding to FIG. 27, and details are not described herein again.

In some embodiments, an internal output phase line connected to an output terminal of the first-stage DC-to-AC unit is connected in series to at least one switch, so as to implement fast shutdown of the output of the first-stage DC-to-AC unit. The switch may be a relay, a circuit breaker, or a conductor, or may be another type of switch. This is not limited in this embodiment of this application. Similarly, an internal output phase line connected to the output terminal of the second-stage DC-to-AC unit may also be connected in series to a switch. This is similar to the case in which the output phase line of the first-stage DC-to-AC unit is connected in series to a switch. Details are not described herein again.

In this embodiment of this application, when the power supply is a photovoltaic array, the power system may be referred to as a photovoltaic power generation system. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node is coupled to ground, so that when the output powers or output voltages of the first-stage DC-to-DC unit and the second DC-to-DC unit are asymmetric, or the input powers or input voltages of the first-stage DC-to-AC unit and the second DC-to-AC unit are asymmetric, a current loop can be provided to achieve voltage equalization, thereby ensuring normal operation of the system, and saving costs of one cable and construction costs.

In this embodiment of this application, in the photovoltaic power generation system, a PID phenomenon may be eliminated by coupling a voltage source. In some embodiments, a voltage source is coupled between a neutral point of a transformer winding corresponding to the output terminal of the second-stage DC-to-AC unit and a ground point, so as to adjust a potential of the neutral point to ground. Alternatively, a voltage source is coupled between a neutral point of a transformer winding corresponding to the output terminal of the first-stage DC-to-AC unit and a ground point, so as to adjust a voltage. This is similar to the description in Embodiment 4, and details are not described herein again.

In some embodiments, in the photovoltaic power generation system, a voltage source may be coupled between an output-side external phase line of the first-stage DC-to-AC unit and/or the second-stage DC-to-AC unit and a ground point, to adjust a potential of the corresponding output phase line to ground and eliminate a PID phenomenon. This is similar to the principle in the embodiment corresponding to FIG. 12b, and details are not described herein again.

In some embodiments, in the photovoltaic power generation system, a voltage source may be coupled between an internal phase line at the output terminal of the first-stage DC-to-AC unit and/or the second-stage DC-to-AC unit and a ground point, to adjust a potential of the corresponding output phase line to ground and eliminate a PID phenomenon. This is similar to the principle in the embodiment corresponding to FIG. 12c, and details are not described herein again.

In some embodiments, in the photovoltaic power generation system, the photovoltaic power generation system further includes an isolation unit. The isolation unit is also referred to as an AC-to-DC isolation unit, and may be arranged inside the first-stage DC-to-AC unit. An input terminal of the isolation unit is coupled to an internal phase line at the output terminal of the first-stage DC-to-AC unit. A first output terminal of the isolation unit is coupled to ground, and a second output terminal of the isolation unit is coupled to a positive input terminal and/or a negative input terminal of the first-stage DC-to-AC unit. The isolation unit may alternatively be arranged inside the second-stage DC-to-AC unit. This is similar to the embodiment corresponding to FIG. 13, and details are not described herein again.

In some embodiments, in the photovoltaic power generation system, the photovoltaic array may be a photovoltaic array formed through series/parallel connection after an output terminal of the photovoltaic panel is connected in series to an optimizer or a shutdown device, and a communication signal is coupled to a direct current cable connected to an output terminal of the optimizer or the shutdown device. The DC-to-DC unit and/or the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

In some embodiments, a communication signal is coupled to a direct current cable among the first-stage DC-to-AC unit, the second-stage DC-to-AC unit, and the DC-to-DC unit. The first-stage DC-to-AC unit and/or the second-stage DC-to-AC unit control the DC-to-DC unit by using the communication signal, so as to implement fast shutdown of input terminals of the DC-to-DC unit.

In some embodiments, the photovoltaic power generation system further includes at least one energy storage unit. At least two direct current cables connected to the DC-to-DC unit, the first-stage DC-to-AC unit, and the second-stage DC-to-AC unit are coupled in parallel to the energy storage unit. This is similar to the energy storage unit in Embodiment 5, and details are not described herein again.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Figure 46:
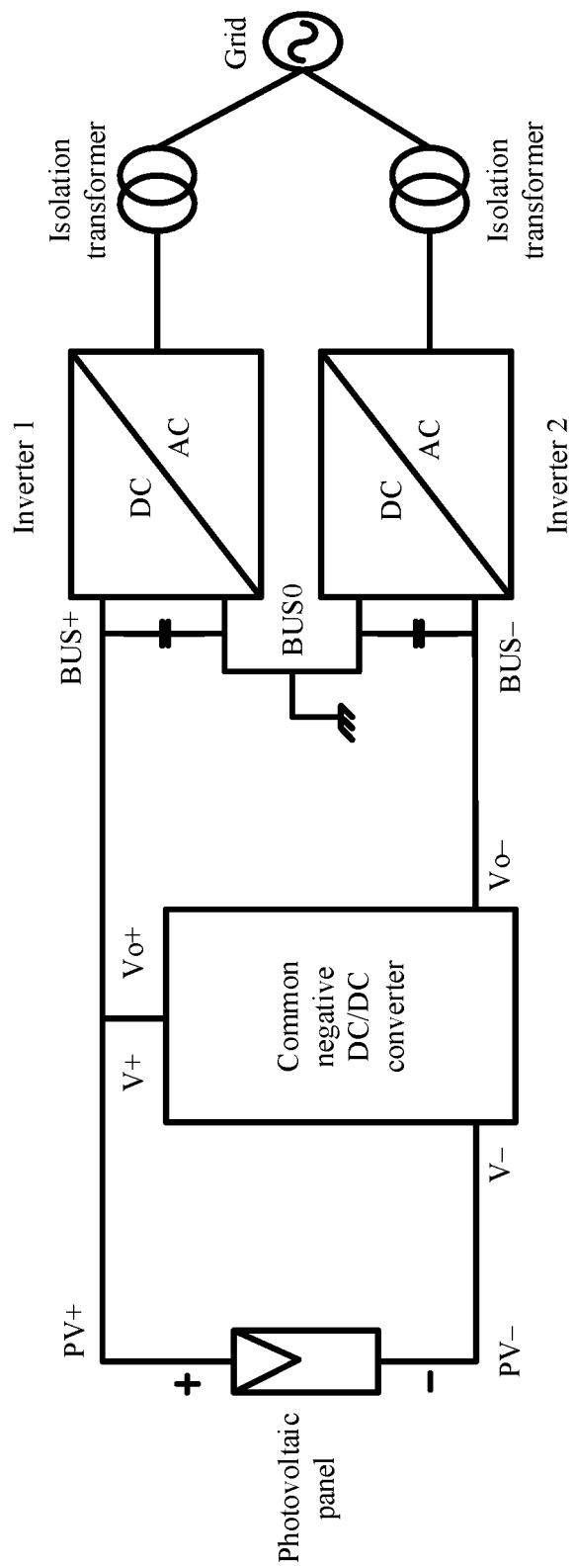
FIG. 46 is a schematic diagram of another embodiment of a photovoltaic power generation system according to an embodiment of this application.

FIG. 46 is a schematic diagram of another embodiment of a photovoltaic power generation system according to an embodiment of this application. The power supply is a series-parallel connection of photovoltaic panels, and the DC-to-DC unit is a common positive DC/DC converter. When the system is connected to the grid for operation, a potential of BUS0 is equal to a potential of the ground. In this case, the potential of PV+ to ground and the potential of BUS+ to the middle point (a potential of the bus positive terminal BUS+ to the bus middle point BUS0) are consistent. As long as a voltage of the bus positive terminal BUS+ to the bus middle point BUS0 is greater than or equal to a voltage of PV+ to PV−, a voltage of the photovoltaic panel to ground is greater than or equal to 0 V. and a PID phenomenon is eliminated. Alternatively, to further stabilize the potential of BUS0. BUS0 may be coupled to ground to ensure that the potential of BUS0 is consistent with the potential of the ground when the system works normally. The DC-to-DC converter is a boost converter, and the voltage boosting function can ensure that the voltage of BUS+ to BUS0 is greater than or equal to the voltage of PV+ to PV−, and the voltage of the photovoltaic panel to ground is greater than or equal to 0 V. In addition, if the BUS0 point is grounded, sampling of voltages of V0+ and V0—to ground is implemented in the DC-to-DC converter; if the used voltage exceeds a preset value, the DC-to-DC converter stops working. Alternatively, the BUS0 point is coupled to the DC-to-DC converter, so that sampling of voltages of V0+ and V0—to the BUS0 point is implemented; if the used voltage exceeds a preset value, the DC-to-DC converter stops working.

Figure 47:
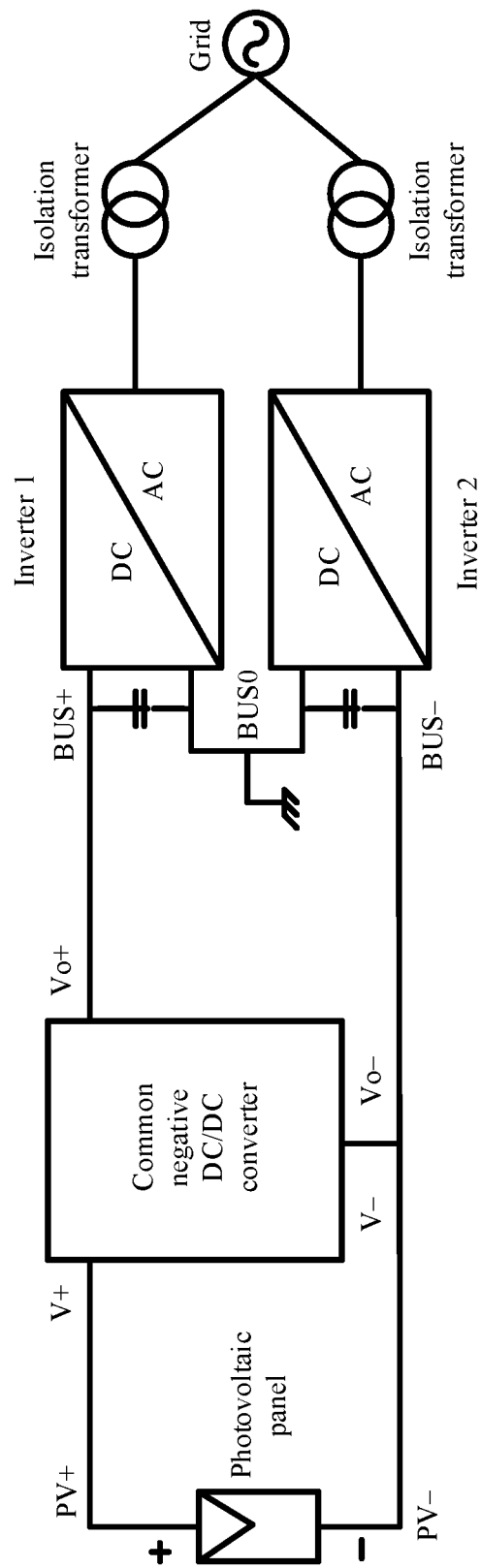
FIG. 47 is a schematic diagram of another embodiment of a photovoltaic power generation system according to an embodiment of this application.

Similarly, to meet the requirement that the voltage of the battery panel to the ground be less than 0 V, so as to eliminate a PID phenomenon, the DC-to-DC unit to be used may be a common negative DC-to-DC converter, as shown in FIG. 47. FIG. 47 is a schematic diagram of another embodiment of a photovoltaic power generation system according to an embodiment of this application. When the system is connected to the grid for operation, a potential of BUS0 is equal to a potential of the ground. In this case, the potential of PV− to ground and the potential of BUS− to the middle point (a potential of the bus negative terminal BUS—to the bus middle point BUS0) are consistent. As long as an absolute value of a voltage of BUS− to the bus middle point BUS0 is greater than or equal to a voltage of PV+ to PV−, a voltage of the photovoltaic panel to ground is less than or equal to 0 V. and a PID phenomenon is eliminated. Alternatively, to further stabilize the potential of BUS0. BUS0 may be coupled to ground to ensure that the potential of BUS0 is consistent with the potential of the ground when the system works normally. The DC-to-DC converter is a boost converter, and the voltage boosting function can ensure that the absolute value of the voltage of BUS− to the bus middle point BUS0 is greater than or equal to the voltage of PV+ to PV−, and the voltage of the photovoltaic panel to ground is less than or equal to 0 V. and a PID phenomenon is eliminated.

Figure 48A:
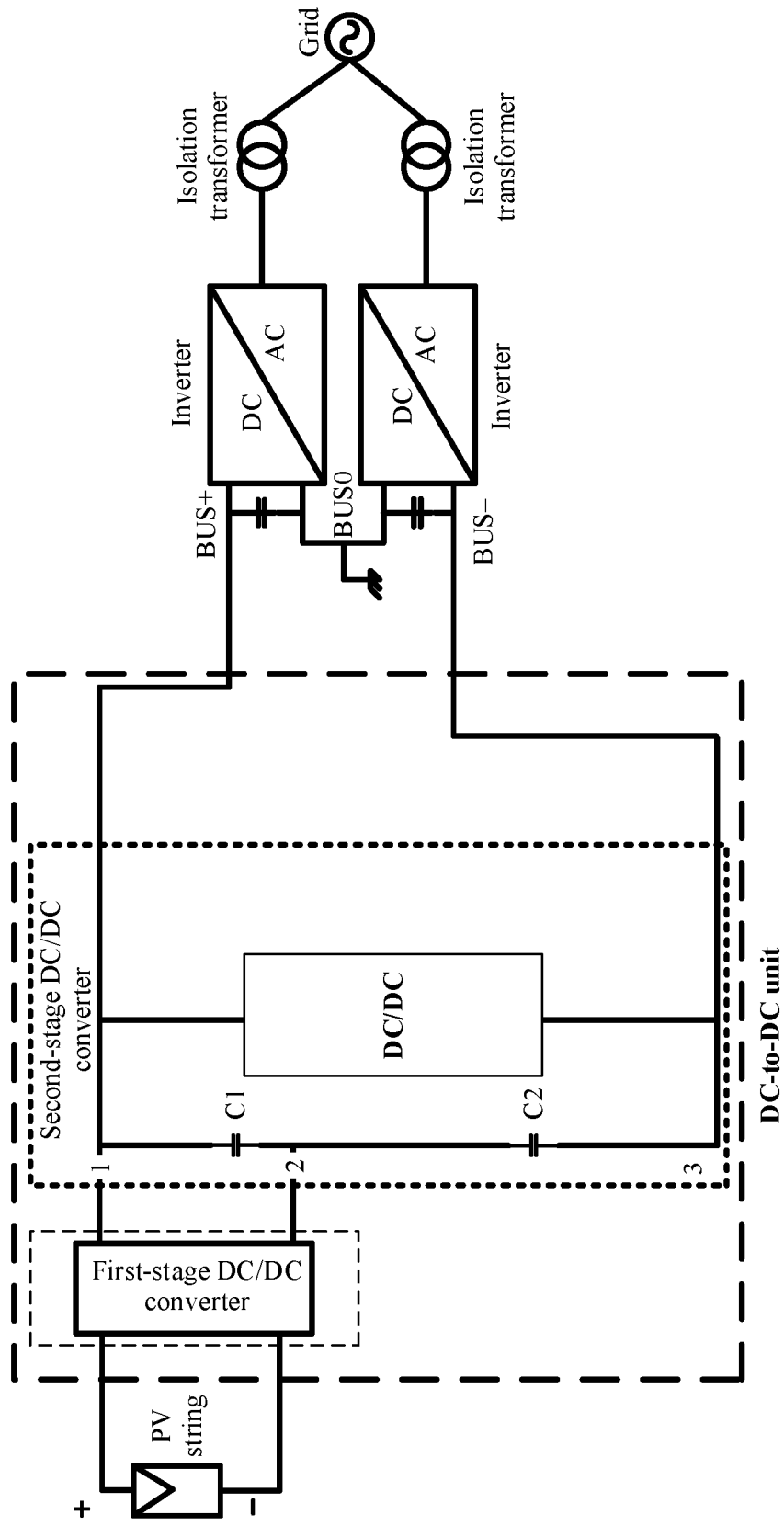
FIG. 48a is a schematic diagram 1 of another embodiment of a photovoltaic power generation system according to an embodiment of this application.

FIG. 48*a* is a schematic diagram 1 of another embodiment of a photovoltaic power generation system according to an embodiment of this application. The DC-to-DC unit may include a first-stage DC-to-DC converter and a second-stage DC-to-DC converter, and the first-stage DC-to-DC converter can implement a boost/buck/buck-boost function. The second-stage DC-to-DC converter transfers part of energy on C1 to C2 by using a DC/DC module inside the second-stage DC-to-DC converter, so that the average voltage on C1 is equal to the average voltage on C2. When the system is connected to the grid for operation, the potential of BUS0 is equal to the potentials of the ground and the second node. In this case, the potential of the string PV− is higher than or equal to the potential of the second node, and the voltage of the string PV− to ground is greater than or equal to 0 V, so as to eliminate a PID phenomenon. Alternatively, to further stabilize the potential of the second node. BUS0 may be coupled to the second node, or BUS0 and/or the second node may be coupled to ground, so as to ensure that the potential of the second node and the potential of the ground are consistent when the system works normally.

Figure 48B:
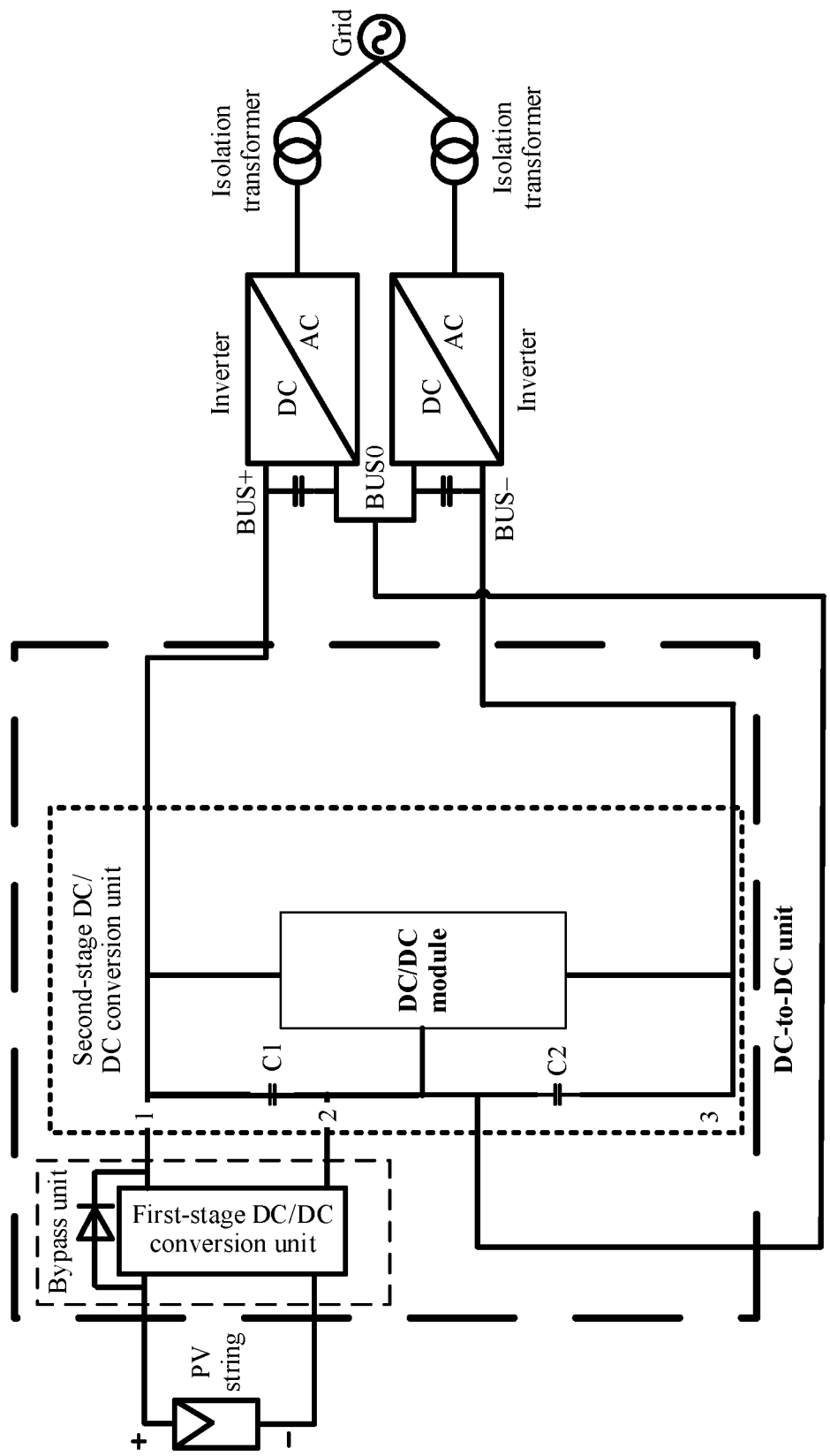
FIG. 48b is a schematic diagram 2 of another embodiment of a photovoltaic power generation system according to an embodiment of this application.
Figure 48C:
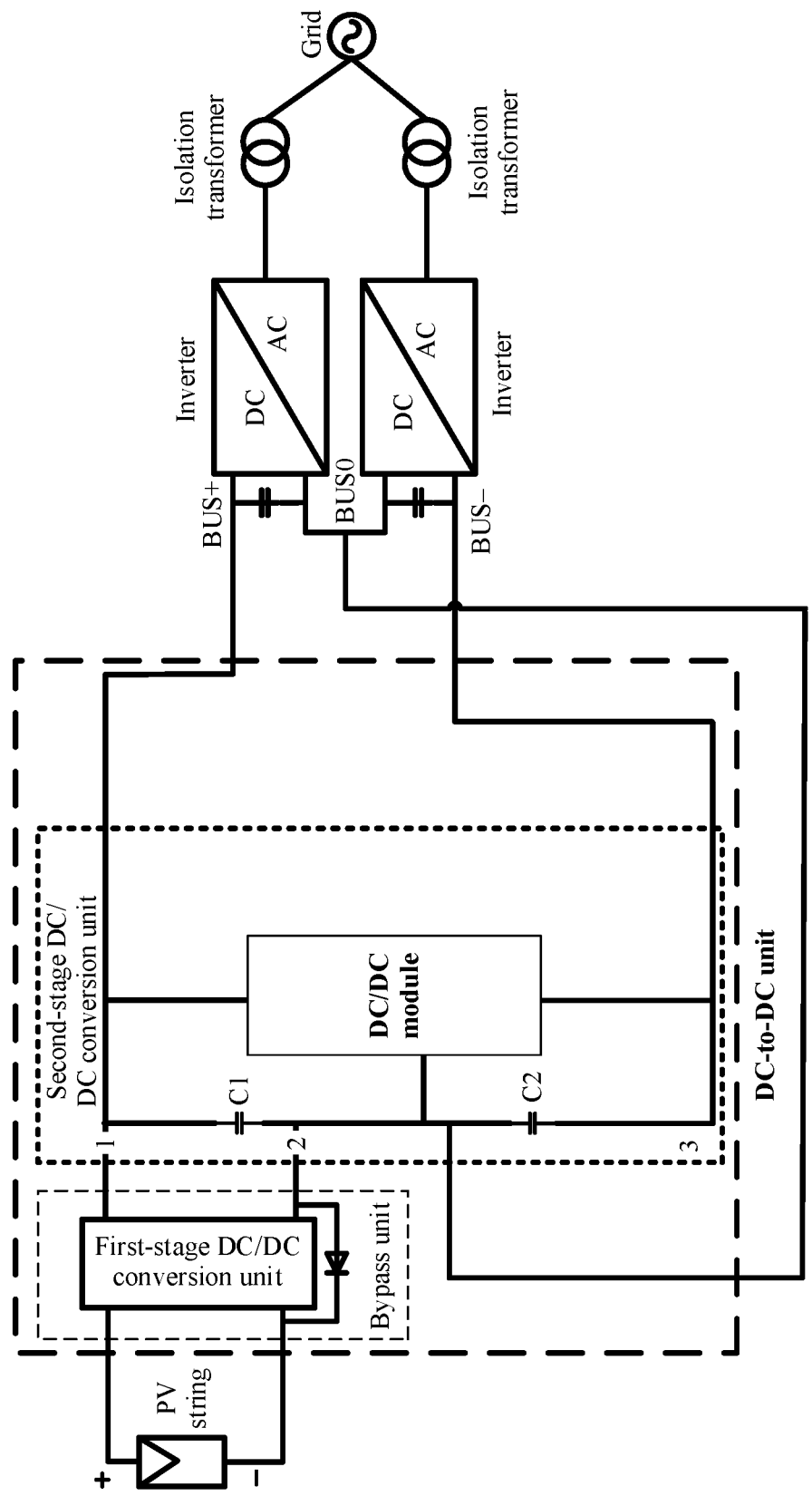
FIG. 48c is a schematic diagram 3 of another embodiment of a photovoltaic power generation system according to an embodiment of this application.

As shown in FIG. 48*b* and FIG. 48*c*, if the node 2 and BUS0 (the second node) are coupled, when the input voltage and/or the input current and/or the input power of the first-stage DC-to-DC conversion unit exceeds a first preset value, the first-stage DC-to-DC conversion unit works in bypass mode; and/or when the voltage and/or the power output by the first-stage DC-to-DC conversion unit exceeds a second preset value, the second-stage DC-to-DC conversion unit stops working (the output of the first-stage DC-to-DC conversion unit directly reaches the DC-to-AC unit); and/or at least one of the first-stage DC-to-AC unit and the second-stage DC-to-AC unit works. In this embodiment of this application, when the input voltage and/or the input current and/or the input power and/or the output voltage and/or the output current and/or the output power of the first-stage DC-to-DC conversion unit is excessively high, a proper unit and/or a proper working mode is selected, so as to ensure normal operation of the system in real time or avoid unnecessary waste, and improve conversion efficiency and utilization of the entire system.

The foregoing first-stage DC-to-DC conversion unit works in bypass mode, including two cases, as shown in FIG. 48*b* and FIG. 48*c*. FIG. 48*b* is a schematic diagram 2 of another embodiment of a photovoltaic power generation system according to an embodiment of this application. As shown in FIG. 48*b*, the first-stage DC-to-DC conversion unit works in bypass mode, and the bypass mode is that a bypass unit is coupled in parallel between a positive input terminal and a positive output terminal of the first-stage DC-to-DC conversion unit. In this case, a power flows into an input side of the second-stage DC-to-DC conversion unit through the bypass unit, and the first-stage DC-to-DC conversion unit stops working. The bypass unit may be a diode, a switch, a relay, a semiconductor switch tube, or the like. When the bypass unit is a diode, an anode of the diode is coupled to the positive input terminal, and a cathode of the diode is coupled to the positive output terminal. FIG. 48*c* is a schematic diagram 3 of another embodiment of a photovoltaic power generation system according to an embodiment of this application. As shown in FIG. 48*c*, the bypass mode is that a bypass unit is coupled in parallel between a negative input terminal and a negative output terminal of the first-stage DC-to-DC conversion unit. In this case, a power flows into an input side of the second-stage DC-to-DC conversion unit through the bypass unit, and the first-stage DC-to-DC conversion unit stops working. The bypass unit may be a diode, a switch, a relay, a semiconductor switch tube, or the like. When the bypass unit is a diode, an anode of the diode is coupled to the negative output terminal, and a cathode of the diode is coupled to the negative input terminal.

In some embodiments, in the examples shown in FIG. 48*a*, FIG. 48*b*, and FIG. 48*c*, there are a plurality of first-stage DC-to-DC conversion units, and output terminals of the plurality of first-stage DC-to-DC conversion units are coupled in parallel, and then coupled to the second-stage DC-to-DC conversion unit.

Figure 49:
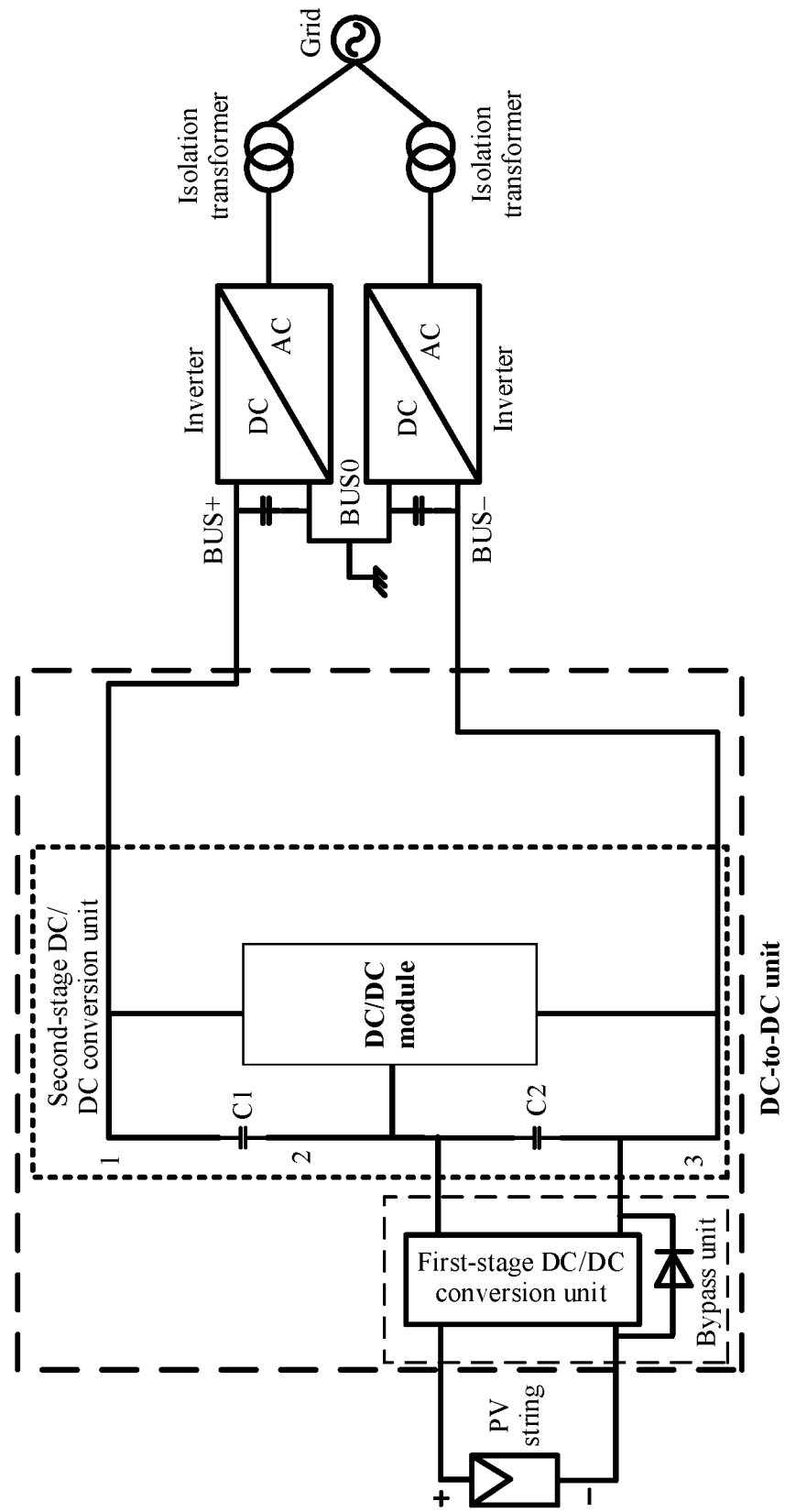
FIG. 49 is a schematic diagram of another embodiment of a photovoltaic power generation system according to an embodiment of this application.

Similarly, to meet the requirement that the voltage of the battery panel to the ground be less than 0 V, so as to eliminate a PID phenomenon, the DC-to-DC conversion unit shown in FIG. 49 may be used. FIG. 49 is a schematic diagram of another embodiment of a photovoltaic power generation system according to an embodiment of this application. A principle of the photovoltaic power generation system is similar to that in FIG. 48*a*, FIG. 48*b*, and FIG. 48*c*, and details are not described herein again.

Embodiment 7

Figure 50:
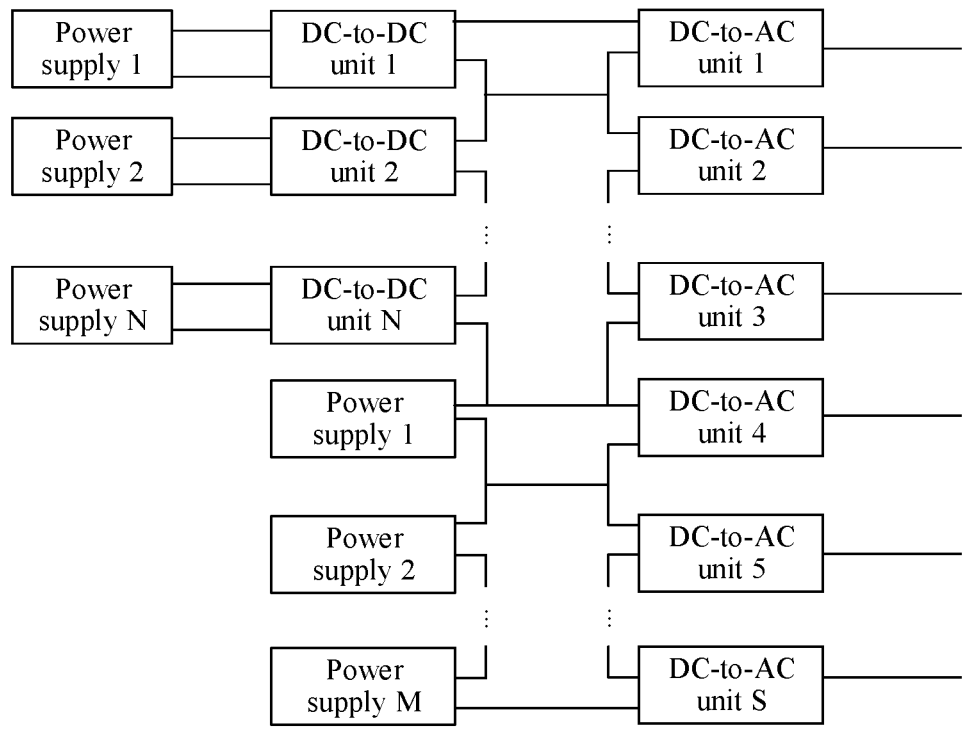
FIG. 50 is a schematic diagram of an embodiment of a power system according to an embodiment of this application.

FIG. 50 is a schematic diagram of an embodiment of a power system according to an embodiment of this application. The power system includes N first power supplies. M second power supplies. N DC-to-DC units, and S DC-to-AC units, where an output terminal of a first power supply is coupled to an input terminal of a DC-to-DC unit: a positive terminal formed by serially connecting output terminals of the N DC-to-DC units and output terminals of the M second power supplies is coupled to a positive terminal formed by serially connecting input terminals of the S DC-to-AC units; a negative terminal formed by serially connecting the output terminals of the N DC-to-DC units and the output terminals of the M second power supplies is coupled to a negative terminal formed by serially connecting the input terminals of the S DC-to-AC units; the output terminals of the N DC-to-DC units and the output terminals of the M second power supplies are coupled in series, and the series coupling points form a first node; the input terminals of the S DC-to-AC units are coupled in series, and the series coupling points form a second node; at least one first node and at least one second node are coupled by using at least one cable; output terminals of the DC-to-AC units are isolated.

In this embodiment of this application, a positive terminal formed by serially connecting output terminals of the N DC-to-DC units and output terminals of the M second power supplies is a port that does not participate in the series connection, and may be a positive terminal of the DC-to-DC unit or a positive terminal of the second power supply. A negative terminal formed by serially connecting the output terminals of the N DC-to-DC units and the output terminals of the M second power supplies is another port that does not participate in the series connection, and may be a negative terminal of the DC-to-DC unit or a negative terminal of the second power supply. A first node formed by serially connecting the output terminals of the N DC-to-DC units and the output terminals of the M second power supplies is a coupling node formed through series coupling, and may be a coupling node formed by serially connecting the DC-to- DC units, a coupling node formed by serially connecting the second power supplies, or a coupling node formed by serially connecting the DC-to-DC units and the second power supplies.

In this embodiment of this application, a positive terminal formed by serially connecting input terminals of the S DC-to-AC units may be an input port that does not participate in the series connection. For example, FIG. 50 shows a positive input terminal of a DC-to-AC unit 1. A negative terminal formed by serially connecting the input terminals of the S DC-to-AC units may be an input port that does not participate in the series connection. For example. FIG. 50 shows a negative input terminal of a DC-to-AC unit S. A second node formed by serially connecting the input terminals of the S DC-to-AC units is a coupling node formed through series connection. In FIG. 50, a node formed by coupling input terminals of the DC-to-AC unit 1 and the DC-to-AC unit 2 is a second node, a node formed by coupling input terminals of the DC-to-AC unit 3 and the DC-to-AC unit 4 is also a second node, and in addition, there are other second nodes, which are not enumerated herein.

In this embodiment of this application, the first power supply and the second power supply may be photovoltaic arrays, energy storage power supplies, wind power generation direct current sources, or the like, which are similar to the power supplies in Embodiment 3. Details are not described herein again. The DC-to-DC unit may be an apparatus that can convert a direct current into a direct current, for example, a DC/DC converter. The DC-to-DC unit is similar to the DC-to-DC unit in Embodiment 3, and details are not described herein again. The DC-to-AC unit may be an apparatus that can convert a direct current into an alternating current, for example, an inverter. The DC-to-AC unit is similar to the DC-to-AC unit in Embodiment 3, and details are not described herein again.

In this embodiment of this application, the output terminal of the second power supply is cascaded, the output terminal of the DC-to-DC unit is cascaded, and the input terminal of the DC-to-AC unit is cascaded, so as to increase an output voltage, reduce a current between the DC-to-DC unit and the DC-to-AC unit, and resolve cost and loss problems of the cable from the DC-to-DC unit to the DC-to-AC unit. When the DC-to-DC unit is connected to a plurality of power supplies, an output voltage may be increased, so as to reduce a current between the DC-to-DC unit and the DC-to-AC unit, and resolve cost and loss problems of the cable from the DC-to-DC unit to the DC-to-AC unit.

In this embodiment of this application, at least one first node and at least one second node are coupled. For example, in some embodiments, one first node is coupled to one second node, and the other first nodes and the other second nodes are not coupled. In some other embodiments, two first nodes are respectively coupled to two second nodes, and the other first nodes and the other second nodes are not coupled. In some other embodiments, a quantity of first nodes is equal to a quantity of second nodes, and each first node is coupled to a corresponding second node. In some other embodiments, a quantity of first nodes is different from a quantity of second nodes, each first node is coupled to a corresponding second node, and a remaining first node or a remaining second node is not coupled. In actual application, another coupling manner may alternatively be used. This is not limited in this embodiment of this application. In this embodiment of this application, a quantity of cables connected to the second power supply, the DC-to-DC unit, and the DC-to-AC unit is reduced in a manner of the first node and the second node, thereby reducing costs of the power system.

In this embodiment of this application, output terminals of DC-to-AC units are isolated for output. This is similar to the descriptions in Embodiments 1, 3, and 5, and details are not described herein again.

In some embodiments, at least two groups of corresponding first nodes are connected in parallel, and at least two groups of corresponding second nodes are connected in parallel; at least one first node connected in parallel is coupled to at least one second node connected in parallel; at least one third node connected in parallel is connected in parallel to at least one second node connected in parallel. It may be understood that when there are a plurality of groups of first power supplies, a plurality of groups of second power supplies, a plurality of groups of DC-to-DC units, and a plurality of groups of DC-to-AC units, the foregoing connection manner may be used.

In some embodiments, similar output terminals of a plurality of groups of DC-to-AC units are connected in parallel for output, or isolated for output. This is similar to the description in Embodiments 3, and details are not described herein again.

In some embodiments, a communication signal is coupled to a direct current cable connected between any two of the first power supply, the second power supply, the DC-to-DC unit, and the DC-to-AC unit, so that any two of the first power supply, the second power supply, the DC-to-DC unit, and the DC-to-AC unit may communicate by using the communication signal. Preferably, the communication signal may be a PLC signal. This is similar to the description in Embodiments 3, and details are not described herein again.

In some embodiments, the power supply is a photovoltaic array formed by connecting an output of a photovoltaic panel to an optimizer or a shutdown device, and then performing series/parallel combination. When a communication signal is coupled to the direct current cable connected among the power supply, the DC-to-DC unit, and the DC-to-AC unit, the communication signal also passes through the optimizer or the shutdown device, and the power supply, the DC-to-DC unit, or the DC-to-AC unit may control, by using the communication signal, the shutdown of the optimizer or the shutdown device, so as to implement fast shutdown. That is, the power supply, the DC-to-DC unit, or the DC-to-AC unit may send a communication signal that carries a shutdown instruction to the optimizer or the shutdown device. After receiving the communication signal that carries the shutdown instruction, the optimizer or the shutdown device executes the shutdown instruction, so as to implement fast shutdown. A situation of the communication signal is similar to the description of the communication signal in Embodiment 1, and details are not described herein again.

In some embodiments, a communication signal is coupled to a direct current cable connected between the DC-to-DC unit and the DC-to-AC unit, and the DC-to-AC unit can control the DC-to-DC unit by using the communication signal, so as to implement fast shutdown of the input of the DC-to-DC unit. For example, the DC-to-AC unit sends a communication signal that carries a shutdown instruction, and the communication signal reaches the DC-to-DC unit by using a corresponding direct current cable, so that the DC-to-DC unit executes the shutdown instruction after receiving the communication signal, thereby implementing fast shutdown of the input of the DC-to-DC unit.

In some embodiments, the power system further includes at least one energy storage unit. The energy storage unit is coupled in parallel to at least two direct current cables connected among the second power supply, the DC-to-DC unit, and the DC-to-AC unit. The direct current cables may be direct current cables coupled between the first node and the second node. For example, the energy storage unit is coupled in parallel between a direct current cable for coupling a positive output terminal of the DC-to-DC unit 1 and a positive input terminal of the DC-to-AC unit 1, and a direct current cable for coupling a negative output terminal of the DC-to-DC unit 2 and a negative input terminal of the DC-to-AC unit 2. Alternatively, the energy storage unit is coupled in parallel among three direct current cables for coupling the first node and the second node. It may be understood that a quantity of energy storage units included in one power system is not limited, that is, a plurality of energy storage units may be coupled in parallel at the same time. This is not limited in this embodiment of this application.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Embodiment 8

Figure 51A:
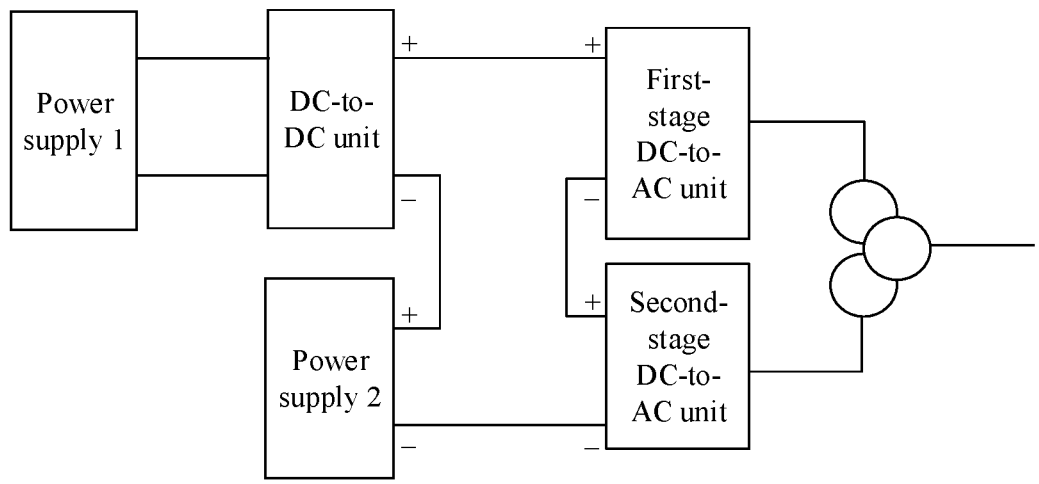
FIG. 51a is a schematic diagram 1 of a power system according to an embodiment of this application.
Figure 51B:
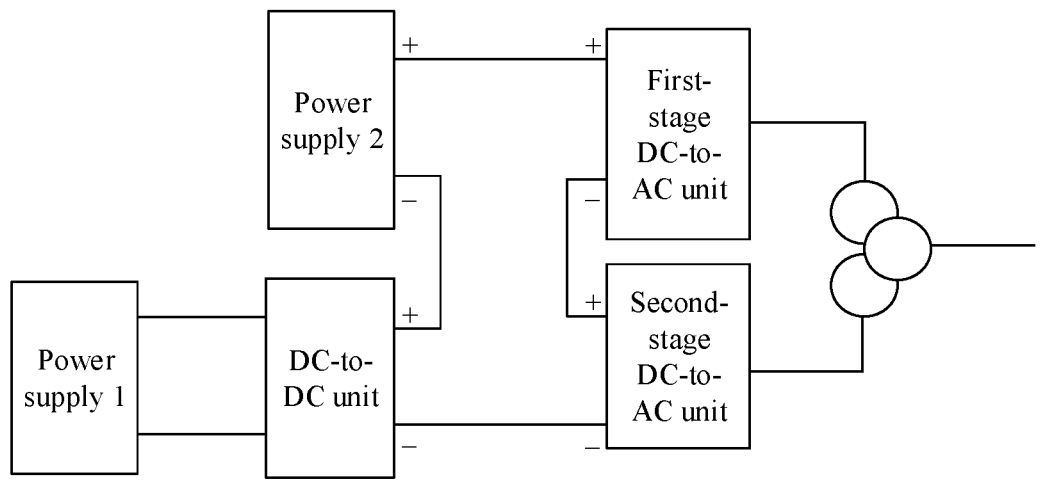
FIG. 51b is a schematic diagram 2 of a power system according to an embodiment of this application.

FIG. 51*a* is a schematic diagram 1 of a power system according to an embodiment of this application. FIG. 51*b* is a schematic diagram 2 of a power system according to an embodiment of this application. The power system includes a power supply 1, a power supply 2, a DC-to-DC unit, a first-stage DC-to-AC unit, and a second-stage DC-to-AC unit. An output terminal of the power supply 1 is coupled to an input terminal of the DC-to-DC unit; the DC-to-DC unit is coupled in series to an output terminal of the second power supply, and a coupling point is a first node: a negative input terminal of the first-stage DC-to-AC unit is coupled to a positive input terminal of the second-stage DC-to-AC unit, and a coupling point is a second node: a positive output terminal formed after the DC-to-DC unit is coupled in series to the output terminal of the second power supply is a first port (for example, a positive output terminal of the DC-to-DC unit in FIG. 51*a* or a positive output terminal of the power supply 2 in FIG. 51*b*), and the first port is coupled to a positive input terminal of the first-stage DC-to-AC unit; a negative output terminal formed after the DC-to-DC unit is coupled in series to the output terminal of the second power supply is a second port (for example, a negative output terminal of the power supply 2 in FIG. 51*a* or a negative output terminal of the DC-to-DC unit in FIG. 51*b*), and the second port is coupled to a negative input terminal of the second-stage DC-to-AC unit; output terminals of the first-stage DC-to-AC unit and the second-stage DC-to-AC unit are isolated for output.

In one embodiment, in a possible case, as shown in FIG. 51*a*, a positive output terminal of the DC-to-DC unit is coupled to a positive input terminal of the first-stage DC-to-AC unit, and a negative output terminal of the DC-to-DC unit is coupled to a positive output terminal of the power supply 2 to form a first node. A negative output terminal of the power supply 2 is coupled to a negative input terminal of the second-stage DC-to-AC unit, and a negative input terminal of the first-stage DC-to-AC unit is coupled to a positive input terminal of the second-stage DC-to-AC unit to form a second node. In another possible case, as shown in FIG. 51*b*, an output terminal of the power supply 1 is coupled to an input terminal of the DC-to-DC unit, and a negative output terminal of the DC-to-DC unit is coupled to a negative input terminal of the second-stage DC-to-AC unit. A positive output terminal of the DC-to-DC unit is coupled to a negative output terminal of the power supply 2, a positive output terminal of the power supply 2 is coupled to a negative input terminal of the first-stage DC-to-AC unit, and a negative input terminal of the first-stage DC-to-AC unit is coupled to a positive input terminal of the second-stage DC-to-AC unit. The following embodiment describes the case in FIG. 51*a*, and the same rule applies to the case in FIG. 51*b*, and details are not described again.

In this embodiment of this application, a cascading manner is used to increase an output voltage, so as to reduce a current among the power supply 2, the DC-to-DC unit, and the DC-to-AC unit, and resolve cost and loss problems of the cable from the DC-to-DC unit to the DC-to-AC unit.

Figure 52:
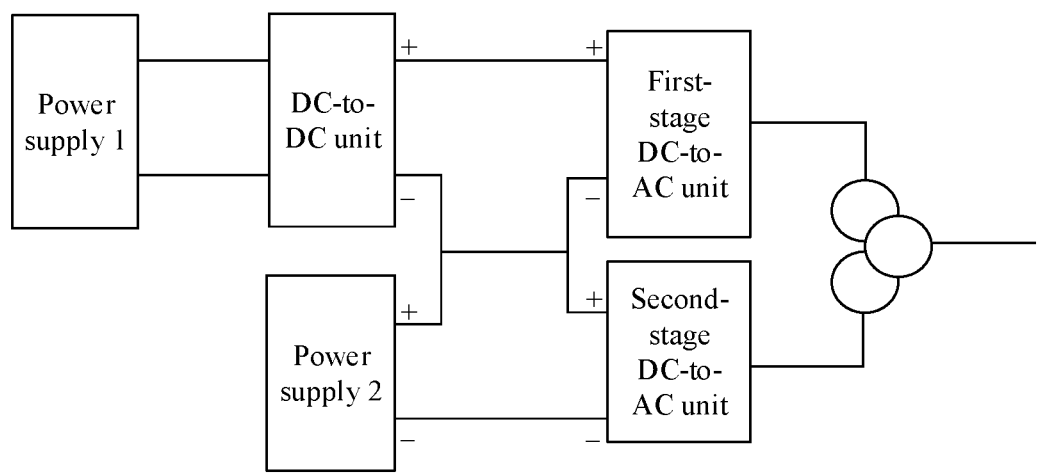
FIG. 52 is a schematic diagram of an embodiment of a power system according to an embodiment of this application.

FIG. 52 is a schematic diagram of an embodiment of a power system according to an embodiment of this application. In some embodiments, the first node is coupled to the second node, and four output ports of the DC-to-DC unit and the power supply 2 may be connected to the DC-to-AC unit by using three cables in a cascading manner, thereby reducing a quantity of cables and reducing costs. In addition, if a current value on the cable between the first node and the second node is smaller than a current value on the other two cables, a cable with a relatively low wire diameter specification may be used as the cable between the first node and the second node, thereby further reducing cable costs. This is similar to the description of FIG. 19 in Embodiment 4, and details are not described herein again.

In some embodiments, the first port is coupled to a positive input terminal of the first-stage DC-to-AC unit by using a first conductor, the second port is coupled to a negative input terminal of the second-stage DC-to-AC unit by using a second conductor, and the first node and the second node are coupled by using a third conductor. The first conductor, the second conductor, and the third conductor form a distributed double (DC) bus, the first conductor and the second conductor form a positive bus, and the second conductor and the third conductor form a negative bus. The third conductor is a middle bus (Middle Cable) of the distributed double bus. The first conductor, the second conductor, and the third conductor are direct current conductors. In the 3D technology, a direct current bus is constructed by using three cables, a positive bus is constructed by using the first conductor and the second conductor, and a negative bus is constructed by using the second conductor and the third conductor.

In some embodiments, both the first node and the second node are coupled to ground. In this embodiment of this application, both the first node and the second node are coupled to ground, so that when the output powers or output voltages of the DC-to-DC unit and the power supply 2 are asymmetric, or the input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore, costs of one cable and construction costs can be saved.

In some embodiments, the first node is coupled to the second node, and when an input voltage and/or an input current and/or an input power of the DC-to-DC unit, or an output voltage and/or an output current and/or an output power of the second power supply is less than a preset value, the corresponding DC-to-DC unit or the second power supply stops working. For example, if the input voltage of the DC-to-DC unit is less than the preset value, the DC-to-DC unit stops working. In another example, if the output voltage of the second power supply is less than the preset value, the second power supply stops working. At least one of the first-stage DC-to-AC unit and the second-stage DC-to-AC unit works. In this embodiment of this application, when the input voltage and/or the input current and/or the input power of the DC-to-DC unit, or the output voltage and/or the output current and/or the output power of the second power supply is excessively low, the corresponding DC-to-DC unit or the second power supply stops working. Selecting an appropriate unit to work can avoid unnecessary waste and improve conversion efficiency and utilization of the entire system.

When the first node and the second node are not coupled, the voltage may be adjusted by using an equalization circuit unit.

Figure 53:
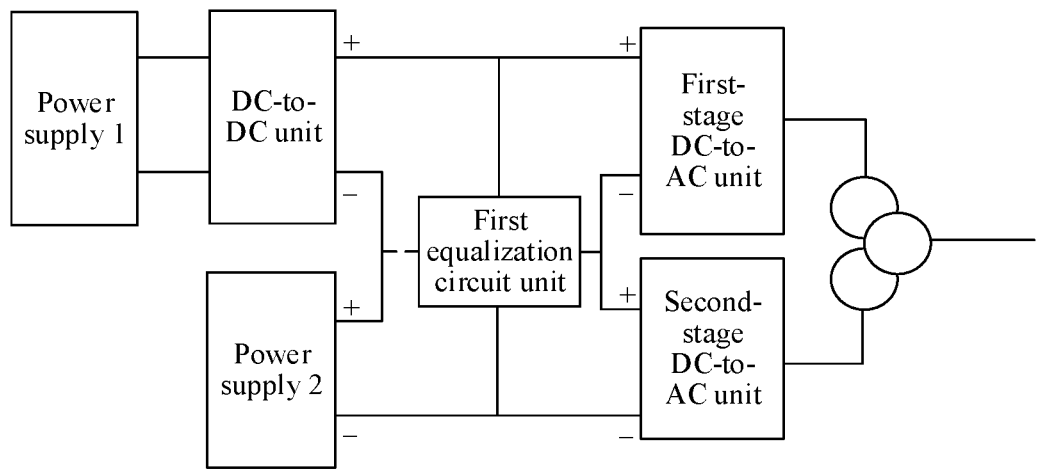
FIG. 53 is a schematic diagram of a power system that includes a first equalization circuit unit according to an embodiment of this application.

FIG. 53 is a schematic diagram of a power system that includes a first equalization circuit unit according to an embodiment of this application. In some embodiments, the power system further includes a first equalization circuit unit. The first equalization circuit unit is provided with a first interface, a second interface, and a third interface; the first interface is coupled to the second node: the second interface is coupled to a positive input terminal of a first-stage DC-to-AC unit; the third interface is coupled to a negative input terminal of a second-stage DC-to-AC unit. In some embodiments, the first equalization circuit unit is further configured with a fourth interface, and the fourth interface is coupled to the first node. This is similar to the embodiment corresponding to FIG. 21, and details are not described herein again.

Figure 54:
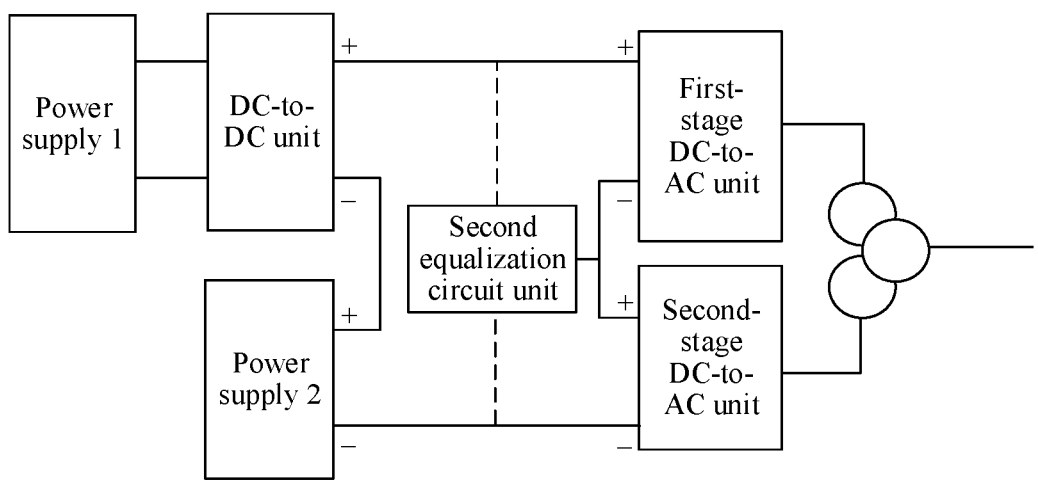
FIG. 54 is a schematic diagram of a power system that includes a second equalization circuit unit according to an embodiment of this application.

FIG. 54 is a schematic diagram of a power system that includes a second equalization circuit unit according to an embodiment of this application. In some embodiments, the power system includes a second equalization circuit unit. The second equalization circuit unit is configured with a fifth interface and a sixth interface. The fifth interface is coupled to the second node. The sixth interface is coupled to a positive input terminal of the first-stage DC-to-AC unit or to a negative input terminal of the second-stage DC-to-AC unit. This is similar to the embodiments corresponding to FIG. 22a and FIG. 22b, and details are not described herein again.

Figure 55:
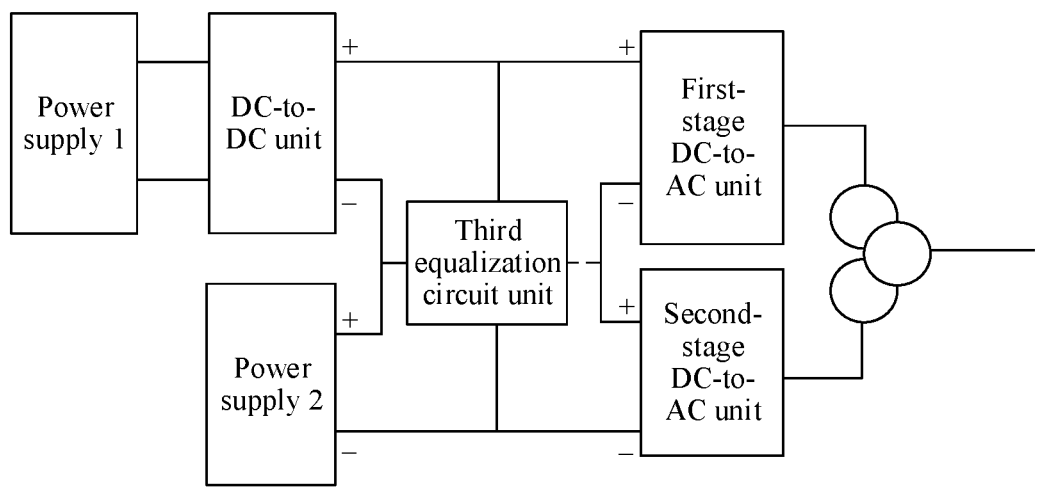
FIG. 55 is a schematic diagram of a power system that includes a third equalization circuit unit according to an embodiment of this application.

FIG. 55 is a schematic diagram of a power system that includes a third equalization circuit unit according to an embodiment of this application. In some embodiments, the power system includes a third equalization circuit unit. The third equalization circuit unit is configured with a seventh interface, an eighth interface, and a ninth interface. The seventh interface is coupled to the first node. The eighth interface is coupled to a positive output terminal of the DC-to-DC unit. The ninth interface is coupled to a negative output terminal of the power supply 2. In some embodiments, the third equalization circuit unit is further configured with a tenth interface, and the tenth interface is coupled to the second node. This is similar to the embodiment corresponding to FIG. 23, and details are not described herein again.

Figure 56:
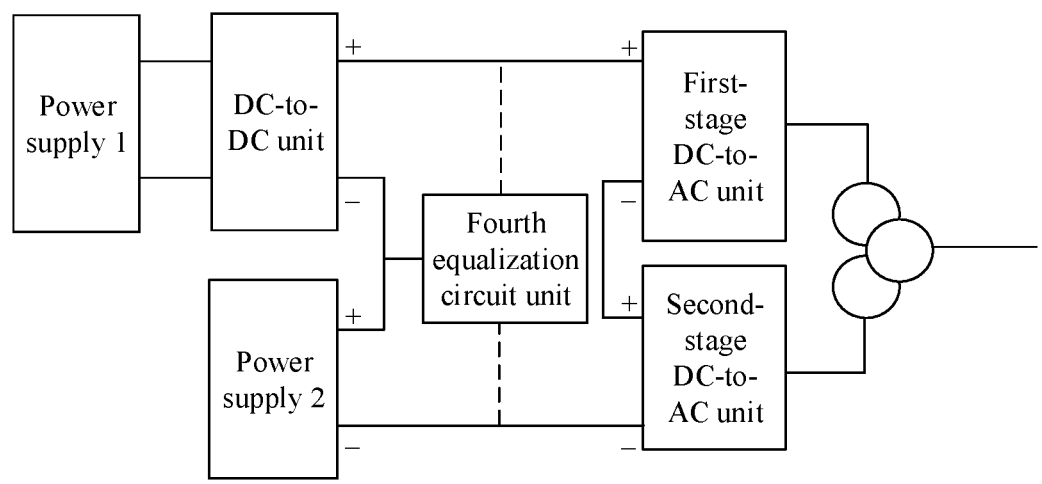
FIG. 56 is a schematic diagram of a power system that includes a fourth equalization circuit unit according to an embodiment of this application.

FIG. 56 is a schematic diagram of a power system that includes a fourth equalization circuit unit according to an embodiment of this application. In some embodiments, the power system includes a fourth equalization circuit unit. The fourth equalization circuit unit is configured with an eleventh interface and a twelfth interface. The eleventh interface is coupled to the first node, and the twelfth interface is coupled to a positive output terminal of the DC-to-DC unit or to a negative output terminal of the power supply 2. This is similar to the embodiments corresponding to FIG. 24a and FIG. 24b, and details are not described herein again.

In some embodiments, output terminals of the first-stage DC-to-AC unit and the second-stage DC-to-AC unit are respectively coupled to different transformers; alternatively, output terminals of the first-stage DC-to-AC unit and the second-stage DC-to-AC unit are respectively coupled to different windings of a same transformer, to implement isolated output.

In some embodiments, the power system includes at least one pair of power supplies, at least one DC-to-DC unit, and at least one pair of DC-to-AC conversion units. One pair of power supplies includes a power supply 1 and a power supply 2. One pair of DC-to-AC conversion units includes a first-stage DC-to-AC unit and a second-stage DC-to-AC unit. When at least one pair of power supplies, at least one DC-to-DC unit, and at least one pair of DC-to-AC conversion units are coupled, each DC-to-DC unit is coupled to at least one power supply 1. Each pair of DC-to-AC conversion units is coupled to at least one DC-to-DC unit or coupled to a power supply 2. Alternatively. similar input terminals of each pair of DC-to-AC conversion units are coupled in parallel, and then are coupled to one DC-to-DC unit or one power supply 2. It may be understood that, similar output terminals of a plurality of combinations of DC-to-AC units may be coupled in parallel for output, or may be isolated for output. This is similar to the description of Embodiment 2, and details are not described herein again.

In some embodiments, an IMD device is coupled between an output terminal of the first-stage DC-to-AC unit and a ground point. In some other embodiments, an IMD device is coupled between an output terminal of the second-stage DC-to-AC unit and a ground point. In some other embodiments, a first IMD device is coupled between an output terminal of the first-stage DC-to-AC unit and a ground point, and a second IMD device is coupled between an output terminal of the second-stage DC-to-AC unit and a ground point. The IMD device can detect insulation impedance of the power system to ground. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation.

In this embodiment of this application, a communication signal is coupled to a direct current cable connected among the power supply 1, the power supply 2, the DC-to-DC unit, the first-stage DC-to-AC unit, and the second-stage DC-to-AC unit. The communication signal is used to implement communication among the power supply 1, the power supply 2, the DC-to-DC unit, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to an output terminal of the first-stage DC-to-AC unit, and the alternating current cable may be further coupled to another device. The first-stage DC-to-AC unit may communicate with another device on the alternating current cable by using the communication signal. When a plurality of combinations of DC-to-AC units are connected in parallel, and outputs of a plurality of first-stage DC-to-AC units are connected in parallel, the parallel output terminals of the plurality of first-stage DC-to-AC units may communicate with another device coupled to a connected alternating current cable by using a communication signal on the alternating current cable. The another device described above may be an alternating current device that uses an alternating current. Similarly, a communication situation of an output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

In some embodiments, the power system provided in this embodiment of this application may be further configured with a leakage current sensor. The leakage current sensor may be arranged at an output terminal of the power supply 1, an output terminal of the power supply 2, an input terminal and an output terminal of the DC-to-DC unit, an input terminal and an output terminal of the first-stage DC-to-AC unit, and an input terminal and an output terminal of the second-stage DC-to-AC unit. This is similar to the embodiments corresponding to FIG. 11 and FIG. 27, and details are not described herein again.

In some embodiments, an internal output phase line connected to an output terminal of the first-stage DC-to-AC unit is connected in series to at least one switch, so as to implement fast shutdown of the output of the first-stage DC-to-AC unit. The switch may be a relay, a circuit breaker, or a conductor, or may be another type of switch. This is not limited in this embodiment of this application. Similarly, an internal output phase line connected to the output terminal of the second-stage DC-to-AC unit may also be connected in series to a switch. This is similar to the case in which the output phase line of the first-stage DC-to-AC unit is connected in series to a switch. Details are not described herein again.

In this embodiment of this application, when the power supply 1 and the power supply 2 are photovoltaic arrays, the power system may be referred to as a photovoltaic power generation system. In this embodiment of this application, the power supply 1 may be referred to as a first photovoltaic array, and the power supply 2 may be referred to as a second photovoltaic array. In actual application, another name may be used. This is not limited in this embodiment of this application. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node is coupled to ground, so that when the output powers or output voltages of the first-stage DC-to-DC unit and the second DC-to-DC unit are asymmetric, or the input powers or input voltages of the first-stage DC-to-AC unit and the second DC-to-AC unit are asymmetric, a current loop can be provided to achieve voltage equalization, thereby ensuring normal operation of the system, and saving costs of one cable and construction costs.

Figure 57:
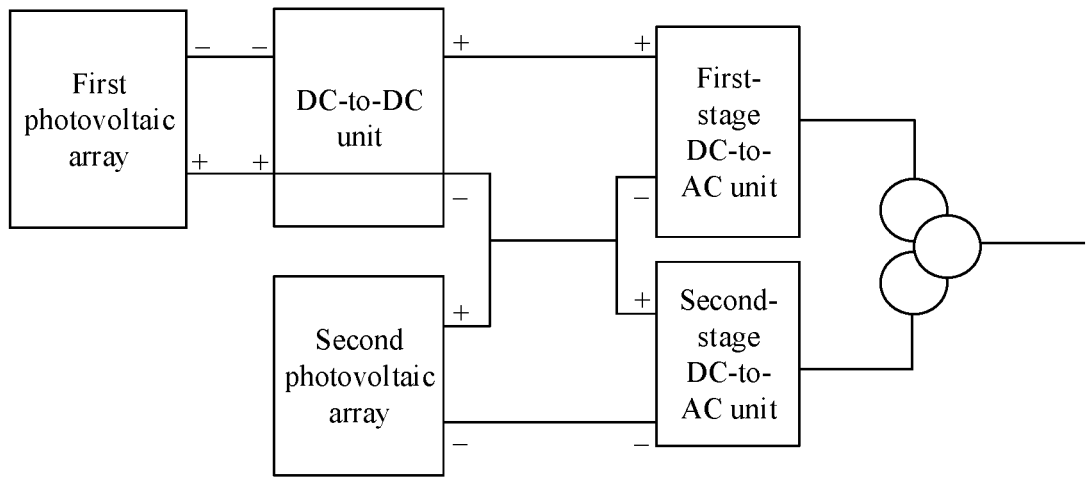
FIG. 57 is a schematic diagram of a photovoltaic power generation system according to an embodiment of this application.

FIG. 57 is a schematic diagram of a photovoltaic power generation system according to an embodiment of this application. In some embodiments, in the photovoltaic power generation system, the positive input terminal and the negative output terminal of the DC-to-DC unit are directly coupled, or connected with only a small voltage drop. This can ensure that the positive output electrode of the second photovoltaic array and the positive output electrode of the first photovoltaic array are equipotential. Normally, impedance of the entire system to the ground is symmetrically distributed. When the system is normally connected to the grid for operation, the first node, the second node, and the ground are equipotential. In this case, voltages to ground at output PV+ of battery panels of the first photovoltaic array and the second photovoltaic array are near 0 V. This eliminates a positive bias voltage to ground at PV+ of the battery panel, and avoids a PID phenomenon of the battery panel (for a battery panel that has a positive voltage to ground at PV+ and generates a PID phenomenon). Similarly, in some other embodiments, the negative input terminal and the positive output terminal of the DC-to-DC unit are directly coupled, or connected with only a small voltage drop. This is similar to the principle in the embodiment corresponding to FIG. 27, and details are not described herein again.

In this embodiment of this application, in the photovoltaic power generation system, a PID phenomenon may alternatively be eliminated by coupling a voltage source. In some embodiments, a voltage source is coupled between a neutral point of a transformer winding corresponding to the output terminal of the second-stage DC-to-AC unit and a ground point, so as to adjust a potential of the neutral point to ground. In some other embodiments, a voltage source is coupled between a neutral point of a transformer winding corresponding to the output terminal of the first-stage DC-to-AC unit and a ground point, so as to adjust a voltage. In some other embodiments, a voltage source may be coupled between an output-side external phase line of the first-stage DC-to-AC unit and/or the second-stage DC-to-AC unit and a ground point, to adjust a potential of the corresponding output phase line to ground and eliminate a PID phenomenon. In some other embodiments, a voltage source may be coupled between an internal phase line at the output terminal of the first-stage DC-to-AC unit and/or the second-stage DC-to-AC unit and a ground point, to adjust a potential of the corresponding output phase line to ground and eliminate a PID phenomenon. This is similar to the principles in the embodiments in FIG. 12a, FIG. 12b, and FIG. 12c, and details are not described herein again.

In some embodiments, in the photovoltaic power generation system, a neutral point of a transformer winding corresponding to the output terminal of the first-stage DC-to-AC unit or the second-stage DC-to-AC unit is coupled to ground, or coupled to ground by using a current limiting device, so that a voltage to ground of the neutral point is close to or equal to 0 V, thereby eliminating a PID phenomenon. In some embodiments, when the output terminals of the first-stage DC-to-AC unit and the second-stage DC-to-AC unit are respectively coupled to different windings of a same transformer, a neutral point of the winding corresponding to the output terminal of the first-stage DC-to-AC unit and a neutral point of the winding corresponding to the output terminal of the second-stage DC-to-AC unit are coupled by using two series resistors or current limiting devices, and middle points of the two series resistors or the two current limiting devices are coupled to ground, thereby eliminating a PID phenomenon. The principle is similar to the principles in the embodiments corresponding to FIG. 29 and FIG. 30, and details are not described herein again.

In some embodiments, in the photovoltaic power generation system, the photovoltaic power generation system further includes an isolation unit. The isolation unit may be arranged inside the first-stage DC-to-AC unit or inside the second-stage DC-to-AC unit. This is similar to the embodiment corresponding to FIG. 13, and details are not described herein again.

In some embodiments, in the photovoltaic power generation system, the first photovoltaic array and the second photovoltaic array may be photovoltaic arrays formed through series/parallel connection after an output terminal of the photovoltaic panel is connected in series to an optimizer or a shutdown device, and a communication signal is coupled to a direct current cable connected to an output terminal of the optimizer or the shutdown device. The DC-to-DC unit and/or the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

In some embodiments, a communication signal is coupled to a direct current cable among the DC-to-AC unit, the first-stage DC-to-DC unit, and the second-stage DC-to-DC unit. The first-stage DC-to-AC unit and/or the second-stage DC-to-AC unit control the DC-to-DC unit by using the communication signal, so as to implement fast shutdown of input terminals of the DC-to-DC unit.

In some embodiments, the photovoltaic power generation system further includes at least one energy storage unit. At least two direct current cables connected to the second photovoltaic array, the DC-to-DC unit, the first-stage DC-to-AC unit, and the second-stage DC-to-AC unit are coupled in parallel to the energy storage unit. This is similar to the energy storage unit in Embodiment 3, and details are not described herein again.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Figure 58:
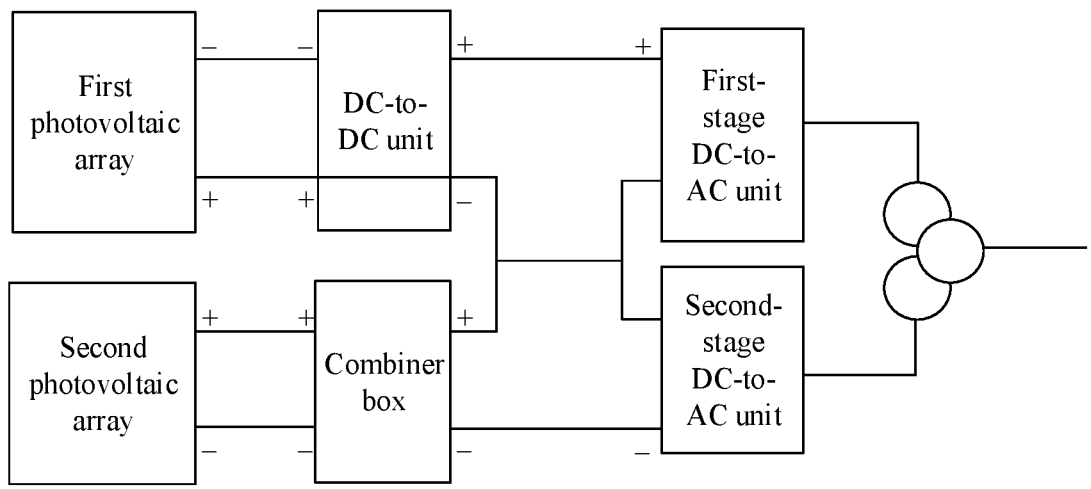
FIG. 58 is a schematic diagram of an embodiment of a photovoltaic power generation system according to an embodiment of this application.

FIG. 58 is a schematic diagram of an embodiment of a photovoltaic power generation system according to an embodiment of this application. In some embodiments, as shown in FIG. 58, the output terminal of the second photovoltaic array is coupled to a combiner box. An input terminal of the combiner box is coupled to an output terminals of the plurality of second photovoltaic arrays, a positive output terminal of the combiner box is coupled in series to a negative output terminal of the DC-to-DC unit, and a negative output terminal of the combiner box is coupled to a negative input terminal of the second-stage DC-to-AC unit. An input terminal of the combiner box is coupled to an output terminal of the plurality of second photovoltaic arrays, a positive output terminal of the combiner box is coupled in series to a negative output terminal of the DC-to-DC unit, and a negative output terminal of the combiner box is coupled to a negative input terminal of the second-stage DC-to-AC unit. A positive output terminal of the DC-to-DC unit is coupled to a positive input terminal of the first-stage DC-to-AC unit. This is similar to the embodiment corresponding to FIG. 34, and details are not described herein again.

Figure 59:
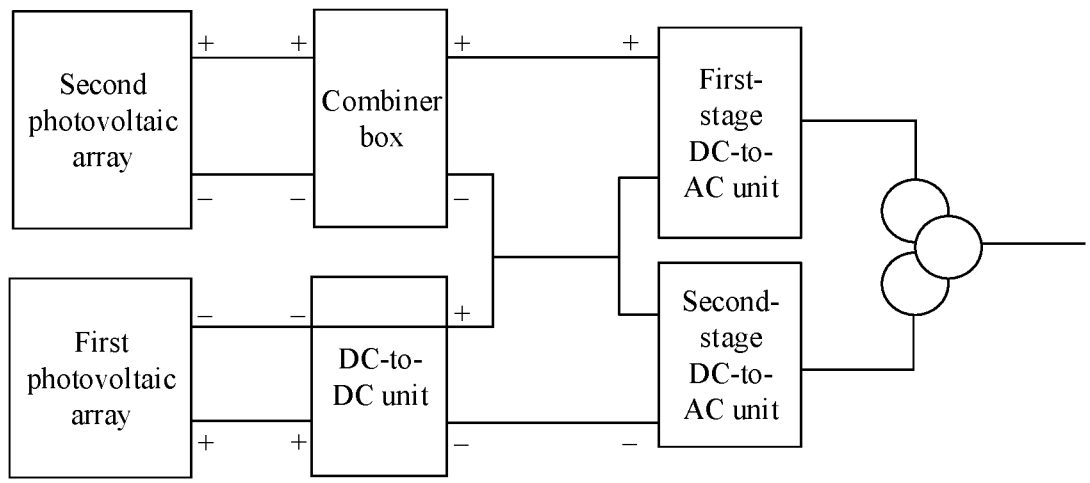
FIG. 59 is a schematic diagram of an embodiment of a photovoltaic power generation system according to an embodiment of this application.
Figure 60:
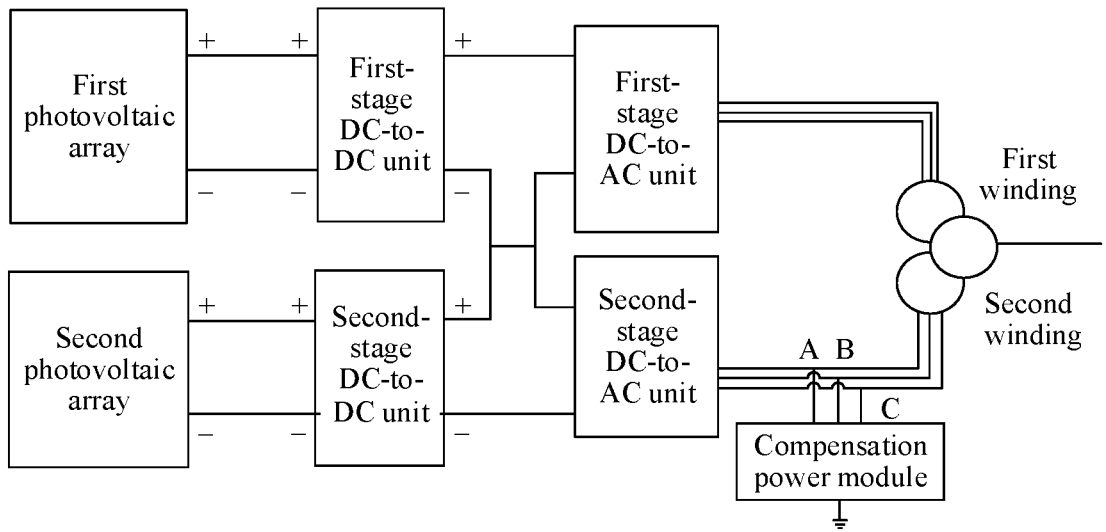
FIG. 60 is a schematic diagram of another embodiment of a photovoltaic power generation system according to an embodiment of this application.

FIG. 59 is a schematic diagram of an embodiment of a photovoltaic power generation system according to an embodiment of this application. In some embodiments, as shown in FIG. 59, the output terminal of the second photovoltaic array is coupled to a combiner box. An input terminal of the combiner box is coupled to output terminals of the plurality of second photovoltaic arrays, a negative output terminal of the combiner box is coupled in series to a positive output terminal of the DC-to-DC unit, and a positive output terminal of the combiner box is coupled to a positive input terminal of the first-stage DC-to-AC unit. A negative output terminal of the DC-to-DC unit is coupled to a negative input terminal of the second-stage DC-to-AC unit. This is similar to the embodiment corresponding to FIG. 35, and details are not described herein again. In the foregoing embodiments, the first photovoltaic array and the second photovoltaic array are usually connected in a co-PV+ or co-PV− manner. For example, FIG. 28 shows a co-PV+ connection manner of the first photovoltaic array and the second photovoltaic array. For example, the embodiment corresponding to FIG. 29 is a co-PV− connection manner of the first photovoltaic array and the second photovoltaic array. In actual application, the foregoing connection manner may not be used. For example, FIG. 60 is a schematic diagram of another embodiment of a photovoltaic power generation system according to an embodiment of this application. As shown in FIG. 60, a negative output terminal of the first photovoltaic array is coupled to a negative input terminal of the first-stage DC-to-DC unit. A positive output terminal of the second photovoltaic array is coupled to a positive input terminal of the second-stage DC-to-DC unit. In addition, a negative output terminal of the first-stage DC-to-DC unit is coupled to a positive output terminal of the second-stage DC-to-DC unit, and the coupling point is the first node. Therefore, in this embodiment of this application, the negative output terminal of the first photovoltaic array and the positive output terminal of the second photovoltaic array have the same potential, and do not belong to a co-PV+ or co-PV− connection manner, and should also be understood as one of the connection manners provided in this embodiment of this application. The compensation power module in FIG. 60 is similar to the voltage source in the embodiment corresponding to FIG. 12b, and details are not described herein again.

A first additional embodiment of the present application provides a power system comprising:
a power supply;
a DC-to-DC unit: and
N DC-to-AC units, wherein.
an output terminal of the power supply is coupled to an input terminal of the DC-to-DC unit;
a positive output terminal of the DC-to-DC unit is coupled to a positive input terminal of the first DC-to-AC unit;
a negative output terminal of the DC-to-DC unit is coupled to a negative input terminal of an Nth DC-to-AC unit;
a negative input terminal of an nth DC-to-AC unit is coupled in series to a positive input terminal of an (n+1)th DC-to-AC unit to form a first node, wherein n is an integer greater than 0 and less than N; and
output terminals of the DC-to-AC units are isolated. The power system according to the first additional embodiment the first additional embodiment, wherein a third output terminal of at least one of the DC-to-DC units is coupled to at least one of the first nodes, and a third output terminal of the DC-to-DC unit is an output terminal except a positive output terminal and a negative output terminal of the DC-to-DC unit.

The power system according to the first additional embodiment the first additional embodiment, wherein the power supply is a photovoltaic array and/or an energy storage power supply and/or a wind power generation direct current source; and
the photovoltaic array is formed by performing series/parallel combination of photovoltaic panels, or is formed by connecting an output of a photovoltaic panel to an optimizer or a shutdown device, and then performing series/parallel combination.

The power system according to the first additional embodiment, wherein positive output terminals of at least two DC-to-DC units are coupled in parallel, negative output terminals of at least two DC-to-DC units are coupled in parallel, and corresponding third output terminals of at least two DC-to-DC units are connected in parallel; at least two groups of corresponding first nodes are connected in parallel, and at least one third output terminal connected in parallel is coupled to at least one first node connected in parallel.

The power system according to the first additional embodiment, wherein when the power supply is a photovoltaic array formed by connecting an output of a photovoltaic panel to an optimizer or a shutdown device, and then performing series/parallel combination, a communication signal is coupled to a direct current cable connected among the power supply, the DC-to-DC unit, and the DC-to-AC unit, and the DC-to-DC unit and/or the DC-to-AC unit controls the optimizer or the shutdown device by using the communication signal, so as to implement fast shutdown.

The power system according to the first additional embodiment, wherein any two of the power supply, the DC-to-DC unit, and the DC-to-AC unit implement communication by coupling a communication signal to a connected direct current cable.

4The power system according to the first additional embodiment, further comprising at least one energy storage unit, wherein
the energy storage unit is coupled in parallel to at least two direct current cables connected between the DC-to-DC unit and the DC-to-AC unit. The power system according to the first additional embodiment, wherein the energy storage unit is an energy storage device, or the energy storage unit comprises a direct current conversion unit and the energy storage device, and the energy storage device comprises a supercapacitor or a battery.

The power system according to claim the first additional embodiment, wherein any two of the power supply, the DC-to-DC unit, the DC-to-AC unit, and the energy storage unit implement communication by coupling a communication signal to a connected direct current cable.

A second additional embodiment of the present application provides a power system, comprising a power supply, a DC-to-DC unit, a first-stage DC-to-AC unit, and a second-stage DC-to-AC unit, wherein
an output terminal of the power supply is coupled to an input terminal of the DC-to-DC unit;
a positive output terminal of the DC-to-DC unit is coupled to a positive input terminal of the first-stage DC-to-AC unit;
a negative output terminal of the DC-to-DC unit is coupled to a negative input terminal of the second-stage DC-to-AC unit;
a negative input terminal of the first-stage DC-to-AC unit is coupled to a positive input terminal of the second-stage DC-to-AC unit; and
output terminals of the first-stage DC-to-AC unit and the second-stage DC-to-AC unit are isolated for output.

The power system according to the second additional embodiment, wherein a middle point of an output terminal potential of the DC-to-DC unit is a first node, and a negative input terminal of the first-stage DC-to-AC unit is coupled to a positive input terminal of the second-stage DC-to-AC unit to form a second node;
a positive output terminal of the DC-to-DC unit is coupled to a positive input terminal of the first-stage DC-to-AC unit by using a first conductor; a negative output terminal of the DC-to-DC unit is coupled to a negative output terminal of the second-stage DC-to-AC unit by using a second conductor; the first node is coupled to the second node by using a third conductor;
a current value on the third conductor is less than or equal to a current value on the first conductor; or
a current value on the third conductor is less than or equal to a current value on the second conductor.

The power system according to the second additional embodiment, wherein
the first conductor, the second conductor, and the third conductor are direct current conductors;
the first conductor, the second conductor, and the third conductor form a distributed double bus, the first conductor and the second conductor form a positive bus, and the second conductor and the third conductor form a negative bus;
and
the third conductor is a middle bus of the distributed double bus.

The power system according to the second additional embodiment, wherein a middle point of an output terminal potential of the DC-to-DC unit is a first node, and a negative input terminal of the first-stage DC-to-AC unit is coupled to a positive input terminal of the second-stage DC-to-AC unit to form a second node; and both the first node and the second node are coupled to ground.

The power system according to the second additional embodiment, wherein a middle point of an output terminal potential of the DC-to-DC unit is a first node, and a negative input terminal of the first-stage DC-to-AC unit is coupled to a positive input terminal of the second-stage DC-to-AC unit to form a second node:

the power system further comprises a first equalization circuit unit, wherein the first equalization circuit unit is configured with a first interface, a second interface, and a third interface; and the first interface is coupled to the second node, the second interface is coupled to a positive input terminal of the first-stage DC-to-AC unit, and the third interface is coupled to a negative input terminal of the second-stage DC-to-AC unit; and the first equalization circuit unit is configured to balance input voltages and/or powers and/or currents of the first-stage DC-to-AC unit and the second-stage DC-to-AC unit.

The power system according to the second additional embodiment, wherein the first equalization circuit further comprises a fourth interface; and he fourth interface is coupled to the first node.

The power system according to the second additional embodiment, wherein a middle point of an output terminal potential of the DC-to-DC unit is a first node, and a negative input terminal of the first-stage DC-to-AC unit is coupled to a positive input terminal of the second-stage DC-to-AC unit to form a second node:

the power system further comprises a second equalization circuit unit, wherein the second equalization circuit unit is configured with a fifth interface and a sixth interface;

the fifth interface is coupled to the second node, the sixth interface is coupled to a positive input terminal of the first-stage DC-to-AC unit, and the sixth interface is coupled to a negative input terminal of the second-stage DC-to-AC unit; and the second equalization circuit unit is configured to balance input voltages and/or powers and/or currents of the first-stage DC-to-AC unit and the second-stage DC-to-AC unit.

The power system according to the second additional embodiment, wherein output terminals of the first-stage DC-to-AC unit and the second-stage DC-to-AC unit are respectively coupled to different transformers; or output terminals of the first-stage DC-to-AC unit and the second-stage DC-to-AC unit are respectively coupled to different windings of a same transformer.

The power system according to the second additional embodiment, wherein the power system comprises at least one power supply, at least one DC-to-DC unit, and at least one pair of DC-to-AC conversion units, wherein one pair of DC-to-AC conversion units comprises the first-stage DC-to-AC unit and the second-stage DC-to-AC unit; when the at least one power supply, the at least one DC-to-DC unit, and the at least one pair of DC-to-AC conversion units are coupled, each DC-to-DC unit is coupled to at least one power supply: or similar input terminals of each of the DC-to-DC units are coupled in parallel, and then coupled to each of the power supplies; and each pair of DC-to-AC conversion units is coupled to at least one pair of DC-to-DC units; or similar input terminals of each pair of DC-to-AC conversion units are coupled in parallel, and then coupled to each of the DC-to-DC units.

The power system according to the second additional embodiment, wherein an insulation monitoring device IMD device is coupled between an output terminal of the first-stage DC-to-AC unit and/or the second-stage DC-to-AC unit and a ground point, and is configured to detect insulation impedance of the power system to ground.

The power system according to the second additional embodiment, wherein any two of the first power supply, the second power supply, the DC-to-DC unit, the first-stage DC-to-AC unit, and the second-stage DC-to-AC unit communicate by using a communication signal coupled to a direct current cable.

The power system according to the second additional embodiment, wherein an output terminal of the first-stage DC-to-AC unit is connected in parallel to a first alternating current device, and the first alternating current device communicates with the first-stage DC-to-AC unit by using a communication signal coupled to an alternating current cable connected to the first alternating current device and the first-stage DC-to-AC unit; and/or an output terminal of the second-stage DC-to-AC unit is connected in parallel to a second alternating current device, and the second alternating current device communicates with the second-stage DC-to-AC unit by using a communication signal coupled to an alternating current cable connected to the second alternating current device and the second-stage DC-to-AC unit.

The power system according to the second additional embodiment, wherein an output terminal of the power supply is coupled to a leakage current sensor; and/or an input terminal of the DC-to-DC unit is coupled to a leakage current sensor; and/or a positive input terminal of the first-stage DC-to-AC unit and a negative input terminal of the first-stage DC-to-AC unit are coupled to a leakage current sensor; and/or a positive input terminal of the second-stage DC-to-AC unit and a negative input terminal of the second-stage DC-to-AC unit are coupled to a leakage current sensor; and/or an internal output phase line of the first-stage DC-to-AC unit is coupled to a leakage current sensor; and/or an internal output phase line of the second-stage DC-to-AC unit is coupled to a leakage current sensor; and when the leakage current sensor detects that a leakage current value is greater than a preset threshold, the power supply and/or the first-stage DC-to-AC unit and/or the second-stage DC-to-AC unit and/or the DC-to-DC unit reports an alarm and/or the power system stops working.

The power system according to the second additional embodiment, wherein at least one switch is connected in series to an internal output phase line of the first-stage DC-to-AC unit and/or an internal output phase line of the second-stage DC-to-AC unit, and the switch is a relay, a circuit breaker, or a contactor.

The power system according to the second additional embodiment, wherein the power supply is a photovoltaic array and/or an energy storage power supply and/or a wind power generation direct current source; and the photovoltaic array is formed by performing series/parallel combination of photovoltaic panels, or is formed by connecting an output of a photovoltaic panel to an optimizer or a shutdown device, and then performing series/parallel combination.

The power system according to the second additional embodiment, wherein the first node and/or the second node is coupled to ground.

The power system according to the second additional embodiment, wherein a voltage source is coupled between a neutral point of a transformer winding corresponding to an output terminal of the first-stage DC-to-AC unit or the second-stage DC-to-AC unit and a ground point, and is configured to adjust a potential of the neutral point to ground; or a voltage source is coupled between an internal phase line at the output terminal of the first-stage DC-to-AC unit or the second-stage DC-to-AC unit and a ground point, and is configured to adjust a potential of the corresponding output phase line to ground; or a voltage source is coupled between an output-side external phase line of the first-stage DC-to-AC unit or the second-stage DC-to-AC unit and a ground point, and is configured to adjust a potential of the corresponding output phase line to ground.

The power system according to the second additional embodiment, wherein the first-stage DC-to-AC unit further internally comprises a first AC-to-DC isolation unit;

the first power supply and the second power supply are photovoltaic arrays;

an input terminal of the first AC-to-DC isolation unit is coupled to an internal phase line at the output terminal of the first-stage DC-to-AC unit;

a first output terminal of the first AC-to-DC isolation unit is coupled to ground, and a second output terminal of the first AC-to-DC isolation unit is coupled to a positive input terminal and/or a negative input terminal of the first-stage DC-to-AC unit; and the first AC-to-DC isolation unit is configured to adjust an output voltage to ground of the power supply: and/or the second-stage DC-to-AC unit further internally comprises a second AC-to-DC isolation unit;

an input terminal of the second AC-to-DC isolation unit is coupled to an internal phase line at the output terminal of the second-stage DC-to-AC unit; a first output terminal of the second AC-to-DC isolation unit is coupled to ground;

a second output terminal of the second AC-to-DC isolation unit is coupled to a positive input terminal and/or a negative input terminal of the second-stage DC-to-AC unit; and the second AC-to-DC isolation unit is configured to adjust an output voltage to ground of the power supply.

The power system according to the second additional embodiment, wherein when the first power supply and/or the second power supply is a photovoltaic array formed by connecting an output of a photovoltaic panel to an optimizer or a shutdown device, and then performing series/parallel combination, a communication signal is coupled to a direct current cable of the output terminal of the optimizer or the shutdown device, and is used by any one of the first-stage DC-to-AC unit, the second-stage DC-to-AC unit, and the DC-to-DC unit to control the optimizer or the shutdown device by using the communication signal, so as to implement fast shutdown.

The power system according to the second additional embodiment, wherein a communication signal is coupled to a direct current cable among the first-stage DC-to-AC unit, the second-stage DC-to-AC unit, and the DC-to-DC unit;

the first-stage DC-to-AC unit and/or the second-stage DC-to-AC unit controls the DC-to-DC unit by using the communication signal, so as to implement fast shutdown of input terminals of the DC-to-DC unit.

The power system according to the second additional embodiment, further comprising at least one energy storage unit, wherein at least two direct current cables connected to the DC-to-DC unit, the first-stage DC-to-AC unit, and the second-stage DC-to-AC unit are coupled in parallel to the energy storage unit.

The power system according to the second additional embodiment, wherein any two of the power supply, the energy storage unit, the DC-to-DC unit, the first-stage DC-to-AC unit, and the second-stage DC-to-AC unit communicate by using a communication signal coupled to a connected direct current cable.

The power system according to the second additional embodiment, wherein the DC-to-DC unit comprises a first-stage DC-to-DC conversion unit and a second-stage DC-to-DC conversion unit;

an input terminal of the first-stage DC-to-DC conversion unit is an input terminal of the DC-to-DC unit, an output terminal of the second-stage DC-to-DC unit is an output terminal of the DC-to-DC unit, and an input terminal of the second-stage DC-to-DC conversion unit is provided with a third node, a fourth node, and a fifth node; and the third node is coupled to a positive output terminal of the first-stage DC-to-DC conversion unit and a positive output terminal of the second-stage DC-to-DC conversion unit: the fourth node is coupled to a negative output terminal of the first-stage DC-to-DC conversion unit; the fifth node is coupled to a negative output terminal of the second-stage DC-to-DC conversion unit; and the second-stage DC-to-DC conversion unit is configured to transfer energy between the third node and the fourth node to a position between the fourth node and the fifth node, so that an average voltage from the third node to the fifth node is greater than an average voltage from the third node to the fourth node.

66. The power system according to the second additional embodiment, wherein when the fourth node is coupled to the second node, and an input voltage and/or an input current and/or an input power of the first-stage DC-to-DC conversion unit exceeds a first preset value, the first-stage DC-to-DC conversion unit works in bypass mode;

and/or when an output voltage and/or an output current and/or an output power of the first-stage DC-to-DC conversion unit exceeds a second preset value, the second-stage DC-to-DC conversion unit stops working; and/or at least one of the first-stage DC-to-AC unit and the second-stage DC-to-AC unit works.

The power system according to the second additional embodiment, wherein the DC-to-DC unit comprises a plurality of first-stage DC-to-DC conversion units and the second-stage DC-to-DC conversion unit; and output terminals of the plurality of first-stage DC-to-DC conversion units are coupled in parallel, and then coupled to the second-stage DC-to-DC conversion unit.

The power system according to the second additional embodiment, wherein the DC-to-DC unit comprises a third-stage DC-to-DC conversion unit and a fourth-stage DC-to-DC conversion unit:

an input terminal of the third-stage DC-to-DC conversion unit is an input terminal of the DC-to-DC unit, an output terminal of the fourth-stage DC-to-DC unit is an output terminal of the DC-to-DC unit, and an input terminal of the fourth-stage DC-to-DC conversion unit is provided with a sixth node, a seventh node, and an eighth node; and the sixth node is coupled to a positive output terminal of the fourth-stage DC-to-DC conversion unit, the seventh node is coupled to a positive output terminal of the third-stage DC-to-DC conversion unit, the eighth node is coupled to a negative output terminal of the third-stage DC-to-DC conversion unit and a negative output terminal of the fourth-stage DC-to-DC conversion unit, and the fourth-stage DC-to-DC conversion unit is configured to transfer energy between the seventh node and the eighth node to a position between the sixth node and the seventh node, so that an average voltage from the sixth node to the eighth node is greater than an average voltage from the seventh node to the eighth node.

The power system according to the second additional embodiment, wherein when the seventh node is coupled to the second node, and the input voltage and/or the input current and/or the input power of the third-stage DC-DC conversion unit exceeds a third preset value, the third-stage DC-to-DC conversion unit works in bypass mode;

and/or when the output voltage and/or the output current and/or the output power of the third-stage DC-to-DC conversion unit exceeds a fourth preset value, the fourth-stage DC-to-DC conversion unit stops working, and/or at least one of the first-stage DC-to-AC unit and the second-stage DC-to-AC unit works.

The power system according to the second additional embodiment, wherein the DC-to-DC unit comprises a plurality of third-stage DC-to-DC conversion units and the fourth-stage DC-to-DC conversion unit; and output terminals of the plurality of third-stage DC-to-DC conversion units are coupled in parallel, and then coupled to the fourth-stage DC-to-DC conversion unit.

What is claimed is:

1. A power system comprising:
   N power modules; and
   M DC-to-AC units, wherein N is an integer greater than 1, and M is an integer greater than 1;
   wherein, each power module is configured with a positive output terminal and a negative output terminal, and each DC-to-AC unit is configured with a positive input terminal, a negative input terminal, and an output terminal, wherein a communication signal is coupled to a direct current cable connected between the power module and the DC-to-AC unit and used to implement communication between the power module and the DC-to-AC unit;
   a positive output terminal of a first power module is coupled to a positive input terminal of a first DC-to-AC unit;
   a negative output terminal of an $n^{th}$ power module is coupled in series to a positive output terminal of an $(n+1)^{th}$ power module to form a first node, wherein n is an integer greater than 0 and less than N;
   a negative output terminal of an $N^{th}$ power module is coupled to a negative input terminal of an $M^{th}$ DC-to-AC unit;
   a negative input terminal of an $m^{th}$ DC-to-AC unit is coupled in series to a positive input terminal of an $(m+1)^{th}$ DC-to-AC unit to form a second node, wherein m is an integer greater than 0 and less than M;
   at least one first node and at least one second node are coupled; and
   output terminals of the DC-to-AC units are isolated from each other for output.

2. The power system according to claim 1, wherein a power module is a photovoltaic array and/or an energy storage power supply and/or a wind power generation direct current source; and
   the photovoltaic array is formed by performing series/parallel combination of photovoltaic panels, or is formed by connecting an output of a photovoltaic panel to an optimizer or a shutdown device, and then performing series/parallel combination.

3. The power system according to claim 2, wherein the communication signal is used to control the optimizer or the shutdown device, so as to implement fast shutdown.

4. The power system according to claim 1, wherein similar output terminals of at least two groups of power modules are first connected in parallel and then connected in series to form the first node;
   similar input terminals of at least two groups of DC-to-AC units are first connected in parallel and then connected in series to form the second node; and
   similar output terminals of the at least two groups of DC-to-AC units are connected in parallel for output, or isolated for output.

5. The power system according to claim 1, further comprising at least one energy storage unit, wherein
   the energy storage unit is coupled in parallel to at least two direct current cables connected between the power module and the DC-to-AC unit.

6. The power system according to claim 5, wherein the energy storage unit is an energy storage device, or the energy storage unit comprises a direct current conversion unit and the energy storage device, and the energy storage device comprises a supercapacitor or a battery.

7. The power system according to claim 5, wherein the communication signal is coupled to a direct current cable connected between the energy storage unit and the power module, and is used to implement communication between the energy storage unit and the power module, or, the communication signal is coupled to a direct current cable connected between the energy storage unit and the DC-to-AC unit, and is used to implement communication between the energy storage unit and the DC-to-AC unit.

8. A power system comprising:
   a first power supply;
   a second power supply;
   a first-stage DC-to-AC unit; and
   a second-stage DC-to-AC unit, wherein,
   a positive output terminal of the first power supply is coupled to a positive input terminal of the first-stage DC-to-AC unit;
   a negative output terminal of the first power supply is coupled to a positive output terminal of the second power supply to form a first node;
   a negative output terminal of the second power supply is coupled to a negative input terminal of the second-stage DC-to-AC unit;
   a negative input terminal of the first-stage DC-to-AC unit is coupled to a positive input terminal of the second-stage DC-to-AC unit to form a second node, wherein any two of the first power supply, the second power supply, the first-stage DC-to-AC unit, and the second-stage DC-to-AC unit communicate by using a communication signal coupled to a direct current cable; and
   output terminals of the first-stage DC-to-AC unit and the second-stage DC-to-AC unit are isolated from each other for output.

9. The power system according to claim 8, wherein the positive output terminal of the first power supply is coupled to the positive input terminal of the first-stage DC-to-AC unit by using a first conductor, the negative output terminal of the second power supply is coupled to the negative input terminal of the second-stage DC-to-AC unit by using a second conductor, and the first node is coupled to the second node by using a third conductor;
   a current value on the third conductor is less than or equal to a current value on the first conductor; or a current value on the third conductor is less than or equal to a current value on the second conductor.

10. The power system according to claim 9, wherein
the first conductor, the second conductor, and the third conductor are direct current conductors;
the first conductor, the second conductor, and the third conductor form a distributed double bus, the first conductor and the second conductor form a positive bus, and the second conductor and the third conductor form a negative bus; and
the third conductor is a middle bus of the distributed double bus.

11. The power system according to claim 8, wherein both the first node and the second node are coupled to ground.

12. The power system according to claim 11, wherein when the first node is coupled to the second node, and when an output voltage and/or an output current and/or an output power of one of the first power supply and the second power supply is less than a preset value, the corresponding first power supply or the corresponding second power supply stops working; and
at least one of the first-stage DC-to-AC unit and the second-stage DC-to-AC unit works.

13. The power system according to claim 8, further comprising a first equalization circuit unit, configured to balance input voltages and/or powers and/or currents of the first-stage DC-to-AC unit and the second-stage DC-to-AC unit, wherein
the first equalization circuit unit is configured with a first interface, a second interface, and a third interface;
the first interface is coupled to the second node;
the second interface is coupled to a positive input terminal of the first-stage DC-to-AC unit; and
the third interface is coupled to a negative input terminal of the second-stage DC-to-AC unit.

14. The power system according to claim 13, further comprising a second equalization circuit unit, configured to balance input voltages and/or powers and/or currents of the first-stage DC-to-AC unit and the second-stage DC-to-AC unit, wherein
the second equalization circuit unit is configured with a fourth interface and a fifth interface;
the fourth interface is coupled to the second node; and
the fifth interface is coupled to a positive input terminal of the first-stage DC-to-AC unit or coupled to a negative input terminal of the second-stage DC-to-AC unit.

15. The power system according to claim 14, further comprising a third equalization circuit unit, configured to balance output voltages and/or powers and/or currents of the first power supply and the second power supply, wherein
the third equalization circuit unit is configured with a sixth interface, a seventh interface, and an eighth interface;
the sixth interface is coupled to the first node;
the seventh interface is coupled to a positive output terminal of the first power supply; and
the eighth interface is coupled to a negative output terminal of the second power supply.

16. The power system according to claim 15, further comprising a fourth equalization circuit unit, configured to balance output voltages and/or powers and/or currents of the first power supply and the second power supply, wherein
the fourth equalization circuit unit is configured with a ninth interface and a tenth interface;
the ninth interface is coupled to the first node; and
the tenth interface is coupled to a positive output terminal of the first power supply or coupled to a negative output terminal of the second power supply.

17. The power system according to claim 8, wherein output terminals of the first-stage DC-to-AC unit and the second-stage DC-to-AC unit are respectively coupled to different transformers; or
output terminals of the first-stage DC-to-AC unit and the second-stage DC-to-AC unit are respectively coupled to different windings of a same transformer.

18. The power system according to claim 8, wherein the power system further comprises a third power supply and a fourth power supply;
a positive output terminal of the third power supply is connected in parallel to a positive output terminal of the first power supply, and a negative output terminal of the third power supply is connected in parallel to a negative output terminal of the first power supply;
a positive output terminal of the fourth power supply is connected in parallel to a positive output terminal of the second power supply, and a negative output terminal of the fourth power supply is connected in parallel to a negative output terminal of the fourth power supply; and/or
the power system further comprises a third-stage DC-to-AC unit and a fourth-stage DC-to-AC unit;
a positive input terminal of the third-stage DC-to-AC unit is connected in parallel to a positive input terminal of the first-stage DC-to-AC unit, and a negative input terminal of the third-stage DC-to-AC unit is connected in parallel to a negative input terminal of the first-stage DC-to-AC unit;
a positive input terminal of the fourth-stage DC-to-AC unit is connected in parallel to a positive input terminal of the second-stage DC-to-AC unit, and a negative input terminal of the fourth-stage DC-to-AC unit is connected in parallel to a negative input terminal of the second-stage DC-to-AC unit;
an output terminal of the first-stage DC-to-AC unit and an output terminal of the third-stage DC-to-AC unit are connected in parallel for output, or isolated for output; and
an output terminal of the second-stage DC-to-AC unit and an output terminal of the fourth-stage DC-to-AC unit are connected in parallel for output, or isolated for output.

19. The power system according to claim 8, wherein an insulation monitoring device (IMD) device is coupled between an output terminal of the first-stage DC-to-AC unit and/or the second-stage DC-to-AC unit and a ground point, and is configured to detect insulation impedance of the power system to ground.

20. The power system according to claim 8, wherein an output terminal of the first-stage DC-to-AC unit is connected in parallel to a first alternating current device, and the first alternating current device communicates with the first-stage DC-to-AC unit by using a communication signal coupled to an alternating current cable connected to the first alternating current device and the first-stage DC-to-AC unit; and/or
an output terminal of the second-stage DC-to-AC unit is connected in parallel to a second alternating current device, and the second alternating current device communicates with the second-stage DC-to-AC unit by using a communication signal coupled to an alternating current cable connected to the second alternating current device and the second-stage DC-to-AC unit.

21. The power system according to claim 8, wherein a positive input terminal of the first-stage DC-to-AC unit and a negative input terminal of the first-stage DC-to-AC unit are coupled to a leakage current sensor; and/or
   a positive input terminal of the second-stage DC-to-AC unit and a negative input terminal of the second-stage DC-to-AC unit are coupled to a leakage current sensor; and/or
   a positive output terminal of the first power supply and a negative output terminal of the first power supply are coupled to a leakage current sensor; and/or
   a positive output terminal of the second power supply and a negative output terminal of the second power supply are coupled to a leakage current sensor; and/or
   an internal output phase line of the first-stage DC-to-AC unit is coupled to a leakage current sensor; and/or
   an internal output phase line of the second-stage DC-to-AC unit is coupled to a leakage current sensor; and
   when the leakage current sensor detects that a leakage current value is greater than a preset threshold, the first power supply and/or the second power supply and/or the first-stage DC-to-AC unit and/or the second-stage DC-to-AC unit reports an alarm and/or the power system stops working.

22. The power system according to claim 8, wherein at least one switch is connected in series to an internal output phase line of the first-stage DC-to-AC unit and/or an internal output phase line of the second-stage DC-to-AC unit, and the switch is a relay, a circuit breaker, or a contactor.

23. The power system according to claim 8, wherein the first power supply and the second power supply are photovoltaic arrays and/or energy storage power supplies and/or wind power generation direct current sources; and
   each photovoltaic array is formed by performing series/parallel combination of photovoltaic panels, or is formed by connecting an output of a photovoltaic panel to an optimizer or a shutdown device, and then performing series/parallel combination.

24. The power system according to claim 23, wherein the first power supply and the second power supply are photovoltaic arrays, and the first node and/or the second node are coupled to ground.

25. The power system according to claim 23, wherein a voltage source is coupled between a neutral point of a transformer winding corresponding to an output terminal of the first-stage DC-to-AC unit or the second-stage DC-to-AC unit and a ground point, and is configured to adjust a potential of the neutral point to ground; or
   a voltage source is coupled between an internal phase line at the output terminal of the first-stage DC-to-AC unit or the second-stage DC-to-AC unit and a ground point, and is configured to adjust a potential of the corresponding output phase line to ground; or
   a voltage source is coupled between an output-side external phase line of the first-stage DC-to-AC unit or the second-stage DC-to-AC unit and a ground point, and is configured to adjust a potential of the corresponding output phase line to ground.

26. The power system according to claim 23, wherein the first-stage DC-to-AC unit further internally comprises a first AC-to-DC isolation unit;
   the first power supply and the second power supply are photovoltaic arrays;
   an input terminal of the first AC-to-DC isolation unit is coupled to an internal phase line at the output terminal of the first-stage DC-to-AC unit; a first output terminal of the first AC-to-DC isolation unit is coupled to ground; a second output terminal of the first AC-to-DC isolation unit is coupled to a positive input terminal and/or a negative input terminal of the first-stage DC-to-AC unit; the first AC-to-DC isolation unit is configured to adjust an output voltage to ground of the first power supply and/or the second power supply; and/or
   the second-stage DC-to-AC unit further internally comprises a second AC-to-DC isolation unit;
   an input terminal of the second AC-to-DC isolation unit is coupled to an internal phase line at the output terminal of the second-stage DC-to-AC unit; a first output terminal of the second AC-to-DC isolation unit is coupled to ground; a second output terminal of the second AC-to-DC isolation unit is coupled to a positive input terminal and/or a negative input terminal of the second-stage DC-to-AC unit;
   the second AC-to-DC isolation unit is configured to adjust an output voltage to ground of the first power supply and/or the second power supply.

27. The power system according to claim 23, wherein the first power supply and the second power supply are photovoltaic arrays; and
   an output terminal of the photovoltaic panel is connected in series with an optimizer or a shutdown device; a communication signal is coupled to a direct current cable at the output terminal of the optimizer or the shutdown device; and the communication signal is used by the first-stage DC-to-AC unit and/or the second-stage DC-to-AC unit to control the optimizer or the shutdown device to implement fast shutdown.

28. The power system according to claim 23, further comprising at least one energy storage unit, wherein
   at least two direct current cables connected to the first power supply, the second power supply, the first-stage DC-to-AC unit, and the second-stage DC-to-AC unit are coupled in parallel to the energy storage unit any two of the first power supply, the second power supply, the energy storage unit, the first-stage DC-to-AC unit, and the second-stage DC-to-AC unit communicate by using a communication signal coupled to a connected direct current cable.

29. The power system according to claim 23, wherein output terminals of the first power supply are coupled to a first combiner unit and output terminals of the second power supply are coupled to a second combiner unit;
   a positive output terminal of the first combiner unit is coupled to a positive input terminal of the first-stage DC-to-AC unit;
   a negative output terminal of the first combiner unit, a positive output terminal of the second combiner unit, a negative input terminal of the first-stage DC-to-AC unit, and a positive input terminal of the second-stage DC-to-AC unit are coupled; and
   a negative output terminal of the second combiner unit is coupled to a negative input terminal of the second-stage DC-to-AC unit.

30. The power system according to claim 29, wherein output terminals of the first power supply are coupled to a third combiner unit and output terminals of the second power supply are coupled to the third combiner unit;
   a first output terminal of the third combiner unit is coupled to a positive input terminal of the first-stage DC-to-AC unit;
   a second output terminal of the third combiner unit, a negative input terminal of the first-stage DC-to-AC unit, and a positive input terminal of the second-stage DC-to-AC unit are coupled; and a third output terminal of the third combiner unit is coupled to a negative input terminal of the second-stage DC-to-AC unit.

31. The power system according to claim 29, wherein an output negative end of a first busbar unit, an output positive end of a second busbar unit, an input negative end of the first-stage DC-to-AC unit, and an input positive end of the second-stage DC-to-AC unit are coupled; and a coupling mode is cable connection; and an output negative end of the first busbar unit is coupled to an output positive end of the second busbar unit, and grounded; or; an input negative end of the first-level DC-to-AC unit is coupled to an input positive end of the second-level DC-to-AC unit, and grounded.

32. The power system according to claim 29, wherein a second output end of a third busbar unit and an input negative end of the first-level DC-to-AC unit are coupled to an input positive end of the second-level DC-to-AC unit, and a coupling manner is cable connection; and a second output end of the third busbar unit is grounded; or an input negative end of the first-level DC-to-AC unit is coupled to an input positive end of the second-level DC-to-AC unit, and grounded.

* * * * *